United States Patent [19]

Okawa et al.

[11] Patent Number: 5,321,096
[45] Date of Patent: Jun. 14, 1994

[54] POLYIMIDE COMPOSITION

[75] Inventors: Yuichi Okawa; Nobuhito Koga; Hideaki Oikawa; Tadashi Asanuma; Akihiro Yamaguchi, all of Kanagawa, Japan

[73] Assignee: Mitsui Toatsu Chemical, Incorporated, Tokyo, Japan

[21] Appl. No.: 35,043

[22] Filed: Mar. 22, 1993

[30] Foreign Application Priority Data

| Apr. 2, 1992 | [JP] | Japan | 4-080210 |
| Apr. 22, 1992 | [JP] | Japan | 4-102818 |
| Jun. 19, 1992 | [JP] | Japan | 4-160806 |
| Jun. 19, 1992 | [JP] | Japan | 4-160807 |
| Oct. 14, 1992 | [JP] | Japan | 4-275916 |

[51] Int. Cl.$^5$ .................. C08F 283/04; C08G 73/10; C08G 69/48
[52] U.S. Cl. .................. 525/420; 525/422; 528/125; 528/126; 528/128; 528/170; 528/171; 528/172; 528/173; 528/176; 528/183; 528/185; 528/188; 528/220; 528/226; 528/229; 528/322; 528/331; 528/350; 528/352; 528/353; 528/351
[58] Field of Search ............... 525/420, 422; 528/353, 528/125, 126, 128, 170, 171, 172, 173, 176, 183, 185, 188, 220, 229, 226, 331, 352, 322

[56] References Cited

U.S. PATENT DOCUMENTS

| 5,041,520 | 8/1991 | Ohta et al. | 528/125 |
| 5,196,506 | 3/1993 | Tamai et al. | 528/353 |
| 5,210,174 | 5/1993 | Tamai et al. | 528/353 |

FOREIGN PATENT DOCUMENTS

| 61-143478 | 7/1986 | Japan . |
| 62-68817 | 3/1987 | Japan . |
| 62-86021 | 4/1987 | Japan . |
| 62-235381 | 10/1987 | Japan . |
| 63-128025 | 5/1988 | Japan . |
| 3-160024 | 7/1991 | Japan . |

*Primary Examiner*—John Kight, III
*Assistant Examiner*—P. Hampton-Hightower
*Attorney, Agent, or Firm*—Burns, Doane, Swecker & Mathis

[57] ABSTRACT

A thermoplastic resin composition comprise 99.9~50 parts by weight of one or more thermoplastic resin selected from the group consisting of aromatic polyimide, aromatic polyetherimide, aromatic polyamideimide, aromatic polyethersulfone and aromatic polyether ketone and 0.1~50 parts by weight of one or more liquid crystal type aromatic polyimide having recurring structural units represented by the formula (1):

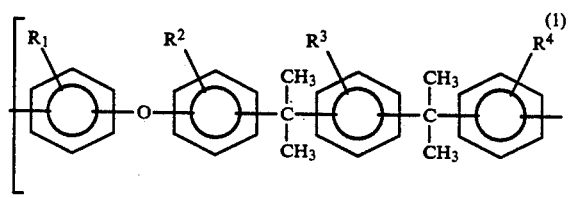
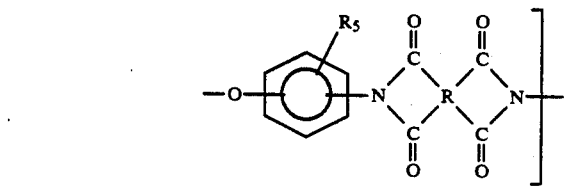

wherein $R_1$~$R_5$ is a hydrogen atom, fluorine atom, trifluoromethyl, methyl, ethyl or cyano and may be the same or different, and R is a tetravalent radical having 6~27 carbon atoms and being selected from the group consisting of a monoaromatic radical, condensed polyaromatic radical and noncondensed aromatic radical connected each other with a direct bond or a bridge member.

The present invention can provide thermoplastic resin compositions which have remarkably good processability and excellent thermal stability in addition to essentially excellent properties of each resin.

14 Claims, No Drawings

POLYIMIDE COMPOSITION

BACKGROUND OF THE INVENTION

1. Field of the Invention

The present invention relates to a thermoplastic resin composition having improved melt-processability and particularly relates to a melt-processable aromatic polyimide resin composition and a readily melt-processable aromatic polysulfone resin composition, aromatic polyetherimide resin composition, aromatic polyamideimide resin composition and aromatic polyetherketone resin composition. More particularly, the invention relates to a thermoplastic resin composition having improved melt-processability obtained by mixing liquid crystal type aromatic polyimide with aromatic polyimide having excellent heat resistance, chemical resistance and mechanical strength, aromatic polysulfone having excellent mechanical strength, aromatic polyetherimide having excellent heat resistance, aromatic polyamideimide having excellent heat resistance and mechanical strength, or aromatic polyetherketone having excellent heat resistance and mechanical strength.

2. Prior Art of the Invention

Many thermoplastic resins having excellent heat resistance have been conventionally developed. In these resins, polyimide is excellent in mechanical strength and dimensional stability in addition to high heat resistance, and also has flame retardance and electrical insulation property. Thus, polyimide has been used in the fields of electric and electronic appliances, space, and aeronautic equipment and transport machinery and is expected in the future to be used in various fields where heat resistance is required.

Various polyimides having excellent characteristics have been conventionally developed. Proger et al. have disclosed in U.S. Pat. No. 4,065,345 polyimide having recurring structural units of the formula (A):

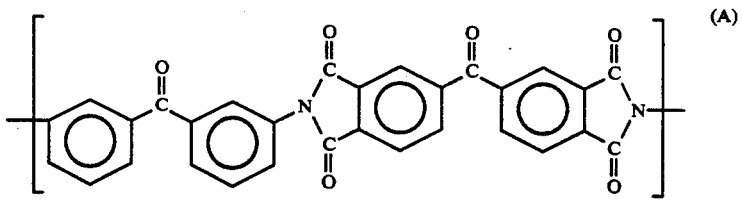

The polyimide is excellent in mechanical property, thermal property, electrical property, solvent resistance and heat resistance, and has also been known as polyimide having melt-flowability. However, extrusion forming and injection molding of the polyimide is difficult because the polyimide has higher melt viscosity as compared with other common engineering plastics which can be extruded or injection molded.

The present inventors have also found polyimide which is excellent in mechanical properties, thermal property, electrical property and solvent resistance, has heat resistance, and has recurring structural units represented by the formula (B):

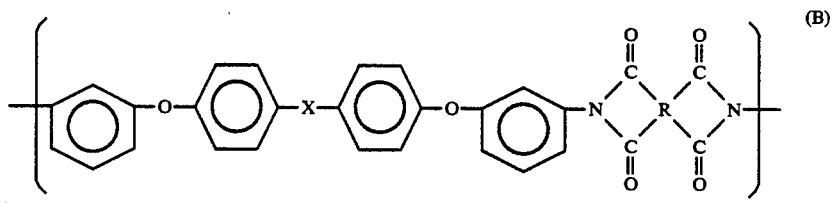

wherein X is a radical selected from the group consisting of a direct bond, divalent hydrocarbon having 1~10 carbon atoms, hexafluorinated isopropylidene, carbonyl, thio and sulfonyl, and R is a tetravalent radical selected from the group consisting of an aliphatic radical having 2~27 carbon atoms, alicyclic radical, monoaromatic radical, condensed polyaromatic radical and noncondensed aromatic radical connected each other with a direct bond or bridge member (Japanese Laid-Open Patent Sho 61-143478, 62-68817, 62-86021, 62-235381 and 63-128025).

The above polyimide resins are novel thermoplastic resins having good properties which are essential for polyimide.

For example, in the polyimide of the formula (B), polyimide having recurring structural units of the formula (6):

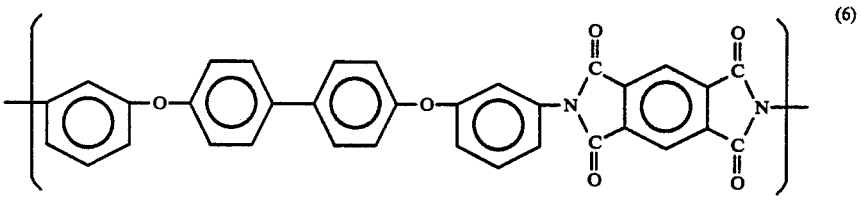

has a glass transition temperature (hereinafter referred to simply as Tg) of 260° C., crystallization temperature (hereinafter referred to simply as Tc) of 310°~340° C. and crystal melting point (hereinafter referred to simply as Tm) of 367°~385° C., and is crystalline polyimide which is melt processable and excellent in chemical resistance. However, a high temperature close to 400° C. is required for processing the polyimide because of high Tm of 367°~385° C.

Polyimide is much superior in heat resistance and other properties and still inferior in processability to common engineering plastics such as polyethylene terephthalate, polybutylene terephthalate, polyethersulfone, polysulfone, polyphenylene sulfide, polyether ether ketone and polyetherimide.

Some known polyimide has no distinct glass transition temperature though excellent in heat resistance and hence must be processed by such means as sinter molding when the polyimide is used for a molding material. Other known polyimide has a low glass transition temperature and is soluble in halogenated hydrocarbon solvent though excellent in processability and hence is unsatisfactory in view of resistance to heat and solvent. Both merits and drawbacks have thus been found in the properties of known polyimide.

Further, aromatic polysulfone, aromatic polyetherimide, aromatic polyamideimide and aromatic polyether ketone are excellent in mechanical strength and dimensional stability in addition to high heat resistance and also have flame retardance and electrical insulation property. Thus, these plastics are used in the field of electric and electronic appliances, space and aeronautic equipment and transport machinery and are expected to be used in various fields in the future where heat resistance is required. Aromatic polysulfone is an engineering plastic having good processability. However, aromatic polyetherimide, aromatic polyamideimide and aromatic polyether ketone which are called super engineering plastics have problems in processability and are desired to have good processability while maintaining high heat resistance.

On the other hand, liquid crystal type high polymers are classified into thermotropic liquid crystal and lyotropic liquid crystal. Conventionally known liquid crystal type high polymers are polyester, polyesteramide and polyazomethine which are thermotropic liquid crystals and polyamide and polybenzothiazole which are lyotropic liquid crystals. However, polyimide exhibiting liquid crystal property has been quite unknown.

Consequently, a resin composition obtained by mixing liquid crystal type polyimide with polyimide or other thermoplastic resins has been quite unknown.

SUMMARY OF THE INVENTION

The object of the invention is to provide a resin composition having improved processability without impairing essentially excellent characteristics of thermoplastic resin.

Practically, the first object of the invention is to provide an aromatic polyimide based thermoplastic resin composition having improved processability without impairing essentially excellent heat resistance of aromatic polyimide by adding liquid crystal type aromatic polyimide having good flowability to conventional aromatic polyimide.

The second object of the invention is to provide an aromatic polysulfone based thermoplastic resin composition having improved processability without impairing essentially excellent heat resistance of aromatic polysulfone by adding liquid crystal type aromatic polyimide having good flowability to conventional aromatic polysulfone.

The third object of the invention is to provide an aromatic polyetherimide based thermoplastic resin composition having improved processability without impairing essentially excellent heat resistance of aromatic polyetherimide by adding liquid crystal type aromatic polyimide having good flowability to conventional aromatic polyetherimide.

The fourth object of the invention is to provide an aromatic polyamideimide based thermoplastic resin composition having improved processability without impairing essentially excellent heat resistance and mechanical properties of aromatic polyamideimide by adding liquid crystal type aromatic polyimide having good flowability to conventional aromatic polyamideimide.

The fifth object of the invention is to provide an aromatic polyether ketone based thermoplastic composition having improved processability without impairing essentially excellent heat resistance and mechanical properties of aromatic polyether ketone by adding liquid crystal type aromatic polyimide having good flowability to conventional aromatic polyether ketone.

As a result of an intensive investigation in order to achieve these objects, the present inventors have found that a thermoplastic resin composition obtained by mixing liquid crystal type aromatic polyimide with aromatic polyimide, aromatic polysulfone, aromatic polyetherimide, aromatic polyamideimide or aromatic polyether ketone has improved processability without impairing essentially excellent properties of each resin, and thus have completed the invention.

That is, the present inventors have developed an aromatic polyimide having recurring structural units of the formula (4):

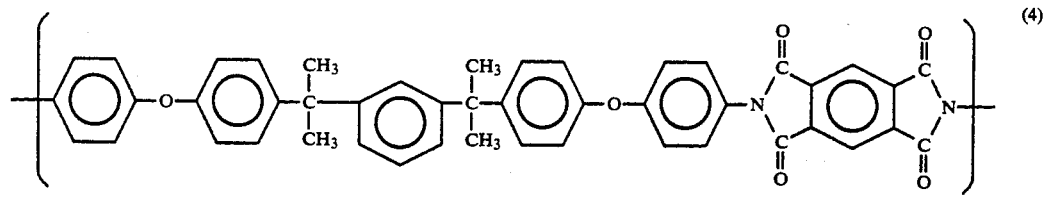

(Japanese Laid-Open Patent Hei 03-160024.)

Thereafter, the inventors have found that the aromatic polyimide exhibits liquid crystal property in the temperature range of 270°~300° C. The liquid crystal property of the aromatic polyimide could be confirmed by observation under a polarization microscope. When the above aromatic polyimide was heated at a temperature increase rate of 10° C./min on a hot plate equipped with a polarization microscope, Model BHS-751P (Trade Mark of OLYMPUS OPTICAL Co.), polarized light was observed in the temperature range 270°~300° C.

When the above polyimide was measured by DSC(Differential Scanning Calorimetry) with a DT-series, DSC-41M (Trade Mark of Shimadzu Co.) at a temperature increase rate of 10° C./min, two heat absorption peaks were observed at around 275° C. and around 295° C. It was confirmed that the liquid crystal property was exhibited in the temperature range between the two heat absorption peaks. Further, the aromatic polyimide which has a temperature between the two heat absorption peaks exhibits liquid crystal property and additionally has a very low melt viscosity in a molten state and is excellent in processability.

As a result of mixing the aromatic polyimide which exhibits liquid crystal property with aromatic polyimide or other thermoplastic resin which is required to improve processability, the present inventors have found that processability of these resins can be improved, and have completed the invention.

That is, the present invention is a melt-processable thermoplastic resin composition comprising a liquid crystal type aromatic polyimide and other aromatic polyimide or other thermoplastic resin.

The present invention includes the following aspects.

1. A thermoplastic resin composition having good processability, comprising 99.9~50 parts by weight of one or more thermoplastic resin and 0.1~50 parts by weight of one or more liquid crystal type aromatic polyimide.

2. A thermoplastic resin composition having good processability, comprising 99.9~50 parts by weight of one or more thermoplastic resin and 0.1~50 parts by weight of one or more liquid crystal type aromatic polyimide having recurring structural units represented by the formula (1):

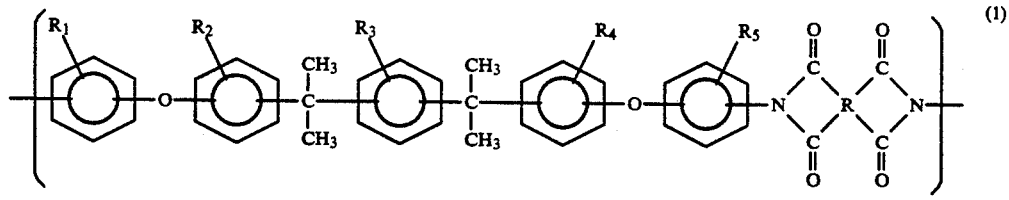

wherein $R_1$~$R_5$ is a hydrogen atom, fluorine atom, trifluoromethyl, methyl, ethyl or cyano and may be the same or different, and R is a tetravalent radical having 6~27 carbon atoms and being selected from the group consisting of a monoaromatic radical, condensed polyaromatic radical and noncondensed aromatic radical connected each other with a direct bond or a bridge member.

3. The thermoplastic resin composition as described in 2. wherein the liquid crystal type aromatic polyimide has a fundamental skeleton having recurring structural units of the formula (4):

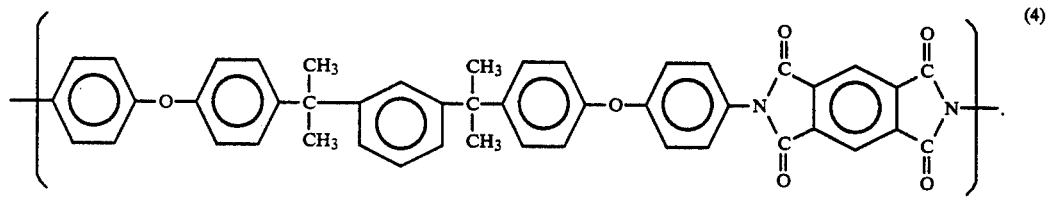

4. The thermoplastic resin composition as described in 1. wherein the liquid crystal type aromatic polyimide is a copolymer comprising 1~99% by mol of the fundamental skeleton having recurring structural units of the formula (4):

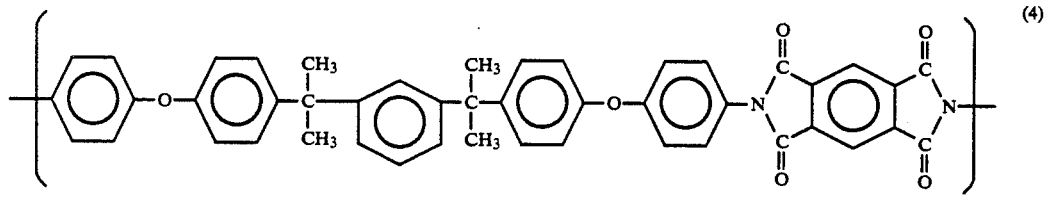

and 1~99% by mol of the fundamental skeleton having recurring structural units of formula (1) [formula (4), exclusive]:

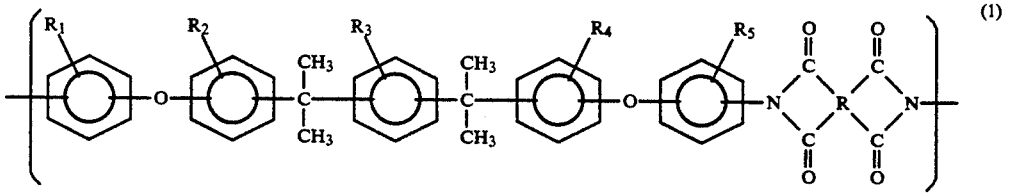

wherein $R_1$~$R_5$ is a hydrogen atom, fluorine atom, trifluoromethyl, methyl, ethyl or cyano and may be the same or different, and R is a tetravalent radical having 6~27 carbon atoms and being selected from the group consisting of a monoaromatic radical, condensed polyaromatic radical and noncondensed aromatic radical connected each other with a direct bond or a bridge member.

5. The thermoplastic resin composition as described in 1 wherein the thermoplastic resin is one or more resin selected from the group consisting of aromatic polyimide, aromatic polyetherimide, aromatic polyamideimide, aromatic polyethersulfone and aromatic polyether ketone.

6. The thermoplastic resin composition as described in 5 wherein the aromatic polyimide comprises a fundamental skeleton having recurring structural units represented by the formula (5):

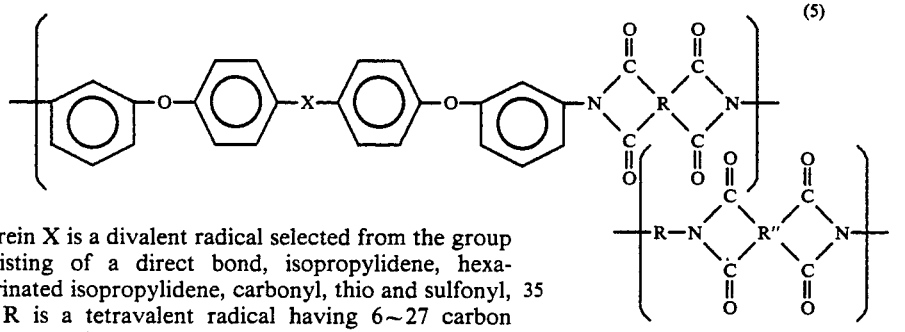

wherein X is a divalent radical selected from the group consisting of a direct bond, isopropylidene, hexafluorinated isopropylidene, carbonyl, thio and sulfonyl, and R is a tetravalent radical having 6~27 carbon atoms and being selected from the group consisting of a monoaromatic radical, condensed polyaromatic radical and noncondensed aromatic radical connected each other with a direct bond or a bridge member.

7. The thermoplastic resin composition as described in 5 wherein the aromatic polyimide comprises a fundamental skeleton having recurring structural units of the formula (6):

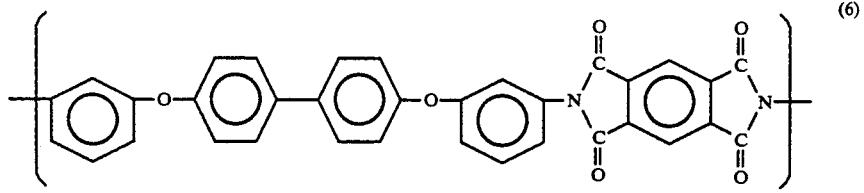

8. The thermoplastic resin composition as described in 5 wherein the aromatic polyimide comprises a fundamental skeleton having recurring structural units of the formula (7):

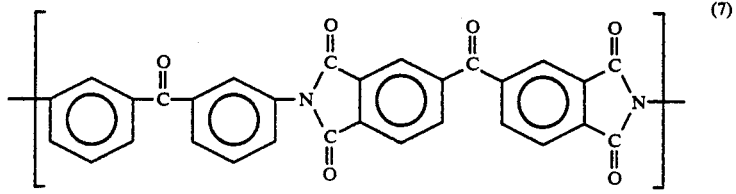

9. The thermoplastic resin composition as described in 5 wherein the aromatic polyimide is a copolymer comprising 99~1% by mol of a fundamental skeleton having recurring structural units of the formula (6):

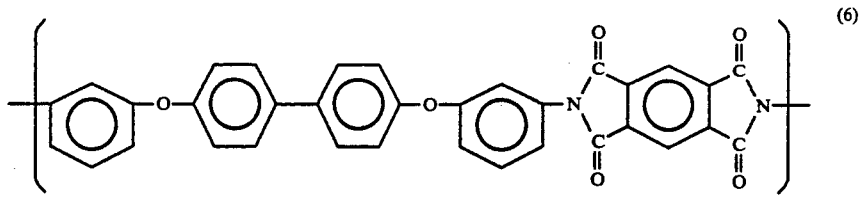

and 1~99% by mol of a fundamental skeleton having recurring structural units of the formula (8) [the formula (6), exclusive]:

(8)

wherein R is

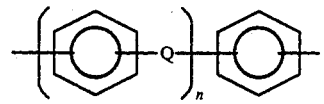

wherein n is an integer of 0, 1, 2, or 3; Q is a direct bond, —O—, —S—, —CO—, —SO$_2$—, —CH$_2$—, —C(CH$_3$)$_2$— or —C(CF$_3$)$_2$— and may be the same or different when two or more Q connects three or more aromatic rings each other; and R" is one or more tetravalent radicals selected from the group consisting of

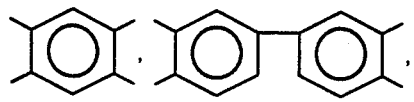

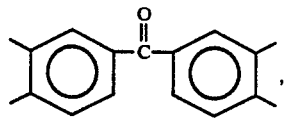

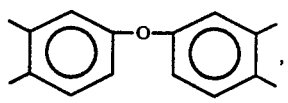

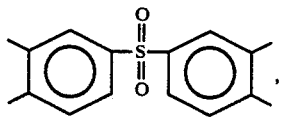

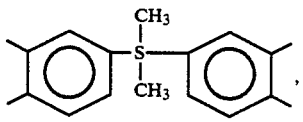

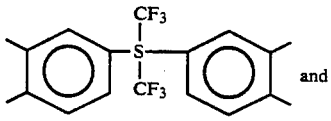

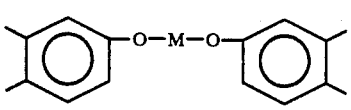

wherein M is one or more divalent radicals selected from the group consisting of

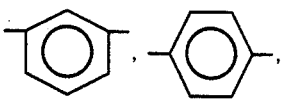

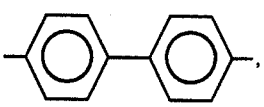

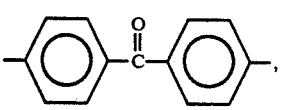

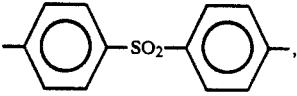

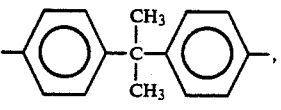

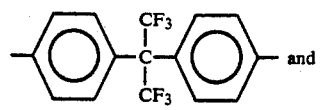

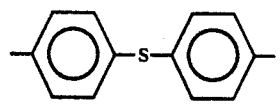

and particularly a thermoplastic resin composition wherein the fundamental skeleton having recurring structural units of the formula (8) comprises recurring structural units represented by the following formula [the formula (6), exclusive]:

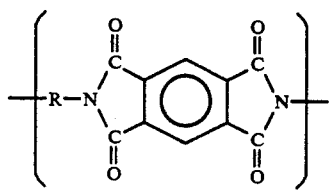

wherein R is the same as above.

10. The thermoplastic resin composition as described in 5 wherein the aromatic polysulfone comprises a fundamental skeleton having one or more recurring structural units represented by the formula (11):

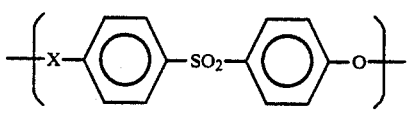

(11)

wherein X is a direct bond,

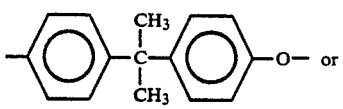

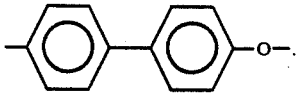

11. The thermoplastic resin composition as described in 5 wherein the aromatic polyimide is an aromatic polyetherimide comprising a fundamental skeleton having one or more recurring structural units represented by the formula (12):

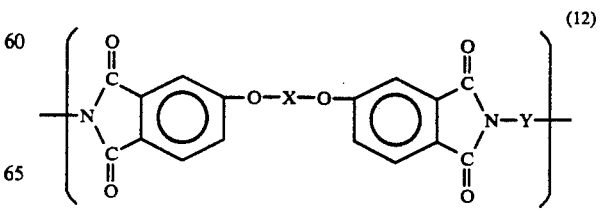

(12)

wherein X is

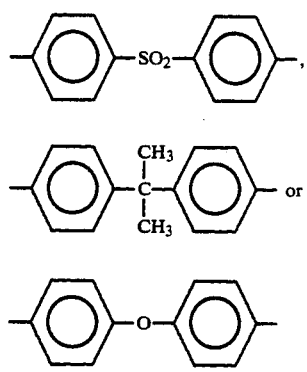

and Y is

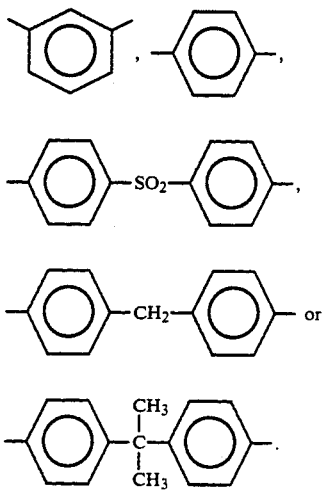

12. The thermoplastic resin composition as described in 5 wherein the aromatic polyamideimide comprises a fundamental skeleton having one or more recurring structural units represented by the formula(D).

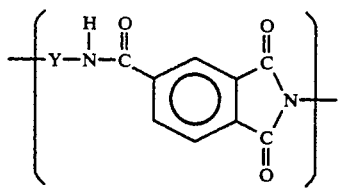

wherein Y is a divalent radical having 6~27 carbon stoms, and particularly one or more recurring structural units of the formulas (13):

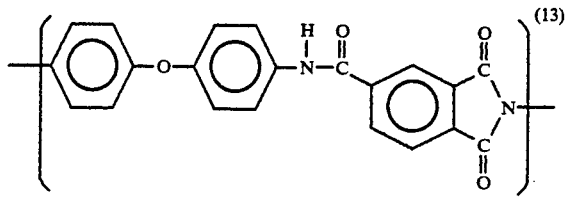

and/or the formula (14):

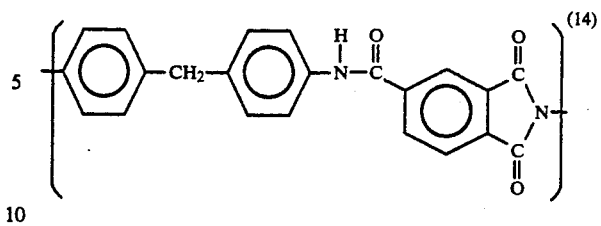

13. The thermoplastic resin composition as described in 5 wherein the aromatic polyaether ketone comprises a fundamental skeleton having recurring structural units of the formula (15):

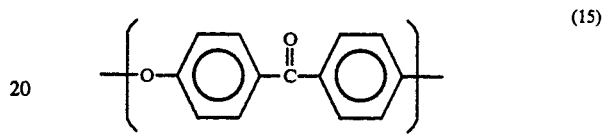

and/or the formula (16):

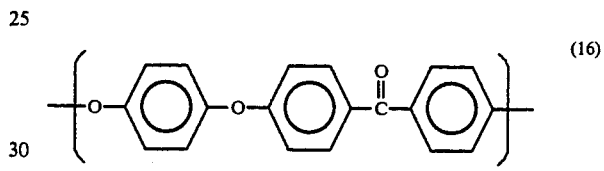

14. A thermoplastic resin composition as described in 1 to 9 wherein the aromatic polyimide and/or the liquid crystal type aromatic polyimide are capped at the polymer chain end thereof with aromatic dicarboxylic anhydride of the formula (2):

wherein Z is a divalent radical having 6~15 carbon atoms and being selected from a monoaromatic radical, condensed polyaromatic radical, and noncondensed aromatic radical connected each other with a direct bond or a bridge member and/or aromatic amine of the formula (3):

wherein V is a monovalent radical having 6~15 carbon atoms and being selected from a monoaromatic radical, condensed polyaromatic radical and noncondensed aromatic radical connected each other with a direct bond or a bridge member, and preferably by capping the polymer chain end with phthalic anhydride and/or aniline.

The present invention can provide thermoplastic resin compositions which have remarkably good processability and excellent thermal stability in addition to essentially excellent properties of each resin.

DETAILED DESCRIPTION OF THE INVENTION

The liquid crystal type polyimide used in the invention exhibits liquid crystal property such as thermotropic liquid crystal and lyotropic liquid crystal.

The liquid crystal type polyimide includes, for example, whole aromatic polyimide which exhibits liquid crystal property and is represented by the formula (1):

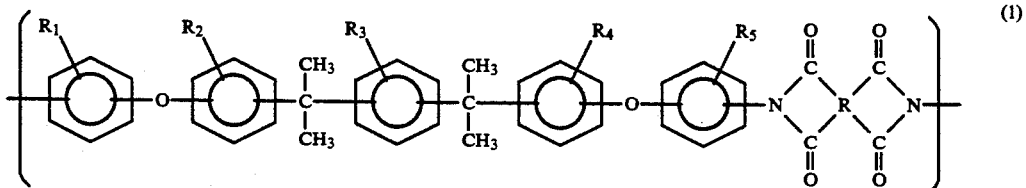

wherein $R_1 \sim R_5$ are a hydrogen atom, fluorine atom, trifluoromethyl, methyl, ethyl or cyano and may be the same or different, and R is a tetravalent radical having $2 \sim 27$ carbon atoms and being selected from the group consisting of a monoaromatic radical, condensed polyaromatic radical and noncondensed aromatic radical connected to each other with a direct bond or a bridge member.

Preferred liquid crystal type polyimide includes liquid crystal type aromatic polyimide of the formula (4):

same or different, and R is a tetravalent radical having $6 \sim 27$ carbon atoms and being selected from the group consisting of a monoaromatic radical, condensed polyaromatic radical and noncondensed aromatic radical connected to each other with a direct bond or a bridge member.

Other preferred polymers include liquid crystal type aromatic polyimide and a liquid crystal type aromatic polyimide copolymer which are obtained by capping the polymer chain end of homopolymer or copolymer of liquid crystal type aromatic polyimide with aromatic dicarboxylic anhydride of the formula (2):

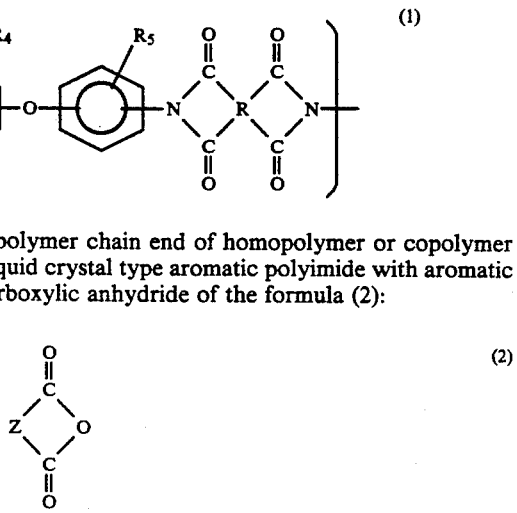

wherein Z is a divalent radical having $6 \sim 15$ carbon atoms and being selected from the group consisting of a monoaromatic radical, condensed polyaromatic radical and noncondensed aromatic radical connected to each

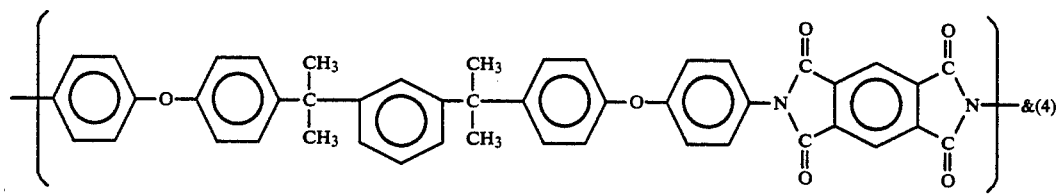

or a liquid crystal type aromatic polyimide copolymer comprising $1 \sim 99\%$ by mol of the fundamental skeleton having recurring structural units of the formula (4):

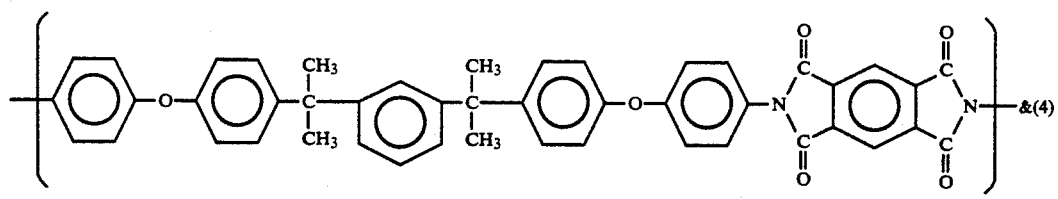

and $1 \sim 99\%$ by mol of the fundamental skeleton having recurring structural units of the formula (1) [formula (4); exclusive]:

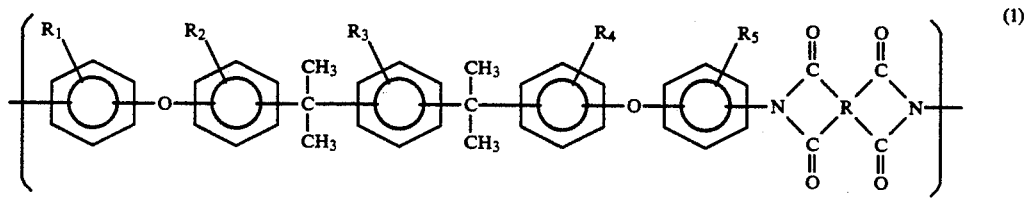

wherein $R_1 \sim R_5$ are a hydrogen atom, fluorine atom, trifluoromethyl, methyl, ethyl or cyano and may be the other with a direct bond or a bridge member, and/or aromatic monoamine of the formula (3):

$$V-NH_2 \quad (3)$$

wherein V is a monovalent radical having 6~15 carbon atoms and being selected from the group consisting of a monoaromatic radical, condensed polyaromatic radical and noncondensed aromatic radical connected each a direct bond or a bridge member.

Such liquid crystal type aromatic polyimide can be prepared by reacting one or more aromatic diamine represented by the formula (17) below with one or more aromatic tetracarboxylic dianhydride represented by the formula (19) and by thermally or chemically imidizing the resultant polyamic acid.

The aromatic diamines used in the process are represented by the formula (17):

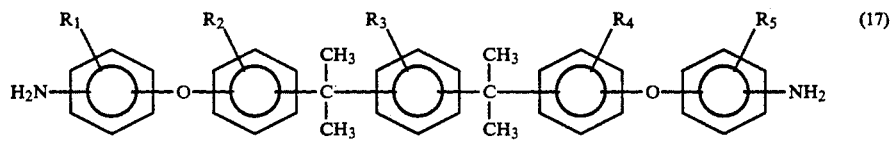
(17)

wherein $R_1 \sim R_5$ are the same as in the formula (1), and include, for example, 1,3- or 1,4-bis[4-(4-aminophenoxy)-α,α-dimethylbenzyl]benzene,
1,3- or 1,4-bis[4-(3-aminophenoxy)-α,α-dimethylbenzyl]benzene,
1,3- or 1,4-bis[4-(4-amino-6-methylphenoxy)-α,α-dimethylbenzyl]benzene,
1,3- or 1,4-bis[4-(4-amino-6-fluorophenoxy)-α,α-dimethylbenzyl]benzene,
1,3- or 1,4-bis[4-(4-amino-6-trifluoromethylphenoxy)-α,α-dimethylbenzyl] benzene,
1,3- or 1,4-bis[4-(4-aminophenoxy)-3-dimethyl-α,α-dimethylbenzyl]benzene,
1,3- or 1,4-bis[4-(4-amino-6-methylphenoxy)-3-dimethyl-α,α-dimethylbenzyl]benzene,
1,3- or 1,4-bis[4-(3-amino-6-methylphenoxy)-3-dimethyl-α,α-dimethylbenzyl]benzene,
1,3- or 1,4-bis[4-(4-amino-6-trifluoromethylphenoxy)-3,5-dimethyl-α,α-dimethylbenzyl]benzene and
1,3- or 1,4-bis[4-(4-amino-6-cyanophenoxy)-α,α-dimethylbenzyl]benzene.

These diamines are used singly or as a mixture.

Particular preferred diamine is 1,3-bis[4-(4-aminophenoxy)-2,2-dimethylbenzyl]benzene having the formula (18):

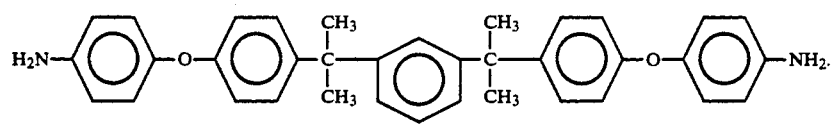
(18)

When two or more diamines are used as a mixture, the above liquid crystal type aromatic polyimide copolymer can be obtained by simultaneously using the diamine of the formula (18) and other diamines.

These aromatic diamines can be prepared by conducting usual reduction of corresponding nitro compounds, respectively, in the presence of a base in an aprotic polar solvent.

Tetracarboxylic acid dianhydrides used in the invention are represented by the formula (19):

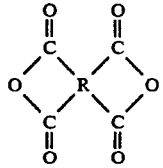
(19)

wherein R is a tetravalent radical having 6~27 carbon atoms and being selected from the group consisting of a monoaromatic radical, condensed polyaromatic radical and noncondensed aromatic radical connected to each other with a direct bond or a bridge member.
Exemplary dianhydrides include
pyromellitic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride,
bis(2,3-dicarboxyphenyl)ether dianhydride,
bis(3,4-dicarboxyphenyl)ether dianhydride,
bis(2,3-dicarboxyphenyl)sulfone dianhydride,
bis(2,3-dicarboxyphenyl)methane dianhydride,
bis(3,4-dicarboxyphenyl)methane dianhydride.
1,1-bis(2,3-dicarboxyphenyl)ethane dianhydride,
1,1-bis(3,4-dicarboxyphenyl)ethane dianhydride,
1,2-bis(2,3-dicarboxyphenyl)ethane dianhydride,
1,2-bis(3,4-dicarboxyphenyl)ethane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride,
1,2,7,8-phenanthrenetetracarboxylic dianhydride,
2,2-bis[4- {3-(1,2-dicarboxy)phenoxy} phenyl]propane dianhydride,
bis[4- {(4-(1,2-dicarboxy)phenoxy} phenyl]ketone dianhydride,
bis[4- {(3-(1,2-dicarboxy)phenoxy} phenyl]ketone dianhydride,
bis[4- {4-(1,2-dicarboxy)phenoxy} phenyl]sulfone dianhydride, bis[4- {3-(1,2-dicarboxy)phenoxy} phenyl]sulfone dianhydride,
4,4-bis[4-(1,2-dicarboxy)phenoxy] biphenyl dianhydride,
4,4-bis[3-(1,2-dicarboxy)phenoxy] biphenyl dianhydride,
2,2-bis[4- {4-(1,2-dicarboxy)phenoxy} phenyl]sulfide dianhydride,
2,2-bis[4- {3-(1,2-dicarboxy)phenoxy} phenyl]sulfide dianhydride,
2,2-bis[4- {4-(1,2-dicarboxy)phenoxy} phenyl]-1,1,1,3,3,3-hexafluoropropane dianhydride,
2,2-bis[4- {3-(1,2 dicarboxy)phenoxy} phenyl]-1,1,1,3,3,3-hexafluoropropane dianhydride,
1,3-bis[4-(1,2-dicarboxy)phenoxy]benzene dianhydride,
1,3-bis[3-(1,2-dicarboxy)phenoxy]benzene dianhydride,
1,4-bis[4-(1,2-dicarboxy)phenoxy]benzene dianhydride,
1,4-bis3-(1,2-dicarboxy)phenoxy]benzene dianhydride,
1,3-bis[4- {(1,2-dicarboxy)-α,α-dimethyl} benzyl]benzene dianhydride,
1,3-bis[3- {(1,2-dicarboxy)-α,α-dimethyl} benzyl]benzene dianhydride,
1,4-bis[4- {(1,2-dicarboxy)-α,α-dimethyl} benzyl]benzene dianhydride and
1,4-bis[3- {(1,2-dicarboxy)-α,α-dimethyl} benzyl]benzene dianhydride.

These aromatic tetracarboxylic dianhydrides can be used singly or as a mixture. Pyromellitic dianhydride is preferred in particular.

The liquid crystal type aromatic polyimide for use in the invention can be prepared by using the diamines of the formula (17) and the tetracarboxylic acid dianhydrides of the formula (19) as main components.

One or more of other diamines and tetracarboxylic acid dianhydrides can also be added to the polymerization reaction in the range giving no adverse effect on the liquid crystal property and other physical properties of resultant liquid crystal type aromatic polyimide.

Other diamines which can be used in combination include, for example, m-phenylenediamine, o-phenylenediamine, p-phenylenediamine, m-aminobenzylamine, o-aminobenzylamine, 3-chloro-1,2-phenylenediamine, 4-chloro-1,2-phenylenediamine, 2,3-diaminotoluene, 2,4-diaminotoluene, 2,5-diaminotoluene, 2,6-diaminotoluene, 3,4-diaminotoluene, 3,5-diaminotoluene, 2-methoxy-1,4-phenylenediamine, 4-dimethoxy-1,2-phenylenediamine, 4-methoxy-1,3-phenylenediamine, benzidine, 3,3-dimethylbenzidine, 3,3′-dimethoxybenzidine, 3,3′-diaminodiphenyl ether, 3,4′-diaminodiphenyl ether, 4,4′-diaminodiphenyl ether, 3,3′-diaminodiphenyl sulfide, 3,4′-diaminodiphenyl sulfide, 4,4′-diaminodiphenyl sulfide, 3,3′-diaminodiphenyl sulfone, 3,4′-diaminodiphenyl sulfone, 4,4′-diaminodiphenyl sulfone, 3,4′-diaminodiphenyl methane, 4,4′-diaminodiphenyl methane, 3,3′-diaminobenzophenone, 3,4′-diaminobenzophenone, 4,4′-diaminobenzophenone, 2,2-bis(4-aminophenyl)propane, 2,2-bis(3-aminophenyl)propane, 2-(3-aminophenyl)-2-(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 2-(3-aminophenyl)-2-(4-aminophenyl)-1,1,1,3,3,3-hexafluoropropane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,4-bis(3-aminobenzoyl)benzene, 1,3-bis(4-aminobenzoyl)benzene, 1,4-bis(4-aminobenzoyl)benzene, 1,3-bis(3-amino-α,α-dimethylbenzoyl)benzene, 1,4-bis(3-amino-α,α-dimethylbenzoyl)benzene, 1,3-bis(4-amino-α,α-dimethylbenzoyl)benzene, 1,4-bis(4-amino-α,α-dimethylbenzoyl)benzene, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 1,1-bis[4-(3-aminophenoxy)phenyl]propane, 1,1-bis[4-(4-aminophenoxy)phenyl]propane, 1,2-bis[4-(3-aminophenoxy)phenyl]propane, 1,2-bis[4-(4-aminophenoxy)phenyl]propane, 1,3-bis[4-(3-aminophenoxy)phenyl]propane, 1,3-bis[4-(4-aminophenoxy)phenyl]propane, 2,2-bis[4-(3-aminophenoxy)phenyl]propane, 2,2-bis[4-(4-aminophenoxy)phenyl]propane, 1,1-bis[4-(3-aminophenoxy)phenyl]butane, 1,1-bis[4-(4-aminophenoxy)phenyl]butane, 1,2-bis[4-(3-aminophenoxy)phenyl]butane, 1,2-bis[4-(4-aminophenoxy)phenyl]butane, 1,3-bis[4-(3-aminophenoxy)phenyl]butane, 1,3-bis[4-(4-aminophenoxy)phenyl]butane, 1,4-bis[4-(3-aminophenoxy)phenyl]butane, 1,4-bis[4-(4-aminophenoxy)phenyl]butane, 2,2-bis[4-(3-aminophenoxy)phenyl]butane, 2,2-bis[4-(4-aminophenoxy)phenyl]butane, 2,3-bis[4-(3-aminophenoxy)phenyl]butane, 2,3-bis[4-(4-aminophenoxy)phenyl]butane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 4,4′-bis(3-aminophenoxy)biphenyl, 4,4′-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone and bis[4-(4-aminophenoxy)phenyl]sulfone. These diamines can be used singly or as a mixture.

The liquid crystal type aromatic polyimide used in the invention is a homopolymer having the recurring structural units of the formula (1) or the formula (4) which is prepared as above by using the aromatic diamine and the aromatic tetracarboxylic dianhydride as monomer components and a copolymer having a combination of the recurring structural units of the formula (1) and the formula (4). Also included is polyimide having at the polymer chain end thereof an aromatic ring which is unsubstituted or substituted with a radical having no reactivity for amine and dicarboxylic anhydride.

The liquid crystal type aromatic polyimide having at the polymer chain end thereof an aromatic ring which is unsubstituted or substituted with a radical having no reactivity for amine and dicarboxylic anhydride can be prepared by reacting aromatic diamine represented by the formula (18):

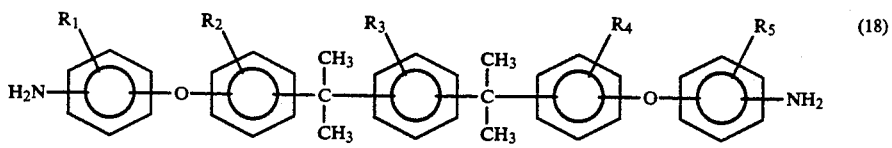

wherein $R_1 \sim R_5$ are the same as above, for example, 1,3-bis[4-(4 aminophenoxy)-α, α-dimethylbenzol]benzene with aromatic tetracarboxylic dianhydride of the formula (19):

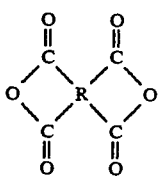

(19)

wherein R is the same as above, for example, pyromellitic dianhydride in the presence of aromatic dicarboxylic anhydride Of the formula (2):

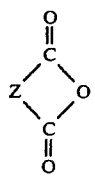

(2)

wherein Z is the same as above, and/or aromatic monoamine of the formula (3):

 V—NH$_2$ (3)

wherein V is the same as above.

Exemplary aromatic dicarboxylic anhydrides of the formula (2) include phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride. These dicarboxylic acid anhydrides can be substituted with a radical having no reactivity for amine and dicarboxylic anhydride and can be used singly or as a mixture. Phthalic anhydride is most preferred in view of properties and utility of polyimide and liquid crystal type polyimide to be obtained.

The amount of aromatic dicarboxylic anhydride used is 0.001~1.0 mol per mol of the diamine of the formula (18). An amount less than 0.001 mol leads to viscosity increase processing at high temperatures and causes deterioration of processability. On the other hand, an amount exceeding 1.0 mol results in lowered mechanical properties. Preferred amount is in the range of 0.01 to 0.5 mol.

Aromatic monoamines of the formula (3) includes, for example, aniline, o-toluidine, m-toluidine, p-toluidine, 2,3-xylidine, 2,6-xylidine, 3,4-xylidine, 3,5-xylidine, o-chloro-aniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene, and 9-aminoanthracene. These aromatic monoamines can be substituted with a radical having no reactivity for amine or dicarboxylic anhydride, and can be used singly or as a mixture.

The amount of aromatic monoamine is 0.001~1.0 mol per mol of the aromatic tetracarboxylic dianhydride of the above formula (19). An amount less than 0.001 mol leads to viscosity increase in processing at high temperatures and causes deterioration of processability. On the other hand, an amount exceeding 1.0 mol results in lowered mechanical properties. Preferred amount is in the range of 0.0~10.5 mol.

The liquid crystal type aromatic used in the invention can be prepared by any known processes. Following processes can be exemplified.

(A) A process for preparing aromatic polyamic acid in an organic solvent, isolating the aromatic polyamic acid by removing the solvent under reduced pressure or by pouring the resulting aromatic polyamic acid solution into a lean solvent, and imidizing the polyamic acid by heating to obtain liquid crystal type aromatic polyimide.

(B) A process for preparing an aromatic polyamic acid solution by the same procedures as (A), chemically imidizing polyamic acid by addition of a dehydrating agent such as acetic anhydride optionally in the presence of a catalyst, successively isolating resultant aromatic polyimide by known procedures and if desired, washing and drying the aromatic polyimide.

(C) A process for preparing an aromatic polyamic acid solution by the same procedures as (A) and successively conducting solvent removal and thermal imidization at the same time by heating under reduced pressure.

(D) A process for mixing raw material and solvents, and simultaneously conducting preparation of aromatic polyamic acid and imidization reaction thereof by heating optionally in the presence of a catalyst, azeotropic agent or dehydrating agent.

In preparing the liquid crystal type aromatic polyimide by these processes, it is particularly preferred to carry out the reaction in an organic solvent.

Organic solvents which can be used include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethyl urea, hexamethylphosphoramide, phenol, o-cresol, m-cresol, p-cresol, m-cresylic acid, p-chlorophenol, xylenols and anisole. These solvents can be used singly or as a mixture.

When the liquid crystal type aromatic polyimide is prepared in the presence of aromatic dicarboxylic anhydride or aromatic monoamine in order to cap the polymer chain end, aromatic diamines, aromatic tetracarboxylic dianhydride, and aromatic dicarboxylic anhydride or aromatic monoamine are charged and reacted in the organic solvent by the following methods.

(1) A method for reacting aromatic tetracarboxylic dianhydride with aromatic diamine and successively adding dicarboxylic anhydride or aromatic monoamine to continue the reaction.

(2) A method for reacting aromatic diamine with aromatic dicarboxylic anhydride and successively adding aromatic tetracarboxylic dianhydride to continue the reaction. Alternatively, a method for reacting aromatic tetracarboxylic dianhydride with aromatic monoamine and successively adding aromatic diamine to continue the reaction.

(3) A method for simultaneously charging aromatic tetracarboxylic dianhydride, aromatic diamine and aromatic dicarboxylic anhydride or aromatic monoamine to carry out the reaction.

Any of the above methods can be employed for progressing the reaction.

In these methods, the reaction temperature for polymerization and imidization is 300° C. or less. No particular limitation is imposed upon the reaction pressure and the reaction can be sufficiently carried out under atmospheric pressure.

The reaction time differs depending upon aromatic diamine, aromatic tetracarboxylic dianhydride, solvent and reaction temperature.

The reaction time of 4~24 hours is usually sufficient.

Aromatic tetracarboxylic dianhydride can be reacted with aromatic diamine by the above methods in the presence of aromatic dicarboxylic anhydride and/or aromatic monoamine such as phthalic anhydride and/or aniline to prepare liquid crystal type aromatic polyimide capped at the polymer chain end with an unsubstituted aromatic ring such as

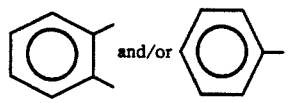

or an aromatic ring substituted with a radical having no reactivity for amine or carboxylic acid anhydride.

Next, the thermoplastic resin which can be used in the invention will be illustrated.

Aromatic polyimide used in the invention comprises a fundamental skeleton having recurring structural units of the formula (5):

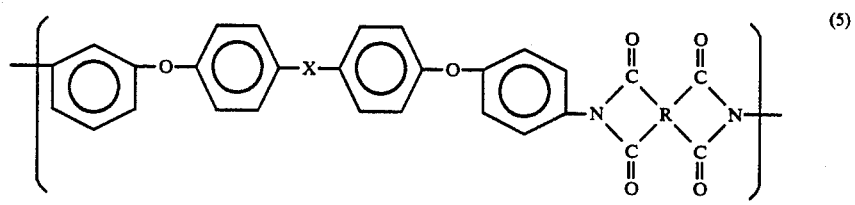

wherein X is a divalent radical selected from the group consisting of a direct bond, isopropylidene, hexafluorinated isopropylidene, carbonyl, thio and sulfonyl, and R is a tetravalent radical having 6~27 carbon atoms and being selected from the group consisting of a monoaromatic radical, condensed polyaromatic radical and noncondensed aromatic radical connected to each other with a direct bond or a bridge member.

In the aromatic polyimide of the formula (5), often used in particular are aromatic polyimide having recurring structural units of the formula (6):

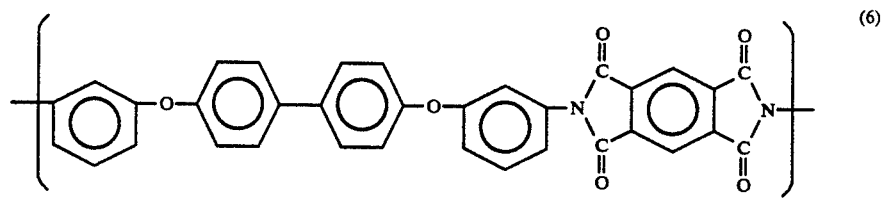

wherein X is a direct bond in the formula (5), and aromatic polyimide having recurring structural units of the formula (20):

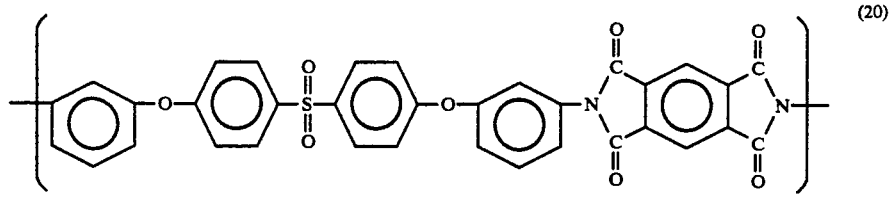

wherein X is —SO$_2$— in the formula (5).

Also effective is another aromatic polyimide having recurring structural units of the formula (7):

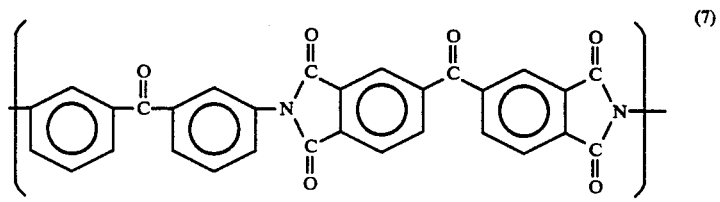

The present inventors have developed the following aromatic polyimide copolymer in order to improve processability of polyimide of the formula (B). The aromatic polyimide copolymer is also effective for the invention.

The aromatic polyimide of the formula (B) is crystalline polyimide which has Tg of 260° C., Tc of 310°~340° C. and Tm of 367°~385° C., and is melt processable and excellent in chemical resistance However, high Tm of 367°~385° C. requires high processing temperature close to 400° C.

In the case of comparing highly heat-resistant engineering plastics having similar levels of Tg, it has been generally known that crystalline resin having high crystallinity is excellent in chemical resistance and mechanical properties such as elastic modulus and amorphous resin having low crystallinity is excellent in processability.

Thus, crystalline resin and amorphous resin individually have both merits and drawbacks.

Consequently, it is further desired to improve processability of the crystalline polyimide having recurring structural units of the formula (B) while maintaining the essentially excellent heat resistance thereof.

As a result of investigation in order to improve such aromatic polyimide, the present inventors have provided a crystalline aromatic polyimide copolymer comprising 99~1% by mol of a fundamental skeleton having recurring structural units of the above formula (B) and 1~99% by mol of a fundamental skeleton having recurring structural units of the formula (8) [the formula (B) exclusive]:

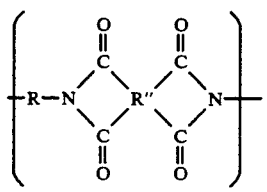

wherein R is

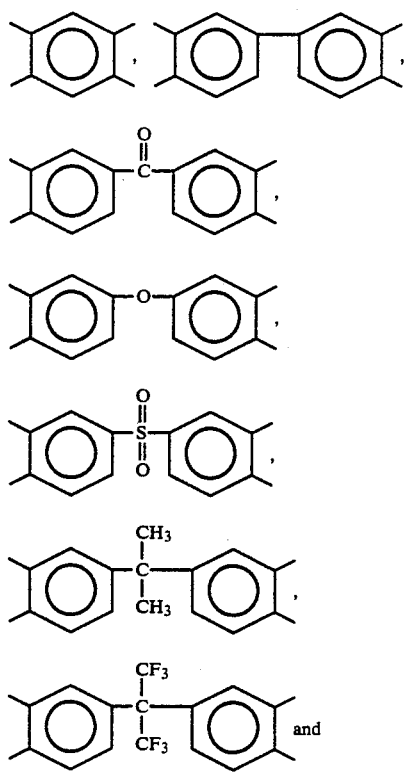

wherein n is an integer of 0, 1, 2 or 3; Q is a direct bond, —O—, —S—, —CO—, —SO$_2$—, —CH$_2$—, —C(CH$_3$)$_2$— or —C(CF$_3$)$_2$— and may be the same or different when two or more A connects three or more aromatic rings each other; and R" is one ore more tetravalent radicals selected from the group consisting of -continued

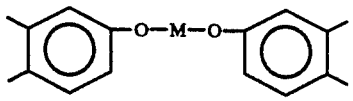

wherein M is one or more divalent radicals selected from the group consisting of

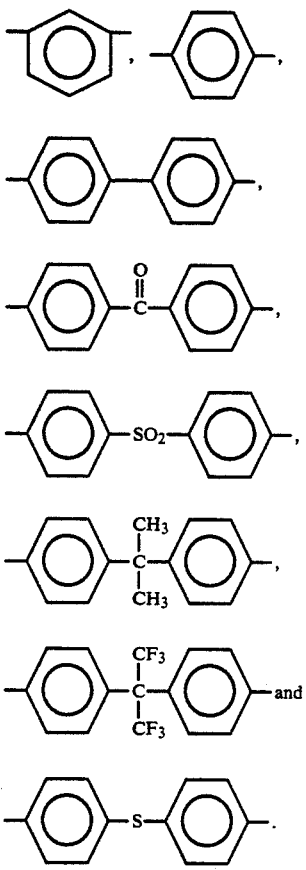

The aromatic polyimide copolymers thus provided and particularly an aromatic polyimide copolymer wherein the recurring structural units of the formula (8) is represented by the following formula [the formula (B), exclusive]:

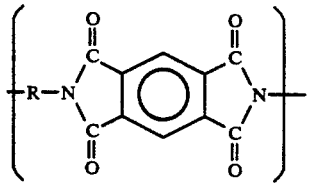

wherein R is the same as above; have been found to improve processability in an amorphous state at high temperature, to provide polyimide having high heat resistance by forming a crystalline state in use after processing, and alternatively to improve processability by maintaining an amorphous state both in processing and in use, and to provide heat resistance even in an amorphous state. Thus, a highly heat-resistant engineering plastic having good processability, excellent chemical resistance and high elastic modulus has been provided.

The aromatic polyimide copolymer thus provided can be preferably used for the resin composition of the invention having improved melt-processability.

Aromatic polyimide homopolymers and copolymers which can be used in the invention also include a capped aromatic polyimide homopolymer and copolymer obtained by capped the above aromatic polyimide homopolymer and copolymer with aromatic dicarboxylic anhydride of the formula (2):

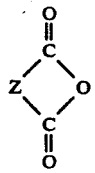 (2)

wherein Z is a divalent radical having 6~15 carbon atoms and being selected from the group consisting of a monoaromatic radical, condensed polyaromatic radical and noncondensed aromatic radical connected each other with a direct bond or a bridge member, and/or with aromatic monoamine of the formula (3):

V—NH$_2$ (3)

wherein V is a monovalent radical having 6~15 carbon atoms and being selected from the group consisting of a monoaromatic radical, condensed polyaromatic radical and noncondensed aromatic radical connected each other with a direct bond or a bridge member.

The homopolymers and copolymers of aromatic polyimide can be obtained by reacting one or more aromatic diamine with one or more aromatic tetracarboxylic dianhydride and thermally or chemically imidizing the resultant polyamic acid.

That is, for example, the aromatic polyimide of the formula (5) can be obtained by reacting one or more aromatic diamine of the formula (21):

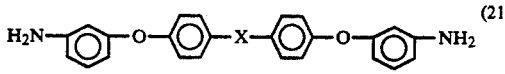 (21)

wherein X is a divalent radical selected from the group consisting of a direct bond, isopropylidene, hexafluorinated isopropylidene, carbonyl, thio and sulfonyl, or aromatic diamine of the formula (22):

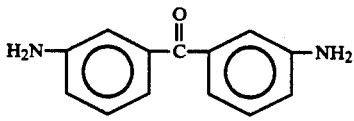 (22)

with one or more aromatic tetracarboxylic dianhydride.

Aromatic diamine which can be used for the reaction includes, for example, bis[4-(3-aminophenoxy)phenyl]methane,
1,1-bis[4-(3-aminophenoxy)phenyl]ethane,
1,2-bis[4-(3-aminophenoxy)phenyl]ethane,
1,1-bis[4-(3-aminophenoxy)phenyl]propane,
1,2-bis[4-(3-aminophenoxy)phenyl]propane,
1,3-bis[4-(3-aminophenoxy)phenyl]propane, 2,2-bis[4-(3-aminophenoxy)phenyl]propane,
1,1-bis[4-(3-aminophenoxy)phenyl]butane,
1,2-bis[4-(3-aminophenoxy)phenyl]butane,
1,3-bis[4-(3-aminophenoxy)phenyl]butane,
1,4-bis[4-(3-aminophenoxy)phenyl]butane,
2,2-bis[4-(3-aminophenoxy)phenyl]butane,
2,3-bis[4-(3-aminophenoxy)phenyl]butane,
2,2-bis[4-(3-aminophenoxy)phenyl]-1,1,1,3,3,3-hexafluoropropane,
4,4'-bis(3-aminophenoxy)biphenyl,
bis[4-(3-aminophenoxy)phenyl]ketone,
bis[4-(3-aminophenoxy)phenyl]sulfide and
bis[4-(3-aminophenoxy)phenyl]sulfone.

These aromatic diamines can be used singly or as a mixture. Preferred aromatic diamines are 4,4'-bis(3-aminophenoxy)biphenyl or bis [4-(3-aminophenoxy)phenyl]sulfone wherein X is a direct bond or a sulfone radical in the formula (21). 3,3'-Diaminobenzophenone of the formula (22) is also preferred.

Aromatic tetracarboxylic dianhydrides used for the reaction are represented by the formula (19):

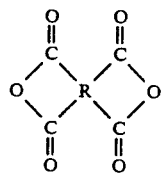
(19)

wherein R is a tetravalent radical having 6~27 carbon atoms and being selected from the group consisting of a monoaromatic aromatic radical connected to each other with a direct bond or a bridge member.

Exemplary aromatic tetracarboxylic dianhydrides include those used for the preparation of the liquid crystal type aromatic polyimide and have been already enumerated above. These aromatic tetracarboxylic dianhydrides can be used singly or as a mixture. Pyromellitic dianhydride is preferred.

The aromatic polyimide copolymer comprising a fundamental skeleton consisting of recurring structural units of the formula (6) and recurring structural units of the formula (8) can be obtained by reacting 4,4'-bis(3-aminophenoxy)biphenyl of the formula (23):

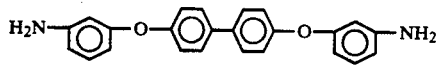
(23)

in the presence of one or more diamine represented by the formula (24)

$H_2N-R-NH_2$ (24)

wherein R is

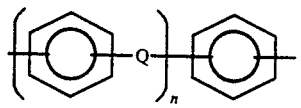

wherein n is an integer of 0, 1, 2 or 3; Q is a direct bond, —O—, —S—, —CO—, —SO$_2$—, —CH$_2$—, —C(CH$_3$)$_2$— or —C(CF$_3$)$_2$— and may be the same or different when two or more Q connects three or more aromatic rings each other; with one or more aromatic tetracarboxylic dianhydride of the formula (25):

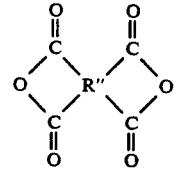
(25)

wherein R'' is a tetravalent radical selected from the group consisting of

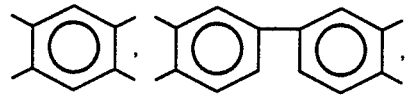

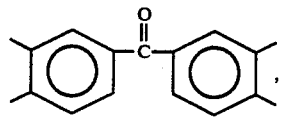

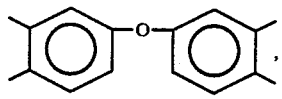

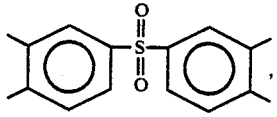

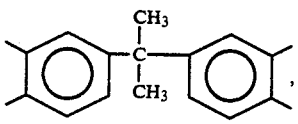

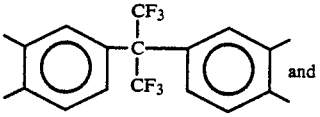

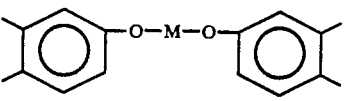 and

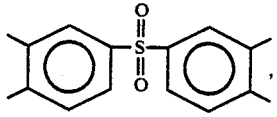

wherein M is a divalent radical selected from the group consisting of

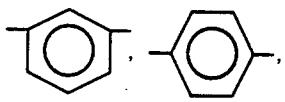

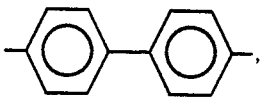

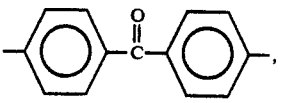

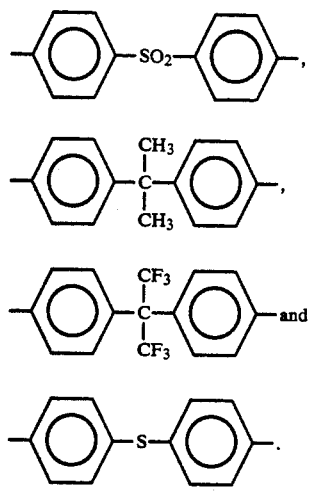

Exemplary aromatic diamines used in the reaction and represented by the formula (26):

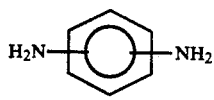

include m-phenylenediamine, o-phenylenediamine and p-phenylenediamine.

Exemplary aromatic diamines used in the reaction and represented by the formula (27):

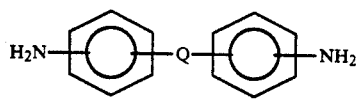

include benzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, 2,2'-bis(4-aminophenyl)propane, 2,2-bis(3-aminophenyl)propane, 2-(3-aminophenyl)-2-(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, and 2-(3-aminophenyl)-2-(4-aminophenyl)propane.

Exemplary aromatic diamines used in the reaction and represented by the formula (28):

include 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(4-aminobenzoyl)benzene. 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene and 1,4-bis(4-amino-α,α-dimethylbenzyl)benzene.

Exemplary aromatic diamines used in the reaction and represented by the formula (29):

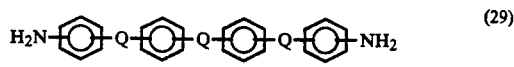

include 4,4'-bis(4-aminophenoxy)biphenyl, 3,3'-bis(4-aminophenoxy)biphenyl, 3,4'-bis(3-aminophenoxy)biphenyl, bis[4-(4-aminophenoxy)phenyl]ketone, bis[4-(3-aminophenoxy)phenyl]ketone, bis[3-(3-aminophenoxy)phenyl]ketone, bis[4-(4-aminophenoxy)phenyl]sulfide, bis[4-(3-aminophenoxy)phenyl]sulfide, bis[3-(4-aminophenoxy)phenyl]sulfide, bis[3-(3-aminophenoxy)phenyl]sulfide, bis[4-(4-aminophenoxy)phenyl]sulfone, bis[4-(3-aminophenoxy)phenyl]sulfone, bis3-(4-aminophenoxy)phenyl]sulfone, bis[3-(3-aminophenoxy)phenyl]sulfone, bis[4-(3-aminophenoxy)phenyl]ether, bis[4-(4-aminophenoxy)phenyl]ether, bis[3-(4-aminophenoxy)phenyl]ether, bis[3-(3-aminophenoxy)phenyl]ether, bis[4-(3-aminophenoxy)phenyl]methane, bis[4-(4-aminophenoxy)phenyl]methane, bis[3-(3-aminophenoxy)phenyl]methane, bis[3-(4-aminophenoxy)phenyl]methane, 2,2-bis[4-(3-aminophenoxy)phenyl]propane, 2,2-bis[4-(4-aminophenoxy)phenyl]propane, 2,2-bis[3-(3-aminophenoxy)phenyl]propane, 2,2-bis[3-(4-aminophenoxy)phenyl]propane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 2,2-bis[3-(3-aminophenoxy)phenyl]-1,1,1,3,3,3-hexafluoropropane, and 2,2-bis[3-(4-aminophenoxy)phenyl]-1,1,1,3,3,3-hexafluoropropane. These aromatic diamines can be used singly or as a mixture.

Representative aromatic tetracarboxylic dianhydrides which can be used as another monomer include pyromellitic dianhydride, 3,3',4,4'-biphenyltetracarboxylic dianhydride, 3,3',4,4'-benzophenonetetracarboxylic dianhydride, bis(3,4-dicarboxyphenyl)ether dianhydride, bis(3,4-dicarboxyphenyl)sulfone dianhydride, 2,2-bis(3,4-dicarboxyphenyl)propane dianhydride, 2,2-bis(3,4-dicarboxyphenyl)-1,1,1,3,3,3-hexafluoropropane dianhydride, 1,3-bis[4-(1,2-dicarboxy)phenoxy]benzene dianhydride, 1,4-bis[4-(1,2-dicarboxy)phenoxy]benzene dianhydride, 4,4'-bis[4-(1,2-dicarboxy)phenoxy]biphenyl dianhydride, 4,4'-bis[4-(1,2-dicarboxy)phenoxy]benzophenone dianhydride, bis[4-{4-(1,2-dicarboxy)phenoxy} phenyl]sulfone dianhydride, 2,2-bis[4- {4-(1,2-dicarboxy)phenoxy} phenyl]sulfone dianhydride, and 2,2-bis[4- {4-(1,2-dicarboxy)phenoxy} phenyl]-1,1,1,3,3,3-hexafluoropropane dianhydride.

The aromatic polyimide having the formula (5),(6),(20) or (7) and the aromatic polyimide copolymer comprising the fundamental skeleton having recurring structural units consisting of 99% by mol of the formula (6) and 1~99% by mol of the formula (8) are individually prepared from corresponding monomers above. In addition to the requisite aromatic diamine and aromatic dicarboxylic dianhydride, other aromatic diamines or aromatic tetracarboxylic dianhydrides can be used in combination so long as giving no adverse effect on the good properties of the resulting homopolymer and copolymer of aromatic polyimide.

Aromatic diamines which can be used in combination include those exemplified in preparing the liquid crystal type aromatic polyimide as aromatic diamines capable of being used simultaneously, and can be selected from these exemplified diamines depending upon the object.

Aromatic tetracarboxylic dianhydride which can be used in combination can be suitably selected from the group exemplified in the aromatic tetracarboxylic dianhydride having the above formula (19).

The aromatic polyimide homopolymer and aromatic polyimide copolymer obtained by using one or more aromatic diamines and one or more aromatic tetracarboxylic dianhydrides as monomer components also include a capped aromatic polyimide homopolymer and capped aromatic polyimide copolymer which have at the polymer chain end thereof an aromatic ring which is unsubstituted or substituted with a radical having no reactivity for amine and dicarboxylic anhydride.

The capped homopolymer and capped copolymer can be prepared by reacting aromatic diamines of the above formulas (21), (22), (23), (24), (26), (27), (28), and (29) with tetracarboxylic dianhydrides of the above formula (19) and (25) in the presence of aromatic dicarboxylic anhydride of the formula (2):

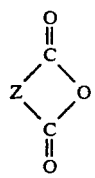 (2)

wherein Z is a divalent radical having 6~15 carbon atoms and being selected from the group consisting of a monoaromatic radical, condensed polyaromatic radical, condensed polyaromatic radical and noncondensed aromatic radical connected each other with a direct bond or a bridge member, and/or aromatic monoamine of the formula (3):

 (3)

wherein V is a monovalent radical having 6~15 carbon atoms and being selected form the group consisting of a monoaromatic radical, condensed polyaromatic radical and noncondensed aromatic radical connected to each other with a direct bond or a bridge member.

The aromatic dicarboxylic anhydride and aromatic monoamine which can be used in the process include those which can be used for preparing homopolymers and copolymers of liquid crystal type aromatic polyimide.

Any known process can be used for preparation of the above homopolymers and copolymers of aromatic polyimide and also for preparing the capped homopolymers and capped copolymers of aromatic polyimide which have an unsubstituted or substituted aromatic ring at the polymer chain end thereof.

For example, these known processes can react aromatic tetracarboxylic dianhydrides with aromatic diamines in the presence of aromatic dicarboxylic anhydride such as phthalic anhydride and/or aromatic monoamine such as aniline to prepare aromatic polyimide having at the polymer chain end an unsubstituted aromatic ring and/or an aromatic ring substituted with a radical having no reacting for amine and dicarboxylic anhydride, that is

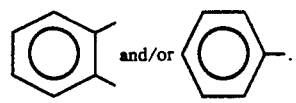

When the melt-processable resin composition of the invention comprises liquid crystal type aromatic polyimide and aromatic polyimide, both or either one of these polymers can be capped at the polymer chain end thereof. Radicals derived from phthalic anhydride and aniline are preferred for the capping in particular.

Next, aromatic polyether sulfone which can be used in the invention comprises a fundamental skeleton having one or more recurring structural units of the formula (11):

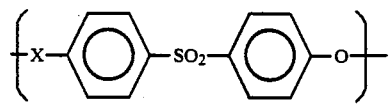 (11)

wherein X is a direct bond,

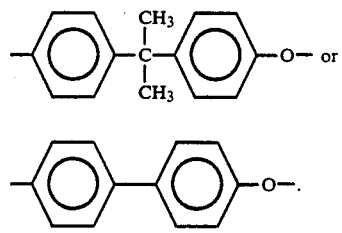

Representative aromatic polysulfones having following recurring structural units.

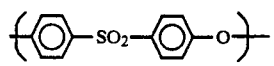

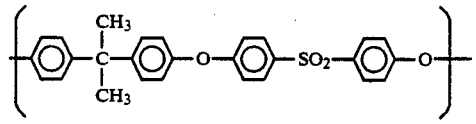

and

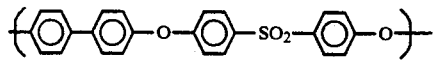

Other aromatic polyether sulfones having following recurring structural units.

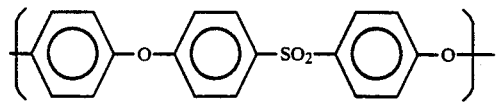

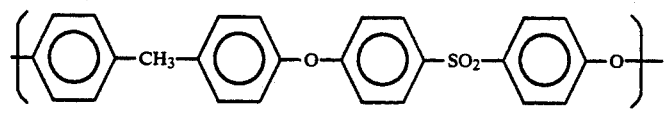
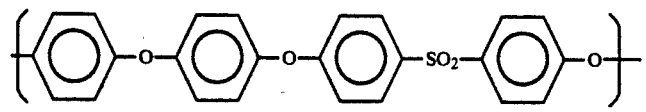
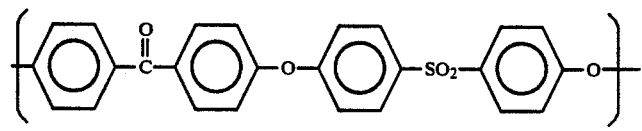
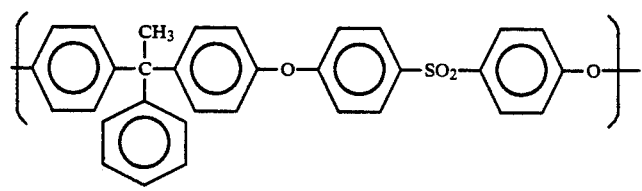
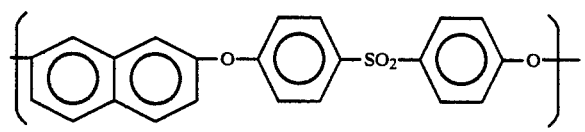
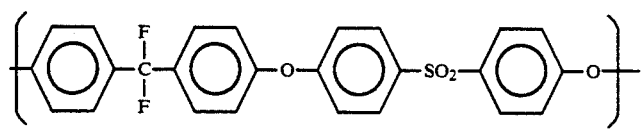
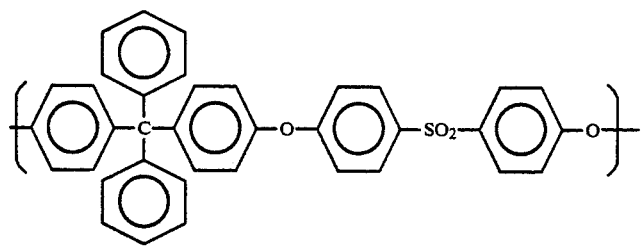
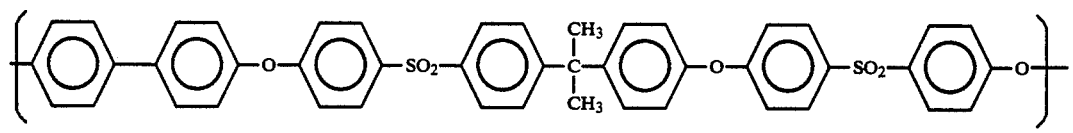
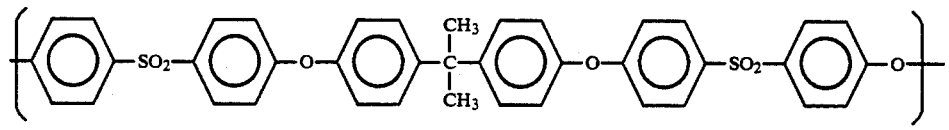
Particularly typical aromatic polysulfones which have been marketed include polyether sulfone VICTREX PES (Trade Mark of ICI LTD.) having recurring structural units of the formula (30):

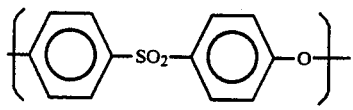
(30)

and polysulfone DUEL POLYSULFONE (Trade Mark of Union Carbide Corp.) having recurring structural units of the formula (31):

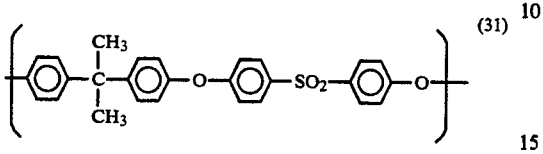
(31)

and polyaryl sulfone RADEL POLYSULFONE (Trade Mark of Union Carbide Corp.) having recurring structural units of the formula (32):

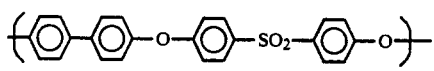
(32)

Polymerization degree of these aromatic polysulfones can be freely selected. Thus aromatic polysulfone having suitable melt viscosity for the desired blend can be arbitrarily selected.

Next, aromatic polyetherimide which can be used in the invention comprises a fundamental skeleton having one or more recurring structural units represented by the formula (12):

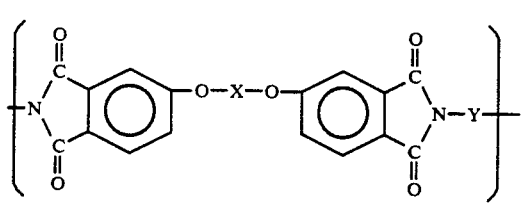
(12)

wherein X is:

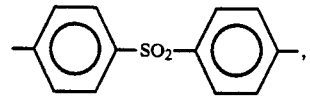,

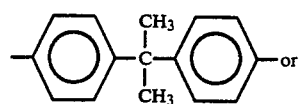 or

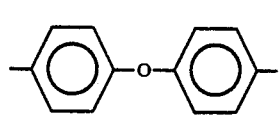

and Y is:

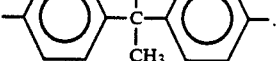, 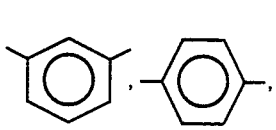,

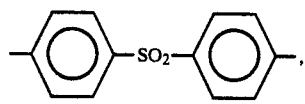,

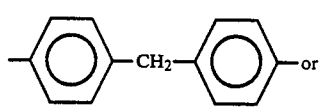 or

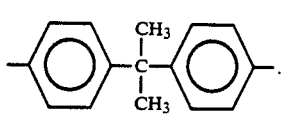.

Exemplary aromatic polyetherimide include those having recurring structural units of the following formulas:

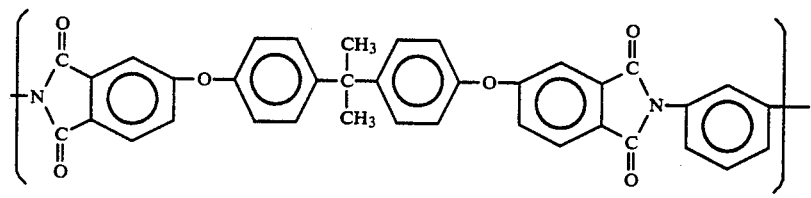

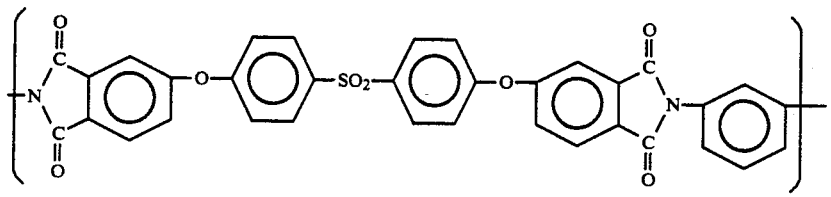

-continued

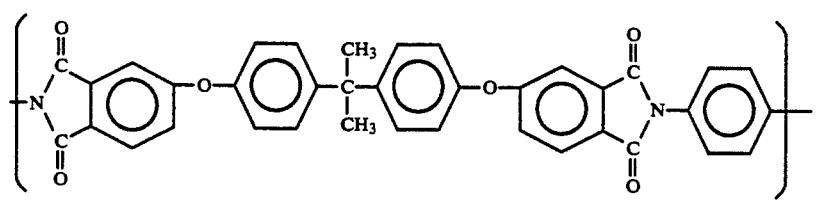

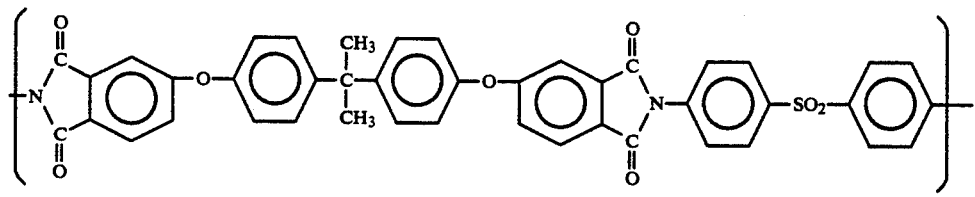

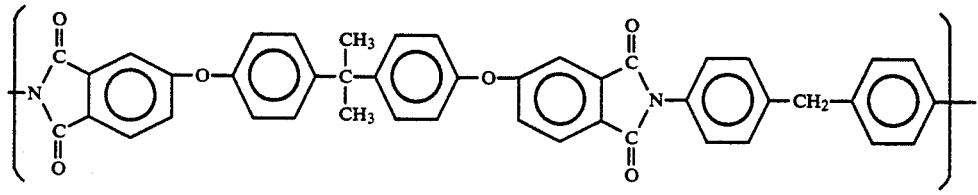

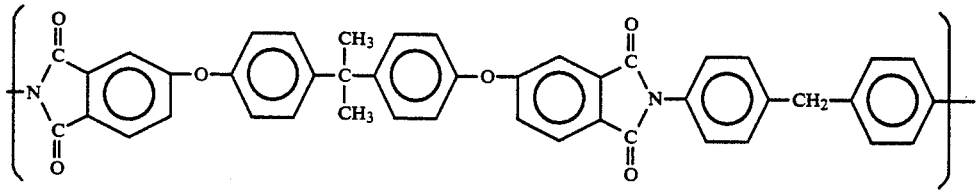

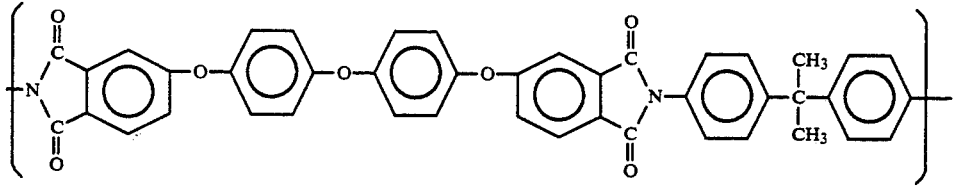

The aromatic polyetherimide is marketed from G.E.Co. under the trade mark of Ultem-1000, Ultem-4000, Ultem-6000 etc.

Next, aromatic polyamideimide which can be used in the invention comprises a fundamental skeleton having one or more recurring structural units of the formula (D):

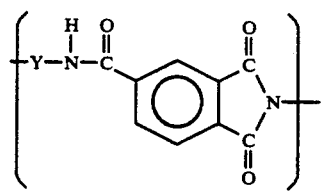

(D)

wherein Y is divalent radical having 6~27 carbon atoms, and is particularly preferred to comprise a fundamental skeleton having recurring structural units of the formula (13):

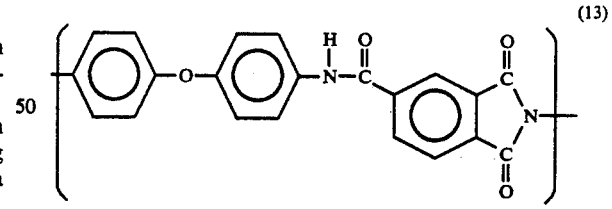

(13)

and/or the formula (14):

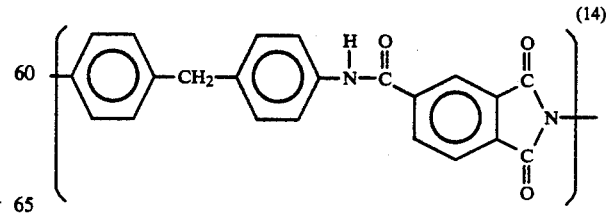

(14)

The aromatic polyamideimide is marketed from Amoco Corp. under the trade mark of TORLON.

Polymerization degree of the aromatic polyamideimide can be freely selected and thus the aromatic polyamideimide having suitable melt viscosity for the desired blend can be arbitrarily selected.

Further, aromatic polyether ketone which can be used in the invention comprises a fundamental skeleton having one or more recurring structural units of the formula (15):

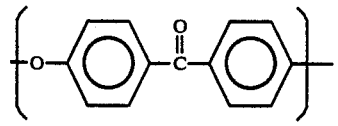
(15)

and/or the formula (16):

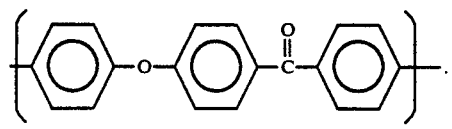
(16)

The melt-processable thermoplastic resin composition of the invention comprises one or more liquid crystal type aromatic polyimide selected from the group consisting of the liquid crystal type aromatic polyimide having recurring structural units of the above formula (1), the liquid crystal type aromatic polyimide having recurring structural units of the formula (4), the liquid crystal type aromatic polyimide copolymer comprising a fundamental skeleton having 1~99% by mol of the recurring structural units of the formula (1) and 99~1% by mol of the recurring structural units of the formula (4), and the liquid crystal type capped aromatic polyimide and the liquid crystal type capped aromatic polyimide copolymer which have at the polymer chain end an aromatic ring unsubstituted or substituted with a radical having no reactivity for amine and dicarboxylic anhydride, and one or more thermoplastic resin selected from the group consisting of other kinds of aromatic polyimide, aromatic polysulfone, aromatic polyetherimide, aromatic polyamideimide and aromatic polyether ketone.

The thermoplastic resin composition comprises 0.1~50% by weight of the liquid crystal type aromatic polyimide and 99.9~50% by weight of the thermoplastic resin.

The thermoplastic resin composition of the invention has extremely low melt viscosity in a high temperature range of 300° C. or more. The fluidization effect of the liquid crystal type aromatic polyimide in the invention is good even in a small amount. The lower limit of the polyimide in the resin composition is 0.1% by weight, preferably 0.5% by weight.

The liquid crystal type aromatic polyimide has very excellent chemical resistance, flame retardance and mechanical strengths as compared with other heat resistant resin. On the other hand, the polyimide has disadvantages such as high anisotropy of mechanical strengths. Consequently, a high content of the liquid crystal type aromatic polyimide in the thermoplastic resin composition leads to unfavorably impaired essential characteristics of polyimide. The amount of the liquid crystal type aromatic polyimide has an upper limit in the composition and is usually 50% by weight or less, preferably 30% by weight or less, more preferably 10% by weight or less.

On preparing the thermoplastic resin composition of the invention, thermoplastic resin and liquid crystal type and the liquid crystal type aromatic polyimide can be blended by usually known methods, following methods are preferred.

①  The thermoplastic resin and liquid crystal type aromatic polyimide are preblended with a mortar, Henschel mixer, drum blender, tumbling mixer, ball mill and ribbon blender.

②  Thermoplastic resin is previously dissolved or suspended in an organic solvent, the liquid crystal type aromatic polyimide is added to the resulting solution or suspension and uniformly dissolved or suspended, and the solvent is successively removed from the mixture.

③  When thermoplastic resin is aromatic polyimide, the liquid crystal type aromatic polyimide is suspended or dissolved in an organic solvent solution of polyamic acid which is a precursor of polyimide, the resulting mixture is heat-treated 100°~400° C. or chemically imidized with a common imidizing agent, and thereafter the solvent is removed by a known method.

④  When thermoplastic resin is aromatic polyimide, an organic solvent solution of polyamic acid which is a precursor of the aromatic polyimide is mixed with an organic solvent solution of polyamic acid which is the precursor of the liquid crystal type aromatic polyimide, the resulting mixture heat-treated at 100°~400° C. or chemically imidized with common imidizing agent, and thereafter the solvent removed by a known method.

The mixture of the liquid crystal type aromatic polyimide and thermoplastic resin thus obtained is used as intact for various processing methods such as injection molding, compression molding, transfer molding and extrusion forming. It is more preferred to used the mixture after melt kneading.

Particularly in the preparation of the above composition, it is also a simple and effective method to mix powder and powder, pellet and pellet, or powder and pellet.

Melt kneading can be conducted with equipment commonly used for melt-kneading rubber and plastic, for example, hot rolls, Banbury mixer, Brabender and extruder. The melt-kneading temperature is set above the melt-flow temperature of the formulation and below the decomposition initiating temperature of the formulation. The temperature is usually 250°-420° C., preferably 300°~400° C.

The melt-processable resin composition of the invention can be preferably processed by injection molding or extrusion forming which provided a uniformly blended product and have high productivity. Other processing methods such as compression molding, transfer molding and sinter forming can also be employed.

Other resins can also be formulated in a suitable amount depending upon the use of product so long as giving no adverse effect on the object of the invention.

Other resins include, for example, thermoplastic resins such as polystyrene, polypropylene, polycarbonate, polyarylate, polyamide, polysulfone, polyether ketone, polyphenylene sulfide, polyamideimide, polyetherimide, modified polyphenylene oxide and other kinds of polyimide, and thermosetting resins.

One or more solid lubricants such as molybdenum disulfide, graphite, boron nitride, lead monoxide and lead powder can be added to the polyimide resin composition of the invention.

One or more reinforcements, for example, glass fiber, carbon fiber, aromatic polyamide fiber, potassium titanate fiber and glass beads can also be added to the composition.

Further, other additives such as antioxidants, heat stabilizers, ultraviolet absorbers, flame retardants, flame retarding adjuvants, antistatic agents and colorants can also be added to the composition.

The present invention will hereinafter be described in detail by way of examples.

In these examples, properties were measured by the following methods.

Inherent viscosity: 0.5 g of polyimide powder was dissolved by heating in 100 ml of a p-chlorophenol/phenol mixture in a weight ratio of 90/10. The solution was cooled to 35° C. and viscosity was measured.

Glass transition temperature (Tg): Measured by DSC (Shimadzu DT-40 series, DSC-41M).

5% weight loss temperature: Measured by DTA-Tg (Shimadzu DT-40 series, DSC-40M) in the air.

SYNTHESIS EXAMPLE 1

To a reaction vessel equipped with a stirrer, reflux condenser, water separator and nitrogen inlet tube, 5.29 kg (10.0 mols) of 1,3-bis[4-(4-aminophenoxy)-α, α-dimethylbenzyl)benzene, 2.094 kg (9.6 moles) of pyromellitic dianhydride, 138 g (1.5 mols) of γ-picoline and 23.0 kg of m-cresol were charged. The mixture was heated to 145° C. with stirring in a nitrogen atmosphere while distilling out about 340 g of water. The reaction was further continued at 140°–150° C. for 4 hours. The reaction mixture was cooled to the room temperature and poured into 81.2 kg of methyl ethyl ketone.

The precipitated polyimide was filtered, washed with methyl ethyl ketone, predried in a nitrogen atmosphere at 50° C. for 24 hours, and dried at 200° C. for 6 hours to obtain 6.85 kg (97.3% yield) of polyimide powder.

The polyimide powder had an inherent viscosity of 0.49 dl/g and 5% weight loss temperature of 525° C. in the air. Two heat absorption peaks were observed at 274° C. and 294° C. in DSC measurement.

SYNTHESIS EXAMPLES 2~6

The same procedures as described in Synthesis Example 1 were carried out by using various diamines and tetracarboxylic dianhydrides which are illustrated in Table 1 to obtain various kinds of polyimide powder.

Table 1 illustrates synthesis conditions, inherent viscosity, glass transition temperature and 5% weight loss temperature of the polyimide powder.

TABLE 1

| Synthesis Example No. | Aromatic diamine *1 kg (mol) | Tetracarboxylic dianhydride *2 kg (mol) | η *3 (dl/g) | Tg *4 (°C.) | Td 5% *5 (°C.) |
|---|---|---|---|---|---|
| 2 | m-BP 3.68 (10.0) | PMDA 2.072 (9.5) | 0.45 | 245 | 560 |
| 3 | m-BS 4.32 (10.0) | PMDA 2.094 (9.6) | 0.50 | 256 | 540 |
| 4 | mBAPP 4.11 (10.0) | PMDA 2.116 (9.7) | 0.55 | 218 | 528 |
| 5 | m-APS 4.01 (10.0) | BTDA 3.093 (9.6) | 0.49 | 195 | 524 |
| 6 | m-BP 3.68 (10.0) | OPDA 2.947 (9.5) | 0.43 | 199 | 542 |

TABLE 1-continued

| Synthesis Example No. | Aromatic diamine *1 kg (mol) | Tetracarboxylic dianhydride *2 kg (mol) | η *3 (dl/g) | Tg *4 (°C.) | Td 5% *5 (°C.) |
|---|---|---|---|---|---|

*1 m-BP: 4,4'-bis(3-aminophenoxy)biphenyl
  m-BS: bis[4-(3-aminophenoxy)phenyl]sulfone
  m-BAPP: 2,2-bis[4-(3-aminophenoxy)phenyl]sulfone]propane
  m-APS: bis[4-(3-aminophenoxy)phenyl]sulfide
*2 PMDA: pyromellitic dianhydride
  BTDA: 3,3',4,4'-benzophenone tetracarboxylic dianhydride
  ODPA: Bis(3,4-dicarboxyphenyl)ether dianhydride
*3 inherent viscosity
*4 Glass transition temperature
*5 5% weight loss temperature

SYNTHESIS EXAMPLE 7

The same procedures as described in Synthesis Example 1 were carried out except that 118.49 g(0.80 g) of phthalic anhydride was added in the reaction.

The polyimide powder thus obtained was 6.93 kg (97.0% yield) and had an inherent viscosity of 0.49 dl/g and 5% weight loss temperature of 536° C. in the air. Two heat absorption peaks were observed at 274° C. and 295° C. by DSC measurement.

SYNTHESIS EXAMPLE 8

The same procedures as described in Synthesis Example 1 were carried out except that 158.54 g (0.80 mol) of 1,8-naphthalene dicarboxylic anhydride was added in the reaction.

The polyimide powder thus obtained was 7.02 kg (97.0% yield) and had an inherent viscosity of 0.50 dl/g and 5% weight loss temperature of 538° C. in the air. Two heat absorption peaks were observed at 275° C. and 297° C. by DSC measurement.

SYNTHESIS EXAMPLE 9

The same procedures as described in Synthesis Example 2 were carried out except that 148.11 g (1.00 mol) of phthalic anhydride was added in the reaction to obtain polyimide powder.

Table 2 illustrates synthesis conditions, inherent viscosity, glass transition temperature and 5% weight loss temperature of the polyimide powder obtained.

SYNTHESIS EXAMPLE 10

The same procedures as described in Synthesis Example 3 were carried out except that 118.49 g (0.80 mol) of phthalic anhydride was added in the reaction to obtain polyimide powder.

Table 2 illustrates synthesis conditions, inherent viscosity, glass transition temperature, and 5% weight loss temperature of the polyimide powder obtained.

SYNTHESIS EXAMPLE 11

The same procedures as described in Synthesis Example 4 were carried out except that 88.87 g (0.60 mol) of phthalic anhydride was added in the reaction to obtain polyimide powder.

Table 2 illustrates synthesis conditions, inherent viscosity, glass transition temperature, and 5% weight loss temperature of the polyimide powder obtained.

SYNTHESIS EXAMPLE 12

The same procedures as described in Synthesis Example 2 were carried out except that 198.18 g (1.00 mol) of 1,8-naphthalenedicarboxy lic anhydride was added in the reaction to obtain polyimide powder.

Table 2 illustrates synthesis conditions, inherent viscosity, glass transition temperature, and 5% weight loss temperature of the polyimide powder obtained.

TABLE 2

| Synthesis Example No. | Aromatic Diamine *1 kg (mol) | Tetracarboxylic dianhydride *2 kg (mol) | η *3 (dl/g) | Tg *4 (°C.) | Td 5% *5 (°C.) |
|---|---|---|---|---|---|
| 9 | m-BP 3.68 (10.0) | PMDA 2.072 (9.5) | 0.46 | 244 | 562 |
| 10 | m-BS 4.32 (10.0) | PMDA 2.094 (9.6) | 0.49 | 254 | 548 |
| 11 | mBAPP 4.11 (10.0) | PMDA 2.116 (9.7) | 0.54 | 218 | 534 |
| 12 | m-BP 3.68 (10.0) | PMDA 2.072 (9.5) | 0.47 | 245 | 560 |

*1 m-BP: 4,4'-Bis(3-aminophenoxy)biphenyl
    m-BS: bis[4-(3-aminophenoxy)phenyl]sulfone
    m-BAPP: 2,2-bis[4-(3-aminophenoxy)phenyl]propane
*2 PMDA: Pyromellitic dianhydride
*3 Inherent viscosity
*4 Glass transition temperature
*5 5% weight loss temperature

SYNTHESIS EXAMPLE 13

To a reaction vessel equipped with a stirrer, reflux condenser, water separator and nitrogen inlet tube, 3.50 kg(9.5 mols) of 4,4'-bis(3-aminophenoxy)biphenyl, 2.18 kg (10.0 mols) of pyromellitic dianhydride, 140 g (1.5 mols) of γ-picoline, 93.0 g (1.0 mol) of aniline and 23.0 kg of m-cresol were charged. The mixture was heated to 145° C. with stirring in a nitrogen atmosphere while distilling out about 360 g of water. The reaction was further continued at 140°~150° C. for 4 hours. The reaction mixture was cooled to the room temperature and poured into 81.2 kg of methyl ethyl ketone.

The precipitated polyimide was filtered, washed with methyl ethyl ketone, predried at 50° C. for 24 hours in a nitrogen atmosphere and dried at 200° C. for 6 hours to obtain 5.25 kg (97.0% yield) of polyimide powder.

The polyimide obtained had an inherent viscosity of 0.46 dl/g, glass transition temperature of 247° C. and 5% weight loss temperature of 555° C. in the air.

SYNTHESIS EXAMPLE 14

The same procedures as described in Synthesis Example 13 were carried out by using 107.15 g (1.0 mol) of p-toluidine in place of 93.0 g (1.0 mol) of aniline to obtain 52.6 kg (97.0% yield) of polyimide powder.

The polyimide powder had an inherent viscosity of 0.47 dl/g, glass transition temperature of 247° C. and 5% weight loss temperature of 552° C. in the air.

SYNTHESIS EXAMPLE 15

The same procedures as described in Synthesis Example 13 were carried out by using 5.07 kg (9.6 mol) of 1,3-bis[4-(4-aminophenoxy)-α, α-dimethylbenzyl]benzene in place of 3.50 kg (9.5 mol) of 4,4'-bis(3-aminophenoxy)biphenyl to obtain 6.76 kg (97.0% yield) of polyimide powder. The polyimide powder had an inherent viscosity of 0.47 dl/g and 5% weight loss temperature of 532° C. Two heat absorption peaks were observed at 274° C. and 295° C. by DSC measurement.

SYNTHESIS EXAMPLE 16

The same procedures as described in Synthesis Example 15 were carried out by using 85.72 g (0.8 mol) of p-toluidine in place of 74.4 g (0.8 mol) of aniline to obtain 6.77 kg (97.0% yield) of polyimide powder. The polyimide powder had an inherent viscosity of 0.48 dl/g and 5% weight loss temperature of 535° C. Two heat absorption peaks were observed at 274° C. and 297° C. by DSC measurement.

SYNTHESIS EXAMPLE 17

The same procedures as described in Synthesis Example 13 were carried out by using 3.98 kg (9.7 mol) of 2,2-bis[4-(3-aminophenoxy) phenyl]propane in place of 3.50 kg (9.5 mol) of 4,4'-bis(3-aminophenoxy) biphenyl to obtain 5.70 kg (97.3% yield) of polyimide powder. The polyimide powder had an inherent viscosity of 0.54 dl/g, glass transition temperature of 217° C. and 5% weight loss temperature of 534° C. in the air.

SYNTHESIS EXAMPLE 18

To a reaction vessel equipped with a stirrer, reflux condenser, water separator and nitrogen inlet tube, 2.123 kg (10.0 mol) of 3,3'-diaminobenzophenone, 3.093 kg (9.6 mol) of 3,3',4,4'-benzophenonetetrac arboxylic dianhydride, 138 g (1.5 mol) of γ-picoline and 20.9 kg of m-cresol were charged. The mixture was heated to 145° C. with stirring in a nitrogen atmosphere while distilling out about 340 g of water. The reaction was further carried out at 140°~150° C. for 4 hours.

The reaction mixture was cooled to the room temperature and poured into 81.2 kg of methyl ethyl ketone.

Precipitated polyimide was filtered, washed with methyl ethyl ketone, predried at 50° C. for 24 hours in a nitrogen atmosphere and dried at 200° C. for 6 hours to obtain 4.74 kg (97.3% yield) of polyimide powder. The polyimide powder had an inherent viscosity of 0.4 dl/g, glass transition temperature of 240° C. and 5% weight loss temperature of 532° C. in the air.

SYNTHESIS EXAMPLE 19

The same procedures as described in Synthesis Example 18 were carried out except that 118.49 g (0.80 mol) of phthalic anhydride was added in the reaction to obtain 4.88 kg (98.0% yield) of polyimide powder. The polyimide powder had an inherent viscosity of 0.48 dl/g, glass transition temperature of 245° C. and 5% weight loss temperature of 550° C.

SYNTHESIS EXAMPLE 20

The same procedures as described in Synthesis Example 18 were carried out except that 158.54 (0.80 g ) of 1,8-naphthalenedicarboxylic anhydride wa added in the reaction to obtain 4.86 kg (97.0% yield) of polyimide powder. The polyimide powder had on inherent viscosity of 0.49 dl/g, glass transition temperature of 247° C. and 5% weight loss temperature of 538° C. in the air.

SYNTHESIS EXAMPLE 21

To a reaction vessel equipped with a stirrer, reflux condenser, water separator and nitrogen inlet tube, 2.038 kg (9.6 mol) of 3,3'-diaminobenzophenone, 3.222 kg (10.0 mol) of 3,3',4,4'-benzophenonetetrac arboxylic dianhydride, 138 g (1.5 mol) of γ-picoline, 74.50 g (0.8 mol) of aniline and 20.9 kg of m-cresol were charged. The mixture was heated to 145° C. with stirring in a nitrogen atmosphere while distilling out about 340 g of water. The reaction was further carried out at 140°~150° C. for 4 hours. The reaction mixture was cooled to the room temperature and poured into 81.2 kg of methyl ethyl ketone.

Precipitated polyimide was filtrated, washed with methyl ethyl ketone, predried at 50° C. for 24 hours in a nitrogen atmosphere and dried at 200° C. for 6 hours to obtain 4.74 Kg (97.3% yield) of polyimide powder.

The polyimide powder had an inherent viscosity of 0.48 dl/g, glass transition temperature of 240° C. and 5% weight loss temperature of 548° C. in the air.

SYNTHESIS EXAMPLE 22

The same procedures as described in Synthesis Example 21 were carried out by using 85.72 g (0.8 mol) of p-toluidine in place of 74.50 g (0.8 mol) of aniline to obtained 4.85 kg (97.5% yield) of polyimide powder. The polyimide powder had an inherent viscosity of 0.49 dl/g, glass transition temperature of 244° C. and 5% weight loss temperature of 545° C. in the air.

SYNTHESIS EXAMPLE 23

To a reaction vessel equipped with a stirrer, reflux condenser, water separator and nitrogen inlet tube, 3.316 kg (9.00 mol) of 4,4'-bis(3-aminophenoxy)biphenyl, 0.200 kg (1.00 mol) of 4,4'-diaminodiphenylether, 2.072 kg (9.50 mol) of pyromellitic dianhydride, 140 g (1.5 mol) of γ-picoline and 22.4 kg of m-cresol were charged. The mixture was heated to 145° C. with stirring in a nitrogen atmosphere while distilling out about 340 g of water. The reaction was further continued for 4 hours at 140°~150° C. Thereafter, the reaction mixture was cooled to the room temperature and poured into 56.1 Kg of methyl ethyl ketone.

The precipitated powder was filtered, washed with methyl ethyl ketone, predried at 50° C. for 24 hours in a nitrogen atmosphere and dried at 200° C. for 6 hours to obtain 5.09 kg (97.0 & yield) of polyimide powder. The polyimide powder had an inherent viscosity of 0.50 dl/g, glass transition temperature of 250° C. and 5% weight loss temperature of 542° C. in the air. Tc and Tm were not observed.

SYNTHESIS EXAMPLE 24

The same procedures as described in Synthesis Example 23 were carried out except that 3.316 Kg (9.00 mols) of 4,4'-bis(3-aminophenoxy) biphenyl, 0.200 kg (1.00 mol) of 4,4'-diaminodiphenyl ether and 2.072 kg (9.50 mols) of pyromellitic dianhydride were replaced by 2.579 kg (7.00 mols) of 4,4'-bis(3-aminophenoxy)biphenyl, 1.297 kg (3.00 mols) of bis[4-(3-aminophenoxy)phenyl]sulfone and 2.094 kg (9.60 mols) of pyromellitic dianhydride. Polyimide powder thus obtained was 5.51 kg (98.0% yield) and had an inherent viscosity of 0.51 dl/g, glass transition temperature of 253° C. and 5% weight loss temperature of 539° C. in the air. Tc and Tm were not observed.

SYNTHESIS EXAMPLE 25

The same procedures as described in Synthesis Example 23 were carried out except that 148.11 kg (1.00 mol) of phthalic anhydride was added to the reaction. Polyimide powder thus obtained was 5.26 kg (97.8% yield) and had an inherent viscosity of 0.50 dl/g, glass transition temperature of 254° C. and 5% weight loss temperature of 546° C. in the air. Tc and Tm were not observed.

SYNTHESIS EXAMPLE 26

The same procedures as described in Synthesis Example 23 were carried out except that 195.68 kg (1.00 mol) of 1,8-naphthalenedicarboxylic anhydride was added to the reaction. Polyimide powder thus obtained was 5.31 kg (98.0% yield) and had an inherent viscosity of 0.49 dl/g, glass transition temperature of 250° C. and 5% weight loss temperature of 543° C. in the air. Tc and Tm were not observed.

SYNTHESIS EXAMPLE 27

To a reaction vessel equipped with a stirrer, reflux condenser and nitrogen inlet tube, 3.150 kg (8.55 mols) of 4,4'-bis(3-aminophenoxy) biphenyl, 0.190 kg (0.95 mol) of 4,4'-diaminodiphenyl ether, 2.18 kg (10.0 mols) of pyromellitic dianhydride, 140 g (1.5 mols) of γ-picoline and 93.12 g of aniline and 23.0 kg m-cresol were charged. The mixture was heated to 145° C. with stirring in a nitrogen atmosphere while distilling out about 360 g of water. The reaction was further continued for 4 hours at 140°~150° C. Thereafter, the reaction mixture was cooled to the room temperature and poured into 81.2 kg of methyl ethyl ketone.

The precipitated powder was filtered, washed with methyl ethyl ketone, predried at 50° C. for 24 hours in a nitrogen atmosphere and dried at 200° C. for 6 hours to obtain 5.16 kg (98.2% yield) of polyimide powder. The polyimide powder had an inherent viscosity of 0.49 dl/g, glass transition temperature of 256° C. and 5% weight loss temperature of 549° C. in the air. Tc and Tm were not observed.

SYNTHESIS EXAMPLE 28

The same procedures as described in Synthesis Example 27 were carried out except that 93.12 g (1.0 mol) of aniline was replaced by 107.15 g (1.0 mol) of p-toluidine. Polyimide powder thus obtained was 5.16 kg (98.0% yield) and had an inherent viscosity of 0.49 dl/g, glass transition temperature of 255° C. and 5% weight loss temperature of 547° C. in the air.

SYNTHESIS EXAMPLE 29

The same procedures as described in Synthesis Example 27 were carried out except that 3.150 kg (8.55 mols) of 4,4'-bis(3-aminophenoxy) biphenyl, 0.190 kg (0.95 mol) of 4,4'-diaminodiphenyl ether and 93.12 g (1.0 mol) of aniline were replaced by 2.476 kg (6.72 mols) of 4,4'-bis(3-aminophenoxy)biphenyl, 1.246 kg (2.88 mols) of bis[4-(3-aminophenoxy)phenyl]sulfone and 74.50 (0.80 mol) of aniline.

Polyimide powder thus obtained was 5.49 kg (97.8% yield) and had an inherent viscosity of 0.50 dl/g, glass transition temperature of 251° C. and 5% weight loss temperature of 544° C. in the air.

SYNTHESIS EXAMPLE 30

The same procedures as described in Synthesis Example 29 were carried out except that 74.50 g (0.80 mol) was replaced by 85.72 g (0.80 mol) of p-toluidine. Polyimide powder thus obtained was 5.52 kg (98.0% yield) and had an inherent viscosity of 0.50 dl/g, glass transition temperature of 252° C. and 5% weight loss temperature of 540° C. in the air.

SYNTHESIS EXAMPLE 31

To a reaction vessel equipped with a thermometer, reflux condenser and a stirrer, 200 g of N,N-dimethylformamide (DMF), 65 g (0.409 mol) of 3,4-difluoronitrobenzene, 69.1 g (0.199 mol) of 1,3-bis(4-hydroxycumyl) benzene and 33.1 g (0.239 mol) of potassium carbonate were charged and warmed to 80° C. with stirring. After aging the mixture at 80° C. for 6 hours, inorganic salts was removed by filtration. The filtrate was mixed with 50 ml of water and cooled to the room temperature. The precipitated crystal was filtered and slugged with isopropyl alcohol to obtain 129.4 g (97% yield) of 1,3-bis[4-(4-nitro-6-fluorophenoxy)-α, α-dimethylbenzyl]benzene having a melting point of 150.7°~151.8° C.

Successively, to a reduction vessel equipped with a thermometer, reflux condenser and stirrer, 115 g (0.184 mol) of 1,3-bis[4-(4-nitro-6-fluorophenoxy)-α, α-dimethylbenzyl]benzene, 250 g of isopropyl alcohol and 4.8 g of 5%-Pd/c having a moisture content of 50% were charged and reacted at 70°~80° C. for 4 hours in a hydrogen atmosphere. After finishing the reaction, the catalyst was filtered off and the filtrate was concentrated under reduced pressure to obtain 84.2 g (81% yield) of 1,3-bis[4-(4-amino-6-fluorophenoxy)-α, α-dimethylbenzyl]benzene as a light yellow crystal having a melting point of 130.4~132.9.

| Elemental analyses ($C_{36}H_{34}N_2O_2F_2$) | | | |
| --- | --- | --- | --- |
| | C | H | N | F |
| Calculated (%) | 76.52 | 6.07 | 5.96 | 6.73 |
| Found (%) | 76.55 | 6.11 | 5.91 | 6.77 |

Further, to a reaction vessel equipped with a stirrer, reflux condenser, water separator and nitrogen inlet tube, 56.47 g (0.1 mol) of 1,3-bis[4-(4-amino-6-fluorophenoxy)-α, α-dimethylbenzyl]benzene, 21.38 (0.098 mol) of pyromellitic dianhydride, 0.592 (0.004 mol) of phthalic anhydride, 1.40 g of γ-picoline and 311.4 g of m-cresol were charged and heated to 150° C. with stirring in a nitrogen atmosphere and reacted at 150° C. for 4 hours while distilling out about 3.6 ml of water.

After finishing the reaction, the reaction mixture was cooled to the room temperature and poured into about 2.0 liter of methyl ethyl ketone. Precipitated powder was filtered, washed with methyl ethyl ketone, and dried at 50° C. for 24 hours in the air and at 180° C. for 4 hours under reduced pressure to obtain 72.56 g (97.0% yield) of polyimide powder. The polyimide powder thus obtained has an inherent viscosity of 0.50 dl/g, glass transition temperature of 186° C. and melting point of 350° C.

Further, 30 parts of weight of the polyimide powder was mixed with 70 parts by weight of marketed polyether sulfone VICTREX PES 4100P (Trade Mark of ICI Ltd.) and measured melt viscosity at 370° C. after residence time of 5 minutes. Following results were obtained.

| Polyether sulfone | 5700 poise |
| --- | --- |
| Polyether sulfone/Polyimide | 3350 poise |

Melt viscosity was greatly reduced by mixing the thus obtained polyimide with polyether sulfone. The strand obtained was oriented to the direction of extrusion and essential property of liquid crystal type high polymers such as fibrillated structure was observed.

SYNTHESIS EXAMPLE 32

To a reaction vessel equipped with a thermometer, reflux condenser and a stirrer, 200 g of N,N-dimethylformamide (DMF), 10 g of toluene, 80 g (0.466 mol) of 2-chloro-6-nitrotoluene, 78.8 g (0.227 mol) of 1,3-bis(4-hydroxycumyl)benzene and 37.7 g (0.273 mol) of potassium carbonate were charged and heated to 150° C. with stirring. After aging the mixture at 150° C. for 7 hours, the mixture was cooled to 90° C. and inorganic salts was removed by filtration. The filtrate was mixed with 56 ml of water and cooled to the room temperature. The precipitated crystal was filtered and slugged with isopropyl alcohol to obtain 133.9 g (96% yield) of 1,3-bis[4-(4-nitro-6-methylphenoxy)-α, α-dimethylbenzyl]benzene having a melting point of 116.3°~117.6° C.

Successively, to a reduction vessel equipped with a thermometer, reflux condenser and stirrer, 120 g (0.195 mol) of 1,3-bis[4-(4-nitro-6-methylphenoxy)-α, α-dimethylbenzyl]benzene, 400 g of isopropyl alcohol and 5 g of 5%-Pd/c having a moisture content of 50% were charged and reacted at 70°~80° C. for 4 hours in a hydrogen atmosphere. After finishing the reaction, the catalyst was filtered off and the filtrate was concentrated under reduced pressure to obtain 89.0 g (82% yield) of 1,3-bis[4-(4-amino-6-methylphenoxy)-α, α-dimethylbenzyl]benzene as a light yellow crystal having a melting point of 118.1~118.2.

| Elemental analyses ($C_{38}H_{40}N_2O_2F_2$) | | |
| --- | --- | --- |
| | C | H | N |
| Calculated (%) | 81.98 | 7.24 | 5.03 |
| Found (%) | 82.18 | 7.22 | 5.15 |

The same procedures as described in Synthesis Example 31 were carried out by using 55.68 g (0.1 mol) of 1,3-bis[4-(4-amino-6-methylphenoxy)-α, α-dimethylbenzyl]benzene to obtain 71.29 g (96.3% yield) of polyimide powder. The polyimide powder had an inherent viscosity of 0.51 dl/g and glass transition temperature of 185° C.

Further, 30 parts by weight of the polyimide powder was mixed with 70 parts by weight of marketed polyether sulfone VICTREX PES 4100P (Trade Mark of ICI Ltd.) and measured melt viscosity at 370° C. after residence time of 5 minutes. Following results were obtained.

| Polyether sulfone | 5700 poise |
| --- | --- |
| Polyether sulfone/Polyimide | 3230 poise |

Melt viscosity was greatly reduced by mixing the thus obtained polyimide with polyether sulfone. The strand obtained was oriented to the direction of extrusion and essential property of liquid crystal type high polymers such as fibrillated structure was observed.

SYNTHESIS EXAMPLE 33

To a reaction vessel equipped with a thermometer, reflux condenser and a stirrer, 700 ml of N,N-dimethylformamide (DMF), 30 ml of toluene, 87 g (0.386 mol) of 2-chloro-5-nitrobenzotrifluoride, 63.6 g (0.184 mol) of 1,3-bis(4-hydroxycumyl)benzene and 53.3 g (0.386 mol) of potassium carbonate were charged and heated to 110° C. with stirring. After aging the mixture at 110° C. for 4 hours, the mixture was cooled to 80° C. and inorganic salts was removed by filtration. The filtrate was mixed with 30 ml of water and cooled to the room temperature. The precipitated crystal was filtered and slugged with isopropyl alcohol to obtain 120 g (90% yield) of 1,3-bis[4-(4-nitro-6-trifluoromethylphenoxy)-α, α-dimethylbenzyl]benzene having a melting point of 127.4°~128.4° C.

Successively, to a reduction vessel equipped with a thermometer, reflux condenser and stirrer, 90 g (0.124 mol) of 1,3-bis[4-(4-nitro-6-trifluoromethylphenoxy)-α, α-dimethylbenzyl]benzene, 500 ml of methyl cellosolve and 5 g of 5%-Pd/c having a moisture content of 50% were charged and reacted at 70°~80° C. for 4 hours in a hydrogen atmosphere. After finishing the reaction, the catalyst was filtered off and the filtrate was concentrated under reduced pressure to obtain 73.4 g (89% yield) of 1,3-bis[4-(4-amino-6-trifluoromethylphenoxy)-α, α-dimethylbenzyl]benzene as a light yellow crystal having a melting point of 118.5~119.2.

| Elemental analyses ($C_{38}H_{34}N_2O_2F_2$) | | | | |
|---|---|---|---|---|
| | C | H | N | F |
| Calculated (%) | 68.67 | 5.16 | 4.21 | 17.15 |
| Found (%) | 68.78 | 5.22 | 4.15 | 17.01 |

Further, to a reaction vessel equipped with a stirrer, reflux condenser, water separator and nitrogen inlet tube, 66.47 g (0.1 mol) of 1,3-bis[4-(4-amino-6-trifluoromethylphenoxy)-α, α-dimethylbenzyl]benz ene, 21.38 (0.098 mol) of pyromellitic dianhydride, 0.592 (0.004 mol) of phthalic anhydride, 1.40 g of γ-picoline and 351.4 g of m-cresol were charged and heated to 150° C. with stirring in a nitrogen atmosphere and reacted at 150° C. for 4 hours while distilling out about 3.6 ml of water.

After finishing the reaction, the reaction mixture was cooled to the room temperature and poured into about 2.0 liter of methyl ethyl ketone. Precipitated powder was filtered, washed with methyl ethyl ketone, and dried at 50° C. for 24 hours in the air and 180° C. for 4 hours under reduced pressure to obtain 83.22 g (98.1% yield) of polyimide powder. The polyimide powder thus obtained had an inherent viscosity of 0.45 dl/g, glass transition temperature of 186° C. and melting point of 196° C.

Following results were obtained on the elemental analyses.

| | C | H | N | F |
|---|---|---|---|---|
| Calculated (%) | 68.08 | 3.82 | 3.31 | 13.46 |
| Found (%) | 67.86 | 3.75 | 3.40 | 13.02 |

A polyimide film having a thickness of 50 μm was prepared by pressing the polyimide power at 350° C. under pressure of 300 psi. The film had dielectric constant of 3.02 at 60 Hz, 2.99 at 3 KHz 2.96 at 1 MHz.

Further, 30 parts by weight of the polyimide powder was mixed with 70 parts by weight of marketed polyether sulfone VICTREX PES 4100P (Trade Mark of ICI Ltd.) and measured melt viscosity at 350° C. and 370° C. after residence time of 5 minutes. Following results were obtained.

| | 350° C. | 370° C. |
|---|---|---|
| Polyether sulfone | 12000 poise | 5700 poise |
| Polyether sulfone/Polyimide | 5250 poise | 3350 poise |

Melt viscosity was greatly reduced by mixing the thus obtained polyimide with polyether sulfone. The strand obtained was oriented to the direction of extrusion and essential property of liquid crystal type high polymers such as fibrillated structure was observed.

EXAMPLES 1~8

The polyimide powder obtained in Synthesis Examples 2 and 3 was dryblended with the liquid crystal type polyimide powder obtained in Synthesis Example 1 in various proportions illustrated in Table 3. Melt viscosity of the composition obtained was measured with a Koka type flow tester (Shimadzu CFT-500) under 100 kg load by using an orifice of 0.1 cm in diameter and 1 cm in length. Results are illustrated in Table 3.

COMPARATIVE EXAMPLES 1~8

Compositions outside the scope of the present invention were prepared and melt viscosity of these compositions was measured by the same procedures as described in Examples 1~8. Results are illustrated in Table 3.

TABLE 3

| | Polyimide | | L.C. type polyimide | Flow tester | |
|---|---|---|---|---|---|
| No. | Synthesis Example No. | wt. parts | Synthesis Example 1 wt. parts | temperature (°C.) | Melt viscosity (poise) |
| Comp. Example 1 | 2 | 100 | 0 | 400 | 5000 |
| Example 1 | 2 | 90 | 10 | 400 | 4060 |
| Example 2 | 2 | 70 | 30 | 400 | 2070 |
| Comp. Example 2 | 2 | 40 | 60 | 400 | 970 |
| Comp. Example 3 | 2 | 100 | 0 | 420 | 3100 |
| Example 3 | 2 | 90 | 10 | 420 | 2510 |
| Example 4 | 2 | 70 | 30 | 420 | 1220 |
| Comp. Example 4 | 2 | 40 | 60 | 420 | 620 |
| Comp. Example 5 | 3 | 100 | 0 | 400 | 5500 |
| Example 5 | 3 | 90 | 10 | 400 | 4420 |
| Example 6 | 3 | 70 | 30 | 400 | 2150 |
| Comp. Example 6 | 3 | 40 | 60 | 400 | 980 |
| Comp. Example 7 | 3 | 100 | 0 | 420 | 3400 |
| Example 7 | 3 | 90 | 10 | 420 | 2680 |
| Example 8 | 3 | 70 | 30 | 420 | 1300 |
| Comp. Example 8 | 3 | 40 | 60 | 420 | 650 |

Note)
L.C. type polyimide: Liquid crystal type polyimide

EXAMPLES 9~16

The polyimide powder obtained in Synthesis Examples 4 and 5 was dryblended with the liquid crystal type polyimide powder obtained in Synthesis Example 1 in various proportions illustrated in Table 4. Melt viscosity of the composition obtained was measured with a Koka type flow tester (Shimadzu CFT-500) under 100 kg load by using an orifice of 0.1 cm in diameter and 1 cm in length. Results are illustrated in Table 4.

COMPARATIVE EXAMPLES 9~16

Compositions outside the scope of the present invention were prepared and melt viscosity of these compositions was measured by the same procedures as carried out in Examples 9~16. Results are illustrated in Table 4.

TABLE 4

| No. | Polyimide Synthesis Example No. | wt. part | L.C. type polyimide Synthesis Example 1 wt. part | Flow tester temperature (°C.) | Melt viscosity (poise) |
|---|---|---|---|---|---|
| Comp. Example 9 | 4 | 100 | 0 | 380 | 4240 |
| Example 9 | 4 | 90 | 10 | 380 | 3480 |
| Example 10 | 4 | 70 | 30 | 380 | 1700 |
| Comp. Example 10 | 4 | 40 | 60 | 380 | 820 |
| Comp. Example 11 | 4 | 100 | 0 | 400 | 2500 |
| Example 11 | 4 | 90 | 10 | 400 | 1860 |
| Example 12 | 4 | 70 | 30 | 400 | 1020 |
| Comp. Example 12 | 4 | 40 | 60 | 400 | 500 |
| Comp. Example 13 | 5 | 100 | 0 | 360 | 4800 |
| Example 13 | 5 | 90 | 10 | 360 | 3920 |
| Example 14 | 5 | 70 | 30 | 360 | 1860 |
| Comp. Example 14 | 5 | 40 | 60 | 360 | 890 |
| Comp. Example 15 | 5 | 100 | 0 | 380 | 2600 |
| Example 15 | 5 | 90 | 10 | 380 | 1960 |
| Example 16 | 5 | 70 | 30 | 380 | 1080 |
| Comp. Example 16 | 5 | 40 | 60 | 380 | 520 |

Note)
L.C. type polyimide; Liquid crystal type polyimide

EXAMPLES 17~20

The polyimide powder obtained in Synthesis Example 6 was dryblended with the liquid crystal type polyimide powder obtained in Synthesis Example 1 in various proportions illustrated in Table 5. Melt viscosity of the composition obtained was measured with a Koka type flow tester (Shimadzu CFT-500) under 100 kg load by using an orifice of 0.1 cm in diameter and 1 cm in length. Results are illustrated in Table 5.

COMPARATIVE EXAMPLES 17~20

Compositions outside the scope of the present invention were prepared and melt viscosity of these compositions was measured by the same procedures as carried out in Examples 17~20. Results are illustrated in Table 5.

TABLE 5

| No. | Polyimide Synthesis Example No. | wt. part | L.C. type polyimide Synthesis Example 1 wt. part | Flow tester temperature (°C.) | Melt viscosity (poise) |
|---|---|---|---|---|---|
| Comp. Example 17 | 6 | 100 | 100 | 380 | 3820 |
| Example 17 | 6 | 90 | 10 | 380 | 2960 |
| Example 18 | 6 | 70 | 30 | 380 | 1620 |
| Comp. Example 18 | 6 | 40 | 60 | 380 | 730 |
| Comp. Example 19 | 6 | 100 | 0 | 400 | 2260 |
| Example 19 | 6 | 90 | 10 | 400 | 1980 |
| Example 20 | 6 | 70 | 30 | 400 | 1000 |
| Comp. Example 20 | 6 | 40 | 60 | 400 | 430 |

Note:
L.C. type polyimide - Liquid crystal type polyimide

EXAMPLES 21~28

The polyimide powder obtained in Synthesis Examples 9 and 10 was dryblended with the liquid crystal type polyimide powder obtained in Synthesis Example 7 in various proportions illustrated in Table 6. Melt viscosity of the composition obtained was measured with a Koka type flow tester (Shimadzu CFT-500) under 100 kg load by using an orifice of 0.1 cm in diameter and 1 cm in length. Results are illustrated in Table 6.

COMPARATIVE EXAMPLES 21~28

Compositions outside the scope of the invention were prepared and melt viscosity of these compositions was measured by the same procedures as carried out in Examples 21~28. Results are illustrated in Table 6.

TABLE 6

| No. | Polyimide Synthesis Example No. | wt. part | L.C. type polyimide Synthesis Example 7 part | Flow tester temperature (°C.) | Melt viscosity (poise) |
|---|---|---|---|---|---|
| Comp. Example 21 | 9 | 100 | 0 | 400 | 4800 |
| Example 21 | 9 | 90 | 10 | 400 | 3960 |
| Example 22 | 9 | 70 | 30 | 400 | 1980 |
| Comp. Example 22 | 9 | 40 | 60 | 400 | 890 |
| Comp. Example 23 | 9 | 100 | 0 | 420 | 3080 |
| Example 23 | 9 | 90 | 10 | 420 | 2490 |
| Example 24 | 9 | 70 | 30 | 420 | 1280 |
| Comp. Example 24 | 9 | 40 | 60 | 420 | 650 |
| Comp. Example 25 | 10 | 100 | 0 | 400 | 5300 |
| Example 25 | 10 | 90 | 10 | 400 | 4340 |
| Example 26 | 10 | 70 | 30 | 400 | 2100 |
| Comp. Example 26 | 10 | 40 | 60 | 400 | 950 |
| Comp. Example 27 | 10 | 100 | 0 | 420 | 3320 |
| Example 27 | 10 | 90 | 10 | 420 | 2600 |
| Example 28 | 10 | 70 | 30 | 420 | 1260 |
| Comp. Example 28 | 10 | 40 | 60 | 420 | 620 |

Note)
L.C. type polyimide: Liquid crystal type polyimide

EXAMPLES 29~32

The polyimide powder obtained in Synthesis Examples 11 was dryblended with the liquid crystal type polyimide powder obtained in Synthesis Example 7 in various proportions illustrated in Table 7. Melt viscosity of the composition obtained was measured with a Koka type flow tester (Shimadzu CFT-500) under 100 kg load by using an orifice of 0.1 cm in diameter and 1 cm in length. Results are illustrated in Table 7.

COMPARATIVE EXAMPLES 29~32

Compositions outside the scope of the invention were prepared and melt viscosity of these compositions was measured by the same procedures as carried out in Examples 29~32. Results are illustrated in Table 7.

TABLE 7

| No. | Polyimide Synthesis Example No. | wt. parts | L.C. type polyimide Synthesis Example 7 wt. parts | Flow tester temperature (°C.) | Melt viscosity (poise) |
|---|---|---|---|---|---|
| Comp. Example 29 | 11 | 100 | 0 | 380 | 4110 |
| Example 29 | 11 | 90 | 10 | 380 | 3400 |
| Example 30 | 11 | 70 | 30 | 380 | 1620 |
| Comp. | 11 | 40 | 60 | 380 | 780 |

TABLE 7-continued

| No. | Polyimide Synthesis Example No. | wt. parts | L.C. type polyimide Synthesis Example 7 wt. parts | Flow tester temperature (°C.) | Melt viscosity (poise) |
|---|---|---|---|---|---|
| Example 30 | | | | | |
| Comp. Example 31 | 11 | 100 | 0 | 400 | 2480 |
| Example 31 | 11 | 90 | 10 | 400 | 1800 |
| Example 32 | 11 | 70 | 30 | 400 | 1030 |
| Comp. Example 32 | 11 | 40 | 60 | 400 | 480 |

Note)
L.C. type polyimide: Liquid crystal type polyimide

EXAMPLES 33~36

The polyimide powder obtained in Synthesis Example 12 was dryblended with the liquid crystal type polyimide powder obtained in Synthesis Example 8 in various proportions illustrated in Table 8. Melt viscosity of the composition obtained was measured with a Koka type flow tester (Shimadzu CFT-500) under 100 kg load by using an orifice of 0.1 cm in diameter and 1 cm in length. Results are illustrated in Table 8.

COMPARATIVE EXAMPLES 33~36

Compositions outside the scope of the invention were prepared and melt viscosity of these compositions was measured by the same procedures as carried out in Examples 33~36. Results are illustrated in Table 8.

TABLE 8

| No. | Polyimide Synthesis Example No. | wt. parts | L.C. type polyimide Synthesis Example 8 wt. parts | Flow tester temperature (°C.) | Melt viscosity (poise) |
|---|---|---|---|---|---|
| Comp. Example 33 | 12 | 100 | 0 | 400 | 4780 |
| Example 33 | 12 | 90 | 10 | 400 | 3950 |
| Example 34 | 12 | 70 | 30 | 400 | 1950 |
| Comp. Example 34 | 12 | 40 | 60 | 400 | 870 |
| Comp. Example 35 | 12 | 100 | 0 | 420 | 3090 |
| Example 35 | 12 | 90 | 10 | 420 | 2500 |
| Example 36 | 12 | 70 | 30 | 420 | 1290 |
| Comp. Example 36 | 12 | 40 | 60 | 420 | 660 |

Note)
L.C. type polyimide: Liquid crystal type polyimide

EXAMPLES 37~44

The polyimide powder obtained in Synthesis Examples 13 and 17 was dryblended with the liquid crystal type polyimide powder obtained in Synthesis Example 15 in various proportions illustrated in Table 9. Melt viscosity of the composition obtained was measured with a Koka type flow tester (Shimadzu CFT-500) under 100 kg load by using an orifice of 0.1 cm in diameter and 1 cm in length. Results are illustrated in Table 9.

COMPARATIVE EXAMPLES 37~44

Compositions outside the scope of the invention were prepared and melt viscosity of these compositions was measured by the same procedures as carried out in Examples 37~44. Results are illustrated in Table 9.

TABLE 9

| No. | Polyimide Synthesis Example No. | wt. part | L.C. type polyimide Synthesis Example 15 wt. part | Flow tester temperature (°C.) | Melt viscosity (poise) |
|---|---|---|---|---|---|
| Comp. Example 37 | 13 | 100 | 0 | 400 | 5600 |
| Example 37 | 13 | 90 | 10 | 400 | 4300 |
| Example 38 | 13 | 70 | 30 | 400 | 2160 |
| Comp. Example 38 | 13 | 40 | 60 | 400 | 930 |
| Comp. Example 39 | 13 | 100 | 0 | 420 | 3700 |
| Example 39 | 13 | 90 | 10 | 420 | 2760 |
| Example 40 | 13 | 70 | 30 | 420 | 1360 |
| Comp. Example 40 | 13 | 40 | 60 | 420 | 720 |
| Comp. Example 41 | 17 | 100 | 0 | 380 | 4300 |
| Example 41 | 17 | 90 | 10 | 380 | 3320 |
| Example 42 | 17 | 70 | 30 | 380 | 1760 |
| Comp. Example 42 | 17 | 40 | 60 | 380 | 850 |
| Comp. Example 43 | 17 | 100 | 0 | 400 | 2480 |
| Example 43 | 17 | 90 | 10 | 400 | 1760 |
| Example 44 | 17 | 70 | 30 | 400 | 1030 |
| Comp. Example 44 | 17 | 40 | 60 | 400 | 420 |

Note)
L.C. type polyimide: Liquid crystal type polyimide

EXAMPLES 45~48

The polyimide powder obtained in Synthesis Examples 14 was dryblended with the liquid crystal type polyimide powder obtained in Synthesis Example 16 in various proportions illustrated in Table 10. Melt viscosity of the composition obtained was measured with a Koka type flow tester (Shimadzu CFT-500) under 100 kg load by using an orifice of 0.1 cm in diameter and 1 cm in length. Results are illustrated in Table 10.

COMPARATIVE EXAMPLES 45~48

Compositions outside the scope of the invention were prepared and melt viscosity of these compositions was measured by the same procedures as carried out in Examples 45~48. Results are illustrated in Table 10.

TABLE 10

| No. | Polyimide Synthesis Example No. | wt. part | L.C. type polyimide Synthesis Example 16 wt. part | Flow tester temperature (°C.) | Melt viscosity (poise) |
|---|---|---|---|---|---|
| Comp. Example 45 | 14 | 100 | 0 | 400 | 5580 |
| Example 45 | 14 | 90 | 10 | 400 | 4370 |
| Example 46 | 14 | 70 | 30 | 400 | 2130 |
| Comp. Example 46 | 14 | 40 | 60 | 400 | 920 |
| Comp. Example 47 | 14 | 100 | 0 | 420 | 3730 |
| Example 47 | 14 | 90 | 10 | 420 | 2790 |
| Example 48 | 14 | 70 | 30 | 420 | 1380 |
| Comp. Example 48 | 14 | 40 | 60 | 420 | 750 |

Note)
L.C. type polyimide: Liquid crystal type polyimide

EXAMPLES 49~56

The polyimide powder obtained in Synthesis Examples 9, 10, 11, and 12 was dryblending with the liquid crystal type polyimide powder obtained in Synthesis Examples 7 and 8 in various proportions illustrated in Table 11. The compositions thus obtained was melt-kneaded and delivered from an extruder having a bore diameter of 40 mm and screw compression ratio of 3:1 and cut into uniform pallets.

The pallets thus obtained were injection molded as usual and the minimum injection pressure was measured.

Results are illustrated in Table 11.

COMPARATIVE EXAMPLES 49~56

Compositions outside the scope of the invention were prepared and melt viscosity of these compositions was measured by the same procedures as carried out in Examples 49~56

Results are illustrated in Table 11.

TABLE 11

| | Polyimide | | L.C. type polyimide | | Minimum injection pressure (kg/cm²)* |
|---|---|---|---|---|---|
| | Synthesis Example No | wt. part | Synthesis Example No. | wt. part | |
| Com. Ex. 49 | 9 | 100 | 7 | 0 | 650 |
| Example 49 | 9 | 90 | 7 | 10 | 540 |
| Example 50 | 9 | 70 | 7 | 30 | 210 |
| Com. Ex. 50 | 9 | 40 | 7 | 60 | ** |
| Com. Ex. 51 | 10 | 100 | 7 | 0 | 680 |
| Example 51 | 10 | 90 | 7 | 10 | 560 |
| Example 52 | 10 | 70 | 7 | 30 | 280 |
| Com. Ex. 52 | 10 | 40 | 7 | 60 | ** |
| Com. Ex. 53 | 11 | 100 | 7 | 0 | 550 |
| Example 53 | 11 | 90 | 7 | 10 | 460 |
| Example 54 | 11 | 70 | 7 | 30 | 220 |
| Com. Ex. 54 | 11 | 40 | 7 | 60 | ** |
| Com. Ex. 55 | 12 | 100 | 8 | 0 | 660 |
| Example 55 | 12 | 90 | 8 | 10 | 560 |
| Example 56 | 12 | 70 | 8 | 30 | 220 |
| Com. Ex. 56 | 12 | 40 | 8 | 60 | ** |

*Lower minimum injection pressure indicates lower melt viscosity.
**Lower than the detection limit 90 kg/cm².

EXAMPLES 57~60

The polyimide powder obtained in Synthesis Example 18 was dryblended with the liquid crystal type polyimide powder obtained in Synthesis Example 1 in various proportions illustrated in Table 12. Melt viscosity of the composition obtained was measured with a Koka type flow tester (Shimadzu CFT-500) under 100 kg load by using an orifice of 0.1 cm in diameter and 1 cm in length. Results are illustrated in Table 12.

COMPARATIVE EXAMPLES 57~60

Compositions outside the scope of the invention were prepared and melt viscosity of these compositions was measured by the same procedures as carried out in Examples 57~60. Results are illustrated in Table 12.

TABLE 12

| | Polyimide | L.C. type polyimide | | Flow tester | |
|---|---|---|---|---|---|
| No. | Synthesis Example 18 wt. part | Synthesis Example No. | wt. part | temperature (°C.) | Melt viscosity (poise) |
| Comp. Example 57 | 100 | 1 | 0 | 380 | 10200 |
| Example 57 | 90 | 1 | 10 | 380 | 5900 |
| Example 58 | 70 | 1 | 30 | 380 | 2500 |
| Comp. Example 58 | 40 | 1 | 60 | 380 | 980 |
| Comp. Example 59 | 100 | 1 | 0 | 400 | 6200 |
| Example 59 | 90 | 1 | 10 | 400 | 3020 |

TABLE 12-continued

| | Polyimide | L.C. type polyimide | | Flow tester | |
|---|---|---|---|---|---|
| No. | Synthesis Example 18 wt. part | Synthesis Example No. | wt. part | temperature (°C.) | Melt viscosity (poise) |
| Example 60 | 70 | 1 | 30 | 400 | 1640 |
| Comp. Example 60 | 40 | 1 | 60 | 400 | 800 |

EXAMPLES 61~64

The polyimide powder obtained in Synthesis Example 19 was dryblended with the liquid crystal type polyimide powder obtained in Synthesis Example 7 in various proportions illustrated in Table 13. Melt viscosity of the composition obtained was measured with a Koka type flow tester (Shimadzu CFT-500) under 100 kg load by using an orifice of 0.1 cm in diameter and 1 cm in length. Results are illustrated in Table 13.

COMPARATIVE EXAMPLES 61~64

Compositions outside the scope of the invention were prepared and melt viscosity of these compositions was measured by the same procedures as carried out in Examples 61~64. Results are illustrated in Table 13.

TABLE 13

| | Polyimide | L.C. type polyimide | | Flow tester | |
|---|---|---|---|---|---|
| No. | Synthesis Example 19 wt. part | Synth. Example No. | wt. part | temperature (°C.) | Melt viscosity (poise) |
| Comp. Example 61 | 100 | 7 | 0 | 380 | 9800 |
| Example 61 | 90 | 7 | 10 | 380 | 5640 |
| Example 62 | 70 | 7 | 30 | 380 | 2320 |
| Comp. Example 62 | 40 | 7 | 60 | 380 | 950 |
| Comp. Example 63 | 100 | 7 | 0 | 400 | 6120 |
| Example 63 | 90 | 7 | 10 | 400 | 2980 |
| Example 64 | 70 | 7 | 30 | 400 | 1600 |
| Comp. Example 64 | 40 | 7 | 60 | 400 | 760 |

EXAMPLES 65~68

The polyimide powder obtained in Synthesis Example 20 was dryblended with the liquid crystal type polyimide powder obtained in Synthesis Example 8 in various proportions illustrated in Table 14. Melt viscosity of the composition obtained was measured with a Koka type flow tester (Shimadzu CFT-500) under 100 kg load by using an orifice of 0.1 cm in diameter and 1 cm in length. Results are illustrated in Table 14.

COMPARATIVE EXAMPLES 65~68

Compositions outside the scope of the invention were prepared and melt viscosity of these compositions was measured by the same procedures as carried out in Examples 65~68. Results are illustrated in Table 14.

TABLE 14

| | Polyimide | L.C. type polyimide | | Flow tester | |
|---|---|---|---|---|---|
| No. | Synthesis Example 20 wt. part | Synth. Example No. | wt. part | temperature (°C.) | Melt viscosity (poise) |
| Comp. Example 65 | 100 | 8 | 0 | 380 | 11300 |

TABLE 14-continued

| No. | Polyimide Synthesis Example 20 wt. part | L.C. type polyimide Synth. Example No. | wt. part | Flow tester temperature (°C.) | Melt viscosity (poise) |
|---|---|---|---|---|---|
| Example 65 | 90 | 8 | 10 | 380 | 6100 |
| Example 66 | 70 | 8 | 30 | 380 | 2750 |
| Comp. Example 66 | 40 | 8 | 60 | 380 | 990 |
| Comp. Example 67 | 100 | 8 | 0 | 400 | 6520 |
| Example 67 | 90 | 8 | 10 | 400 | 3210 |
| Example 68 | 70 | 8 | 30 | 400 | 1770 |
| Comp. Example 68 | 40 | 8 | 60 | 400 | 890 |

EXAMPLES 69~72

The polyimide powder obtained in Synthesis Example 21 was dryblended with the liquid crystal type polyimide powder obtained in Synthesis Example 15 in various proportions illustrated in Table 15. Melt viscosity of the composition obtained was measured with a Koka type flow tester (Shimadzu CFT-500) under 100 kg load by using an orifice of 0.1 cm in diameter and 1 cm in length. Results are illustrated in Table 15.

COMPARATIVE EXAMPLES 69~72

Compositions outside the scope of the invention were prepared and melt viscosity of these compositions was measured by the same procedures as carried out in Examples 69~72. Results are illustrated in Table 15.

TABLE 15

| No. | Polyimide Synthesis Example 21 wt. part | L.C. type polyimide Synth. Example No. | wt. part | Flow tester temperature (°C.) | Melt viscosity (poise) |
|---|---|---|---|---|---|
| Comp. Example 69 | 100 | 15 | 0 | 380 | 10000 |
| Example 69 | 90 | 15 | 10 | 380 | 5880 |
| Example 70 | 70 | 15 | 30 | 380 | 2440 |
| Comp. Example 70 | 40 | 15 | 60 | 380 | 960 |
| Comp. Example 71 | 100 | 15 | 0 | 400 | 6180 |
| Example 71 | 90 | 15 | 10 | 400 | 2950 |
| Example 72 | 70 | 15 | 30 | 400 | 1630 |
| Comp. Example 72 | 40 | 15 | 60 | 400 | 840 |

EXAMPLES 73~76

The polyimide powder obtained in Synthesis Example 22 was dryblended with the liquid crystal type polyimide powder obtained in Synthesis Example 16 in various proportions illustrated in Table 16. Melt viscosity of the composition obtained was measured with a Koka type flow tester (Shimadzu CFT-500) under 100 kg load by using an orifice of 0.1 cm in diameter and 1 cm in length. Results are illustrated in Table 16.

COMPARATIVE EXAMPLES 73~76

Compositions outside the scope of the invention were prepared and melt viscosity of these compositions was measured by the same procedures as carried out in Examples 73~76. Results are illustrated in Table 16.

TABLE 16

| No. | Polyimide Synthesis Example 22 wt. part | L.C. type polyimide Synth. Example No. | wt. part | Flow tester temperature (°C.) | Melt viscosity (poise) |
|---|---|---|---|---|---|
| Comp. Example 73 | 100 | 16 | 0 | 380 | 10840 |
| Example 73 | 90 | 16 | 10 | 380 | 5880 |
| Example 74 | 70 | 16 | 30 | 380 | 2480 |
| Comp. Example 74 | 40 | 16 | 60 | 380 | 970 |
| Comp. Example 75 | 100 | 16 | 0 | 400 | 6180 |
| Example 75 | 90 | 16 | 10 | 400 | 3180 |
| Example 76 | 70 | 16 | 30 | 400 | 1720 |
| Comp. Example 76 | 40 | 16 | 60 | 400 | 830 |

EXAMPLES 77~80

The polyimide powder obtained in Synthesis Example 19 and 21 were dryblended with the liquid crystal type polyimide powder obtained in Synthesis Example 7 and 15 in various proportions illustrated in Table 17 and 18. The compositions thus obtained was melt-kneaded and delivered from an extruder having a bore diameter of 40 mm and screw compression ratio of 3:1 and cut into uniform pallets.

The pallets thus obtained were injection molded as usual and the minimum injection pressure was measured. Results are illustrated in Table 17 and 18.

COMPARATIVE EXAMPLES 77~80

Compositions outside the scope of the invention were prepared and melt viscosity of these compositions was measured by the same procedures as carried out in Examples 77~80. Results are illustrated in Table 17 and 18.

TABLE 17

| | Polyimide Synthesis Example No | wt. part | L.C. type polyimide Synthesis Example No. | wt. part | Minimum injection pressure* (kg/cm$^2$) |
|---|---|---|---|---|---|
| Com. Ex. 77 | 19 | 100 | 7 | 0 | 690 |
| Example 77 | 19 | 90 | 7 | 10 | 520 |
| Example 78 | 19 | 70 | 7 | 30 | 280 |
| Com. Ex. 78 | 19 | 40 | 7 | 60 | ** |

TABLE 18

| | Polyimide Synthesis Example No | wt. parts | L.C. type polyimide Synthesis Example No. | wt. parts | Minimum injection pressure* (kg/cm$^2$) |
|---|---|---|---|---|---|
| Com. Ex. 79 | 21 | 100 | 15 | 0 | 650 |
| Example 79 | 21 | 90 | 15 | 10 | 510 |
| Example 80 | 21 | 70 | 15 | 30 | 260 |
| Com. Ex. 80 | 21 | 40 | 15 | 60 | ** |

*Lower minimum injection pressure indicates lower melt viscosity.
**Lower than the detection limit 90 kg/cm$^2$.

EXAMPLES 81~88

The polyimide powder obtained in Synthesis Examples 23 and 24 was dry blended with the liquid crystal type polyimide powder obtained in Synthesis Example 1 in various proportion illustrated in Tables 19 and 20. Melt viscosity of the mixture was measured with a Koka type flow tester CFT-500(Trade Mark of Shimadzu Seisakusho Co.) by using an orifice of 0.1 cm in diameter and 1 cm in length under 100 kg load. Results are illustrated in Table 19 and 20.

Glass transition temperature (Tg) of the strand extruded from the flow tester was measured by DSC and illustrated in Tables 19 and 20.

Mixtures of aromatic polyimide copolymer with the liquid crystal type aromatic polyimide in the proportion of these examples had lower melt viscosity as compared with aromatic polyimide copolymer alone and were almost equal in Tg to that of aromatic polyimide copolymer.

COMPARATIVE EXAMPLES 81~88

Compositions outside the scope of the invention were used and melt viscosity was measured by the same procedures as carried out in Examples 81~88.

Results are illustrated in Tables 19 and 20.

TABLE 19

| | Polyimide Synthesis Example 23 (wt. part) | Liquid Crystal Polyimide Synth. Example No. | (wt. part) | Flow tester temperature (°C.) | Viscosity (poise) | Melt Tg (°C.) |
|---|---|---|---|---|---|---|
| Comparative Example 81 | 100 | 1 | 0 | 400 | 16000 | 254 |
| Example 81 | 90 | 1 | 10 | 400 | 8300 | 250 |
| Example 82 | 70 | 1 | 30 | 400 | 3200 | 250 |
| Comparative Example 82 | 40 | 1 | 60 | 400 | 1200 | 244 |
| Comparative Example 83 | 100 | 1 | 0 | 420 | 8900 | 253 |
| Example 83 | 90 | 1 | 10 | 420 | 5680 | 250 |
| Example 84 | 70 | 1 | 30 | 420 | 2250 | 251 |
| Comparative Example 84 | 40 | 1 | 60 | 420 | 1050 | 244 |

TABLE 20

| | Polyimide Synthesis Example 24 (wt. part) | Liquid Crystal Polyimide Synth. Example No. | (wt. part) | Flow tester temperature (°C.) | Viscosity (poise) | Melt Tg (°C.) |
|---|---|---|---|---|---|---|
| Comparative Example 85 | 100 | 1 | 0 | 400 | 14200 | 251 |
| Example 85 | 90 | 1 | 10 | 400 | 6320 | 250 |
| Example 86 | 70 | 1 | 30 | 400 | 2800 | 251 |
| Comparative Example 86 | 40 | 1 | 60 | 400 | 980 | 245 |
| Comparative Example 87 | 100 | 1 | 0 | 420 | 5600 | 251 |
| Example 87 | 90 | 1 | 10 | 420 | 3900 | 250 |
| Example 88 | 70 | 1 | 30 | 420 | 1960 | 251 |
| Comparative Example 88 | 40 | 1 | 60 | 420 | 870 | 245 |

EXAMPLES 89~96

The polyimide powder obtained in Synthesis Examples 25 and 29 was dry blended with the liquid crystal type polyimide powder obtained in Synthesis Example 7 in various proportion illustrated in Tables 21 and 22. Melt viscosity of the mixture was measured with a Koka type flow tester CFT-500(Trade Mark of Shimadzu Seisakusho Co.) by using an orifice of 0.1 cm in diameter and 1 cm in length under 100 kg load. Results are illustrated in Table 21 and 22.

Glass transition temperature (Tg) of the strand extruded from the flow tester was measured by DSC and illustrated in Tables 21 and 22.

Mixtures of aromatic polyimide copolymer with the liquid crystal type aromatic polyimide in the proportion of these examples had lower melt viscosity as compared with aromatic polyimide copolymer alone and were almost equal in Tg to that of aromatic polyimide copolymer.

COMPARATIVE EXAMPLES 89~96

Compositions outside the scope of the invention were used and melt viscosity was measured by the same procedures as carried out in Examples 89~96.

Results are illustrated in Tables 21 and 22.

TABLE 21

| | Polyimide Synthesis Example 25 (wt. part) | Liquid Crystal Polyimide Synth. Example No. | (wt. part) | Flow tester temperature (°C.) | Viscosity (poise) | Melt Tg (°C.) |
|---|---|---|---|---|---|---|
| Comparative Example 89 | 100 | 7 | 0 | 400 | 15800 | 253 |
| Example 89 | 90 | 7 | 10 | 400 | 8000 | 251 |
| Example 90 | 70 | 7 | 30 | 400 | 3100 | 250 |
| Comparative Example 90 | 40 | 7 | 60 | 400 | 1100 | 246 |
| Comparative Example 91 | 100 | 7 | 0 | 420 | 8860 | 254 |
| Example 91 | 90 | 7 | 10 | 420 | 5500 | 250 |
| Example 92 | 70 | 7 | 30 | 420 | 2200 | 251 |
| Comparative Example 92 | 40 | 7 | 60 | 420 | 980 | 246 |

TABLE 22

| | Polyimide Synthesis Example 29 (wt. part) | Liquid Crystal Polyimide Synth. Example No. | (wt. part) | Flow tester temperature (°C.) | Viscosity (poise) | Melt Tg (°C.) |
|---|---|---|---|---|---|---|
| Comparative Example 93 | 100 | 7 | 0 | 400 | 14600 | 251 |
| Example 93 | 90 | 7 | 10 | 400 | 6400 | 250 |
| Example 94 | 70 | 7 | 30 | 400 | 2780 | 251 |
| Comparative Example 94 | 40 | 7 | 60 | 400 | 990 | 245 |
| Comparative Example 95 | 100 | 7 | 0 | 420 | 5700 | 251 |
| Example 95 | 90 | 7 | 10 | 420 | 3860 | 249 |
| Example 96 | 70 | 7 | 30 | 420 | 1900 | 250 |
| Comparative Example 96 | 40 | 7 | 60 | 420 | 900 | 245 |

EXAMPLES 97~100

The polyimide powder obtained in Synthesis Example 26 was dry blended with the liquid crystal type polyimide powder obtained in Synthesis Example 8 in various proportion illustrated in Table 23. Melt viscosity of the mixture was measured with a Koka type flow tester CFT-500(Trade Mark of Shimadzu Seisakusho Co.) by using an orifice of 0.1 cm in diameter and 1 cm in length under 100 kg load. Results are illustrated in Table 23.

Glass transition temperature (Tg) of the strand extruded from the flow tester was measured by DSC and illustrated in Table 23.

Mixtures of aromatic polyimide copolymer with the liquid crystal type aromatic polyimide in the proportion of these examples had lower melt viscosity as compared with aromatic polyimide copolymer alone and were almost equal in Tg to that of aromatic polyimide copolymer.

COMPARATIVE EXAMPLES 97~100

Compositions outside the scope of the invention were used and melt viscosity was measured by the same procedures as carried out in Examples 97~100. Results are illustrated in Table 23.

TABLE 23

| | Polyimide Synthesis Example 26 (wt. part) | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 97 | 100 | 8 | 0 | 400 | 16100 | 255 |
| Example 97 | 90 | 8 | 10 | 400 | 8400 | 253 |
| Example 98 | 70 | 8 | 30 | 400 | 3280 | 252 |
| Comparative Example 98 | 40 | 8 | 60 | 400 | 1300 | 248 |
| Comparative Example 99 | 100 | 8 | 0 | 420 | 8960 | 253 |
| Example 99 | 90 | 8 | 10 | 420 | 5700 | 252 |
| Example 100 | 70 | 8 | 30 | 420 | 2400 | 253 |
| Comparative Example 100 | 40 | 8 | 60 | 420 | 1000 | 249 |

EXAMPLES 101~108

The polyimide powder obtained in Synthesis Examples 27 and 30 was dry blended with the liquid crystal type polyimide powder obtained in Synthesis Example 15 in various proportion illustrated in Tables 24 and 25. Melt viscosity of the mixture was measured with a Koka type flow tester CFT-500(Trade Mark of Shimadzu Seisakusho Co.) by using an orifice of 0.1 cm in diameter and 1 cm in length under 100 kg load. Results are illustrated in Tables 24 and 25.

Glass transition temperature (Tg) of the strand extruded from the flow tester was measured by DSC and illustrated in Tables 24 and 25.

Mixtures of the aromatic polyimide copolymer with the liquid crystal type aromatic polyimide in the proportion of these examples had lower melt viscosity as compared with aromatic polyimide copolymer alone and were almost equal in Tg to that of aromatic polyimide copolymer.

COMPARATIVE EXAMPLES 101~108

Compositions outside the scope of the invention were used and melt viscosity was measured by the same procedures as carried out in Examples 101~108.
Results are illustrated in Tables 24 and 25.

TABLE 24

| | Polyimide Synthesis Example 27 (wt. part) | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 101 | 100 | 15 | 0 | 400 | 16500 | 253 |
| Example 101 | 90 | 15 | 10 | 400 | 8600 | 252 |
| Example 102 | 70 | 15 | 30 | 400 | 3350 | 253 |
| Comparative Example 102 | 40 | 15 | 60 | 400 | 1240 | 246 |
| Comparative Example 103 | 100 | 15 | 0 | 420 | 9000 | 252 |
| Example 103 | 90 | 15 | 10 | 420 | 5860 | 253 |
| Example 104 | 70 | 15 | 30 | 420 | 2400 | 250 |
| Comparative Example 104 | 40 | 15 | 60 | 420 | 1080 | 249 |

TABLE 25

| | Polyimide Synthesis Example 30 (wt. part) | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 105 | 100 | 15 | 0 | 400 | 14800 | 250 |
| Example 105 | 90 | 15 | 10 | 400 | 6400 | 251 |
| Example 106 | 70 | 15 | 30 | 400 | 2880 | 248 |
| Comparative Example 106 | 40 | 15 | 60 | 400 | 990 | 247 |
| Comparative Example 107 | 100 | 15 | 0 | 420 | 5720 | 251 |
| Example 107 | 90 | 15 | 10 | 420 | 3960 | 250 |
| Example 108 | 70 | 15 | 30 | 420 | 2000 | 250 |
| Comparative Example 108 | 40 | 15 | 60 | 420 | 920 | 246 |

EXAMPLES 109~112

Polyimide powder obtained in Synthesis Examples 28 was dry blended with liquid crystal type polyimide powder obtained in Synthesis Example 16 in various proportions illustrated in Tables 26. Melt viscosity of the mixture was measured with a Koka type flow tester CFT-500(Trade Mark of Shimadzu Seisakusho Co.) by using an orifice of 0.1 cm in diameter and 1 cm in length under 100 kg load. Results are illustrated in Table 26.

Glass transition temperature (Tg) of the strand extruded from the flow tester was measured by DSC and illustrated in Table 26.

Mixtures of the aromatic polyimide copolymer with the liquid crystal type aromatic polyimide in the proportion of these examples had lower melt viscosity as compared with aromatic polyimide copolymer alone and were almost equal in Tg to that of aromatic polyimide copolymer.

COMPARATIVE EXAMPLES 109~112

Compositions outside the scope of the invention were used and melt viscosity was measured by the same procedures as carried out in Examples 109~112. Results are illustrated in Table 26.

TABLE 26

| | Polyimide Synthesis Example 28 (wt. part) | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 109 | 100 | 16 | 0 | 400 | 16000 | 252 |
| Example 109 | 90 | 16 | 10 | 400 | 8200 | 252 |
| Example 110 | 70 | 16 | 30 | 400 | 3180 | 252 |
| Comparative Example 110 | 40 | 16 | 60 | 400 | 1180 | 246 |
| Comparative Example 111 | 100 | 16 | 0 | 420 | 8860 | 253 |
| Example 111 | 90 | 16 | 10 | 420 | 5480 | 251 |
| Example 112 | 70 | 16 | 30 | 420 | 2400 | 250 |
| Comparative Example 112 | 40 | 16 | 60 | 420 | 960 | 245 |

EXAMPLES 113~120

Polyimide powder obtained in Synthesis Examples 25, 27, 29 and 30 was dry blended with liquid crystal type polyimide powder obtained in Synthesis Example 7 and 15 in various proportions illustrated in Tables 27 and 28.

The mixture was melt-kneaded with an extruder having a bore diameter of 40 mm and screw compression ratio of 3:1, and extruded to obtain uniform pellets.

The pellets thus obtained were injection molded with common injection molding machine and minimum injection pressure of the molded article was measured. Results are illustrated in Tables 27 and 28.

Mixtures of the aromatic polyimide copolymer with the liquid crystal type aromatic polyimide in the proportion of these examples had lower minimum injection pressure as compared with the aromatic polyimide copolymer alone and were better in processability.

COMPARATIVE EXAMPLES 113~120

Compositions outside the scope of the invention were used and minimum injection pressure was measured by the same procedures as carried out in Examples 113~120. Results are illustrated in Tables 27 and 28.

Compositions which did not contain liquid crystal type aromatic polyimide at all had high minimum injection pressure. When the amount of the liquid crystal type aromatic polyimide exceeds 50 parts by weight of the aromatic polyimide copolymer, melt viscosity became too low and minimum injection pressure could not be measured.

TABLE 27

| | Polyimide | | L.C. type polyimide | | Minimum injection |
|---|---|---|---|---|---|
| | Synthesis Example | wt. parts | Synthesis Example No. | wt. parts | pressure (kg/cm$^2$)* |
| Com. Ex. 113 | 25 | 100 | 7 | 0 | 680 |
| Example 113 | 25 | 90 | 7 | 10 | 560 |
| Example 114 | 25 | 70 | 7 | 30 | 320 |
| Com. Ex. 114 | 25 | 40 | 7 | 60 | ** |
| Com. Ex. 115 | 29 | 100 | 7 | 0 | 670 |
| Example 115 | 29 | 90 | 7 | 10 | 540 |
| Example 116 | 29 | 70 | 7 | 30 | 290 |
| Com. Ex. 116 | 29 | 40 | 7 | 60 | ** |

*Lower minimum injection pressure indicates lower melt viscosity.
**Lower than the detection limit 40 kg/cm$^2$.

TABLE 28

| | Polyimide | | L.C. type polyimide | | Minimum injection |
|---|---|---|---|---|---|
| | Synthesis Example | wt. parts | Synthesis Example No. | wt. parts | pressure (kg/cm$^2$)* |
| Com. Ex. 117 | 27 | 100 | 15 | 0 | 650 |
| Example 117 | 27 | 90 | 15 | 10 | 520 |
| Example 118 | 27 | 70 | 15 | 30 | 280 |
| Com. Ex. 118 | 27 | 40 | 15 | 60 | ** |
| Com. Ex. 119 | 30 | 100 | 15 | 0 | 670 |
| Example 119 | 30 | 90 | 15 | 10 | 560 |
| Example 120 | 30 | 70 | 15 | 30 | 270 |
| Com. Ex. 120 | 30 | 40 | 15 | 60 | ** |

*Lower minimum injection pressure indicates lower melt viscosity.
**Lower than the detection limit 40 kg/cm$^2$.

EXAMPLES 121 and 122

The pellets which were obtained in Examples 113 and 115 by blending the aromatic polyimide copolymer with the liquid crystal type aromatic polyimide in a ratio of 90:10 were injection molded at an injection temperature of 360°~400° C. and mold temperature of 150° C. Mechanical properties of molded specimens were measured and results are illustrated in Table 29. Tensile strength, tensile elastic modulus and elongation were measured in accordance with ASTM D-638.

The mixture of the aromatic polyimide copolymer and liquid liquid crystal type aromatic polyimide in a proportion of these examples had mechanical properties equivalent to the aromatic polyimide copolymer alone in Comparative Examples 121 and 122. Thus, mechanical properties were not decreased even though the liquid crystal type aromatic polyimide was mixed in the range of the invention.

COMPARATIVE EXAMPLES 121 and 122

Pellets obtained in Comparative Examples 113 and 115 were injection molded by the same procedures as carried out in Examples 121 and 122. Mechanical properties of molded specimens were measured and results are illustrated in Table 29.

TABLE 29

| | Pellets used for molding | Tensile strength (kg/cm$^2$) | Tensile elastic modulus (kg/cm$^2$) | Elongation (%) |
|---|---|---|---|---|
| Comparative example 121 | Comparative example 113 | 910 | 290 | 66 |
| Example 121 | Example 113 | 900 | 290 | 64 |
| Comparative example 122 | Comparative example 115 | 930 | 270 | 77 |
| Example 122 | Example 115 | 930 | 280 | 78 |

EXAMPLES 123~126

Aromatic polysulfone resin powder, VICTOREX PES 4100P (Trade Mark of ICI Ltd.) was dryblended with the liquid crystal type polyimide powder obtained in Synthesis Example 1 in various proportions illustrated in Table 30. Melt viscosity of the composition obtained was measured with a Koka type flow tester (Shimadzu CFT-500) under 100 kg load by using an orifice of 0.1 cm in diameter and 1 cm in length. Results are illustrated in Table 30.

COMPARATIVE EXAMPLES 123~126

Compositions outside the scope of the invention were prepared and melt viscosity of these compositions was measured by the same procedures as carried out in Examples 123~126. Results are illustrated in Table 30.

TABLE 30

| | VICTREX | L.C. type polyimide | | Flow tester | |
|---|---|---|---|---|---|
| No. | PES 4100P wt. part | Synth. Example No. | wt. part | temperature (°C.) | Melt viscosity (poise) |
| Comp. Example 123 | 100 | 1 | 0 | 370 | 5700 |
| Example 123 | 90 | 1 | 10 | 370 | 3540 |
| Example 124 | 70 | 1 | 30 | 370 | 1720 |
| Comp. Example 124 | 40 | 1 | 60 | 370 | 900 |
| Comp. Example 125 | 100 | 1 | 0 | 390 | 3300 |
| Example 125 | 90 | 1 | 10 | 390 | 2000 |
| Example 126 | 70 | 1 | 30 | 390 | 1050 |
| Comp. Example 126 | 40 | 1 | 60 | 390 | 540 |

EXAMPLES 127~130

Aromatic polysulfone resin powder, VICTOREX PES 4100P (Trade Mark of ICI Ltd.) was dryblended with the liquid crystal type polyimide powder obtained in Synthesis Example 7 in various proportions illustrated in Table 31. Melt viscosity of the composition obtained was measured with a Koka type flow tester (Shimadzu CFT-500) under 100 kg load by using an orifice of 0.1 cm in diameter and 1 cm in length. Results are illustrated in Table 31.

COMPARATIVE EXAMPLES 123, 125, 127, 128

Compositions outside the scope of the invention were prepared and melt viscosity of these compositions was measured by the same procedures as carried out in Examples 127~130. Results are illustrated in Table 31.

TABLE 31

| No. | VICTREX PES 4100P wt. part | L.C. type polyimide Synth. Example No. | wt. part | Flow tester temperature (°C.) | Melt viscosity (poise) |
|---|---|---|---|---|---|
| Comp. Example 123 | 100 | 7 | 0 | 370 | 5700 |
| Example 127 | 90 | 7 | 10 | 370 | 3580 |
| Example 128 | 70 | 7 | 30 | 370 | 1800 |
| Comp. Example 127 | 40 | 7 | 60 | 370 | 920 |
| Comp. Example 125 | 100 | 7 | 0 | 390 | 3300 |
| Example 129 | 90 | 7 | 10 | 390 | 2040 |
| Example 130 | 70 | 7 | 30 | 390 | 1080 |
| Comp. Example 128 | 40 | 7 | 60 | 390 | 580 |

EXAMPLES 131~134

Aromatic polysulfone resin powder, VICTOREX PES 4100P (Trade Mark of ICI Ltd.) was dryblended with the liquid crystal type polyimide powder obtained in Synthesis Example 15 in various proportions illustrated in Table 32. Melt viscosity of the composition obtained was measured with a Koka type flow tester (Shimadzu CFT-500) under 100 kg load by using an orifice of 0.1 cm in diameter and 1 cm in length. Results are illustrated in Table 32.

COMPARATIVE EXAMPLES 123, 125, 129 and 130

Compositions outside the scope of the invention were prepared and melt viscosity of these compositions was measured by the same procedures as carried out in Examples 131~134. Results are illustrated in Table 32.

TABLE 32

| No. | VICTREX PES 4100P wt. part | L.C. type polyimide Synth. Example No. | wt. part | Flow tester temperature (°C.) | Melt viscosity (poise) |
|---|---|---|---|---|---|
| Comp. Example 123 | 100 | 15 | 0 | 370 | 5700 |
| Example 131 | 90 | 15 | 10 | 370 | 3350 |
| Example 132 | 70 | 15 | 30 | 370 | 1550 |
| Comp. Example 129 | 40 | 15 | 60 | 370 | 820 |
| Comp. Example 125 | 100 | 15 | 0 | 390 | 3300 |
| Example 133 | 90 | 15 | 10 | 390 | 1800 |
| Example 134 | 70 | 15 | 30 | 390 | 1010 |
| Comp. Example 130 | 40 | 15 | 60 | 390 | 480 |

EXAMPLES 135~138

Aromatic polysulfone resin powder, UDEL POLY-SULFONE P-1700 (Trade Mark of Union Carbide Corp.) was dryblended with the liquid crystal type polyimide powder obtained in Synthesis Example 7 in various proportions illustrated in Table 33. Melt viscosity of the composition obtained was measured with a Koka type flow tester (Shimadzu CFT-500) under 100 kg load by using an orifice of 0.1 cm in diameter and 1 cm in length. Results are illustrated in Table 33.

COMPARATIVE EXAMPLES 131~134

Compositions outside the scope of the invention were prepared and melt viscosity of these compositions was measured by the same procedures as carried out in Examples 135~138. Results are illustrated in Table 33.

TABLE 33

| No. | UDEL POLYSULFONE P-1700 wt. part | L.C. type polyimide Synth. Example No. | wt. part | Flow tester temperature (°C.) | Melt viscosity (poise) |
|---|---|---|---|---|---|
| Comp. Example 131 | 100 | 7 | 0 | 370 | 4900 |
| Example 135 | 90 | 7 | 10 | 370 | 3020 |
| Example 136 | 70 | 7 | 30 | 370 | 1580 |
| Comp. Example 132 | 40 | 7 | 60 | 370 | 650 |
| Comp. Example 133 | 100 | 7 | 0 | 390 | 3020 |
| Example 137 | 90 | 7 | 10 | 390 | 1860 |
| Example 138 | 70 | 7 | 30 | 390 | 1040 |
| Comp. Example 134 | 40 | 7 | 60 | 390 | 420 |

EXAMPLES 139~142

Aromatic polysulfone resin powder, UDEL POLY-SULFONE P-1700 (Trade Mark of Union Carbide Corp.) was dryblended with the liquid crystal type polyimide powder obtained in Synthesis Example 8 in various proportions illustrated in Table 34. Melt viscosity of the composition obtained was measured with a Koka type flow tester (Shimadzu CFT-500) under 100 kg load by using an orifice of 0.1 cm in diameter and 1 cm in length. Results are illustrated in Table 34.

COMPARATIVE EXAMPLES 131, 133, 135 and 136

Compositions outside the scope of the invention were prepared and melt viscosity of these compositions was measured by the same procedures as carried out in Examples 139~142. Results are illustrated in Table 34.

TABLE 34

| No. | UDEL POLYSULFONE P-1700 wt. part | L.C. type polyimide Synth. Example No. | wt. part | Flow tester temperature (°C.) | Melt viscosity (poise) |
|---|---|---|---|---|---|
| Comp. Example 131 | 100 | 8 | 0 | 370 | 4900 |
| Example 139 | 90 | 8 | 10 | 370 | 3140 |
| Example 140 | 70 | 8 | 30 | 370 | 1640 |
| Comp. Example 135 | 40 | 8 | 60 | 370 | 700 |
| Comp. Example 133 | 100 | 8 | 0 | 390 | 3020 |
| Example 141 | 90 | 8 | 10 | 390 | 1890 |
| Example 142 | 70 | 8 | 30 | 390 | 1050 |
| Comp. Example 136 | 40 | 8 | 60 | 390 | 480 |

EXAMPLES 143~146

Aromatic polysulfone resin powder, UDEL POLY-SULFONE P-1700 (Trade Mark of Union Carbide Corp.) was dryblended with the liquid crystal type polyimide powder obtained in Synthesis Example 15 in various proportions illustrated in Table 35. Melt viscosity of the composition obtained was measured with a Koka type flow tester (Shimadzu CFT-500) under 100 kg load by using an orifice of 0.1 cm in diameter and 1 cm in length. Results are illustrated in Table 35.

COMPARATIVE EXAMPLES 131, 133, 137 and 138

Compositions outside the scope of the invention were prepared and melt viscosity of these compositions was measured by the same procedures as carried out in Examples 143~146. Results are illustrated in Table 35.

TABLE 35

| No. | UDEL POLYSULFONE P-1700 wt. part | L.C. type polyimide | | Flow tester | |
|---|---|---|---|---|---|
| | | Synth. Example No. | wt. part | temperature (°C.) | Melt viscosity (poise) |
| Comp. Example 131 | 100 | 15 | 0 | 370 | 4900 |
| Example 143 | 90 | 15 | 10 | 370 | 3000 |
| Example 144 | 70 | 15 | 30 | 370 | 1520 |
| Comp. Example 137 | 40 | 15 | 60 | 370 | 600 |
| Comp. Example 133 | 100 | 15 | 0 | 390 | 3020 |
| Example 145 | 90 | 15 | 10 | 390 | 1840 |
| Example 146 | 70 | 15 | 30 | 390 | 1000 |
| Comp. Example 138 | 40 | 15 | 60 | 390 | 400 |

EXAMPLES 147~150

Aromatic polysulfone resin powder, RADEL POLYSULFONE A-400 (Trade Mark of Union Carbide Corp.) was dryblended with the liquid crystal type polyimide powder obtained in Synthesis Example 7 in various proportions illustrated in Table 36. Melt viscosity of the composition obtained was measured with a Koka type flow tester (Shimadzu CFT-500) under 100 kg load by using an orifice of 0.1 cm in diameter and 1 cm in length. Results are illustrated in Table 36.

COMPARATIVE EXAMPLES 139~142

Compositions outside the scope of the invention were prepared and melt viscosity of these compositions was measured by the same procedures as carried out in Examples 147~150. Results are illustrated in Table 36.

TABLE 36

| No. | RADEL POLYSULFONE A-400 wt. part | L.C. type polyimide | | Flow tester | |
|---|---|---|---|---|---|
| | | Synth. Example No. | wt. part | temperature (°C.) | Melt viscosity (poise) |
| Comp. Example 139 | 100 | 7 | 0 | 370 | 5200 |
| Example 147 | 90 | 7 | 10 | 370 | 3020 |
| Example 148 | 70 | 7 | 30 | 370 | 1500 |
| Comp. Example 140 | 40 | 7 | 60 | 370 | 720 |
| Comp. Example 141 | 100 | 7 | 0 | 390 | 3120 |
| Example 149 | 90 | 7 | 10 | 390 | 1800 |
| Example 150 | 70 | 7 | 30 | 390 | 1020 |
| Comp. Example 142 | 40 | 7 | 60 | 390 | 500 |

EXAMPLES 151~154

Aromatic polysulfone resin powder, RADEL POLYSULFONE A-400 (Trade Mark of Union Carbide Corp.) was dryblended with the liquid crystal type polyimide powder obtained in Synthesis Example 15 in various proportions illustrated in Table 37. Melt viscosity of the composition obtained was measured with a Koka type flow tester (Shimadzu CFT-500) under 100 kg load by using an orifice of 0.1 cm in diameter and 1 cm in length. Results are illustrated in Table 37.

COMPARATIVE EXAMPLES 139, 141, 143 and 144

Compositions outside the scope of the invention were prepared and melt viscosity of these compositions was measured by the same procedures as carried out in Examples 151~154. Results are illustrated in Table 37.

TABLE 37

| No. | RADEL POLYSULFONE A-400 wt. part | L.C. type polyimide | | Flow tester | |
|---|---|---|---|---|---|
| | | Synth. Example No. | wt. part | temperature (°C.) | Melt viscosity (poise) |
| Comp. Exmple 139 | 100 | 15 | 0 | 370 | 5200 |
| Example 151 | 90 | 15 | 10 | 370 | 3000 |
| Example 152 | 70 | 15 | 30 | 370 | 1480 |
| Comp. Example 143 | 40 | 15 | 60 | 370 | 700 |
| Comp. Exmple 141 | 100 | 15 | 0 | 390 | 3120 |
| Example 153 | 90 | 15 | 10 | 390 | 1770 |
| Example 154 | 70 | 15 | 30 | 390 | 1030 |
| Comp. Example 144 | 40 | 15 | 60 | 390 | 480 |

EXAMPLES 155~159

Aromatic polysulfone resin powder, UDEL POLYSULFONE A-400 (Trade Mark of Union Carbide Corp.) was dryblended with the liquid crystal type polyimide powder obtained in Synthesis Example 16 in various proportions illustrated in Table 38. Melt viscosity of the composition obtained was measured with a Koka type flow tester (Shimadzu CFT-500) under 100 kg load by using an orifice of 0.1 cm in diameter and 1 cm in length. Results are illustrated in Table 38.

COMPARATIVE EXAMPLES 139, 141 145 and 146

Compositions outside the scope of the invention were prepared and melt viscosity of these compositions was measured by the same procedures as carried out in Examples 155~159.

Results are illustrated in Table 38.

TABLE 38

| No. | RADEL POLYSULFONE A-400 wt. part | L.C. type polyimide | | Flow tester | |
|---|---|---|---|---|---|
| | | Syn. Example No. | wt. part | temperature (°C.) | Melt viscosity (poise) |
| Comp. Example 139 | 100 | 16 | 0 | 370 | 5200 |
| Example 155 | 90 | 16 | 10 | 370 | 3080 |
| Example 156 | 70 | 16 | 30 | 370 | 1520 |
| Comp. Example 145 | 40 | 16 | 60 | 370 | 780 |
| Comp. Example 141 | 100 | 16 | 0 | 390 | 3120 |
| Example 157 | 90 | 16 | 10 | 390 | 1790 |
| Example 158 | 70 | 16 | 30 | 390 | 1050 |
| Comp. Example 146 | 40 | 16 | 60 | 390 | 520 |

EXAMPLES 159~164

Aromatic polysulfone resin powder, VICTREX PES 4100P (Trade Mark of ICI Ltd.), UDEL POLYSULFONE P-1700 (Trade Mark of Union Carbide Corp.) and UDEL POLYSULFONE A-400 (Trade Mark of Union Carbide Corp.) were dryblended with the crystalline polyimide powder obtained in Synthesis Example 7 and 15 in various proportions illustrated in Table 39, 40 and 41. The compositions thus obtained was melt-kneaded and delivered from an extruder having a bore diameter of 40 mm and screw compression ratio of 3:1 and cut into uniform pellets.

The pellets thus obtained were injection molded as usual and the minimum injection pressure was measured. Results are illustrated in Tables 39, 40 and 41.

COMPARATIVE EXAMPLES 147~152

Compositions outside the scope of the invention were prepared and minimum injection pressure of these compositions was measured by the same procedures as carried out in Example 159~164. Results are illustrated in Table 39, 40 and 41.

TABLE 39

|  | VICTREX PES 4100P wt. parts | L.C. type polyimide Synthesis Example No. | wt. parts | Minimum injection pressure (kg/cm$^2$)* |
| --- | --- | --- | --- | --- |
| Com. Ex. 147 | 100 | 7 | 0 | 680 |
| Example 159 | 90 | 7 | 10 | 540 |
| Example 160 | 70 | 7 | 30 | 270 |
| Com. Ex. 148 | 40 | 7 | 60 | ** |

TABLE 40

|  | UDEL POLYSULFONE P-1700 wt. parts | L.C. type polyimide Synthesis Example No. | wt. parts | Minimum injection pressure (kg/cm$^2$)* |
| --- | --- | --- | --- | --- |
| Com. Ex. 149 | 100 | 7 | 0 | 560 |
| Example 161 | 90 | 7 | 10 | 420 |
| Example 162 | 70 | 7 | 30 | 200 |
| Com. Ex. 150 | 40 | 7 | 60 | ** |

TABLE 41

|  | RADEL POLYSULFONE A-400 wt. parts | L.C. type polyimide Synthesis Example No. | wt. parts | Minimum injection pressure (kg/cm$^2$)* |
| --- | --- | --- | --- | --- |
| Com. Ex. 151 | 100 | 7 | 0 | 660 |
| Example 163 | 90 | 7 | 10 | 520 |
| Example 164 | 70 | 7 | 30 | 240 |
| Com. Ex. 152 | 40 | 7 | 60 | ** |

*Lower minimum injection pressure indicates lower melt viscosity.
**Lower than the detection limit 90 kg/cm$^2$.

EXAMPLES 165~184

Aromatic polyether imide ULTEM 1000 (Trade Mark of G E Co.) was dryblended with the liquid crystal type polyimide powder obtained in Synthesis Examples 1, 7, 8, 15 and 16 in various proportions illustrated in Table 42~46. Melt viscosity of the compositions obtained was measured with a Koka type flew tester (Shimadzu CFT-500) under 100 kg load by using as orifice of 0.1 cm in diameter and 1 cm in length. Results are illustrated in Tables 42~46.

Glass transition temperature (Tg) of the strand extruded from the orifice was measured by DSC. Results are illustrated in Table 42~46.

The mixture of aromatic polyether imide and liquid crystal type aromatic polyimide in a proportion of the present example had lower melt viscosity than the aromatic polyether imide alone and was almost equal in Tg to the aromatic polyether imide, The strand obtained from the flow tester was tough as the strand of aromatic polyether imide alone.

COMPARATIVE EXAMPLE 153~172

Compositions outside the scope of the invention were prepared and melt viscosity of these composition was measured by the same procedures as carried out in Example 165~184. Results are illustrated in Table 42~46.

Aromatic polyether imide which does not contain the liquid crystal type aromatic polyimide at all had high melt viscosity. When the proportion of the liquid crystal type aromatic polyimide was 50 parts by weight or more for 50 parts by weight of aromatic polyether imide, melt viscosity was lowered and the strand obtained become brittle.

TABLE 42

|  | Ultem 1000 wt. part | Liquid Crystal Polyimide Synth. Example No. | (wt. part) | Flow tester temperature (°C.) | Melt Viscosity (poise) | Tg (°C.) |
| --- | --- | --- | --- | --- | --- | --- |
| Comparative Example 153 | 100 | 1 | 0 | 390 | 5900 | 216 |
| Example 165 | 90 | 1 | 10 | 390 | 4260 | 215 |
| Example 166 | 70 | 1 | 30 | 390 | 2200 | 215 |
| Comparative Example 154 | 40 | 1 | 60 | 390 | 960 | 214 |
| Comparative Example 155 | 100 | 1 | 0 | 400 | 4700 | 215 |
| Example 167 | 90 | 1 | 10 | 400 | 3520 | 215 |
| Example 168 | 70 | 1 | 30 | 400 | 1660 | 216 |
| Comparative Example 156 | 40 | 1 | 60 | 420 | 780 | 214 |

TABLE 43

|  | Ultem 1000 wt. part | Liquid Crystal Polyimide Synth. Example No. | (wt. part) | Flow tester temperature (°C.) | Melt Viscosity (poise) | Tg (°C.) |
| --- | --- | --- | --- | --- | --- | --- |
| Comparative Example 157 | 100 | 7 | 0 | 390 | 5880 | 216 |
| Example 169 | 90 | 7 | 10 | 390 | 4200 | 214 |
| Example 170 | 70 | 7 | 30 | 390 | 2160 | 215 |
| Comparative Example 158 | 40 | 7 | 60 | 390 | 950 | 214 |
| Comparative Example 159 | 100 | 7 | 0 | 400 | 4680 | 215 |
| Example 171 | 90 | 7 | 10 | 400 | 3480 | 216 |
| Example 172 | 70 | 7 | 30 | 400 | 1600 | 214 |
| Comparative Example 160 | 40 | 7 | 60 | 420 | 740 | 215 |

TABLE 44

|  | Ultem 1000 wt. part | Liquid Crystal Polyimide Synth. Example No. | (wt. part) | Flow tester temperature (°C.) | Melt Viscosity (poise) | Tg (°C.) |
| --- | --- | --- | --- | --- | --- | --- |
| Comparative Example 161 | 100 | 8 | 0 | 390 | 6080 | 215 |
| Example 173 | 90 | 8 | 10 | 390 | 4440 | 214 |
| Example 174 | 70 | 8 | 30 | 390 | 2320 | 216 |

TABLE 44-continued

|  | Ultem 1000 wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 162 | 40 | 8 | 60 | 390 | 980 | 215 |
| Comparative Example 163 | 100 | 8 | 0 | 400 | 4820 | 214 |
| Example 175 | 90 | 8 | 10 | 400 | 3640 | 218 |
| Example 176 | 70 | 8 | 30 | 400 | 1780 | 215 |
| Comparative Example 164 | 40 | 8 | 60 | 400 | 820 | 216 |

TABLE 45

|  | Ultem 1000 wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 165 | 100 | 15 | 0 | 390 | 5600 | 215 |
| Example 177 | 90 | 15 | 10 | 390 | 4060 | 217 |
| Example 178 | 70 | 15 | 30 | 390 | 2020 | 214 |
| Comparative Example 166 | 40 | 15 | 60 | 390 | 930 | 216 |
| Comparative Example 167 | 100 | 15 | 0 | 400 | 4400 | 216 |
| Example 179 | 90 | 15 | 10 | 400 | 3100 | 214 |
| Example 180 | 70 | 15 | 30 | 400 | 1480 | 215 |
| Comparative Example 168 | 40 | 15 | 60 | 420 | 720 | 216 |

TABLE 46

|  | Ultem 1000 wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 169 | 100 | 16 | 0 | 390 | 5920 | 217 |
| Example 181 | 90 | 16 | 10 | 390 | 4280 | 215 |
| Example 182 | 70 | 16 | 30 | 390 | 2260 | 216 |
| Comparative Example 170 | 40 | 16 | 60 | 390 | 980 | 214 |
| Comparative Example 171 | 100 | 16 | 0 | 400 | 4780 | 215 |
| Example 183 | 90 | 16 | 10 | 400 | 3600 | 217 |
| Example 184 | 70 | 16 | 30 | 400 | 1720 | 216 |
| Comparative Example 172 | 40 | 16 | 60 | 420 | 780 | 214 |

EXAMPLE 185~188

Aromatic polyether imide ULTEM 1000 (Trade Mark of G E Co.) was dryblended with the liquid crystal type polyimide powder obtained in Synthesis Examples 7 and 15 in various proportions illustrated in Table 47. The compositions thus obtained was melt-kneaded and delivered from an extruder having a bore diameter of 40 mm and screw compression ratio of 3:1 and cut into uniform pallets.

The pellets thus obtained were injection molded as usual and the minimum injection pressure was measured. Results are illustrated in Table 47.

The mixture of aromatic polyether imide and the liquid crystal type aromatic polyimide in a proportion of the examples had lower minimum injection pressure than better processability.

COMPARATIVE EXAMPLE 173~176

Compositions outside the scope of the invention were prepared and the minimum injection pressure was measured by the same procedures as carried out in Example 185~188. Results are illustrated in Table 47.

Aromatic polyether imide which does not contain the liquid crystal type aromatic polyimide at all had high minimum injection pressure. When the liquid crystal type aromatic polyimide was 50 parts by weight or more for 50 parts by weight of the aromatic polyether imide, melt viscosity became too low and injection molding was difficult. Thus, minimum injection pressure could not be measured.

TABLE 47

|  | Ultem 1000 wt. part | L.C. type polyimide Synthesis Example No. | wt. part | Minimum injection pressure (kg/cm²)* |
|---|---|---|---|---|
| Com. Ex. 173 | 100 | 7 | 0 | 580 |
| Example 185 | 90 | 7 | 10 | 440 |
| Example 186 | 70 | 7 | 30 | 250 |
| Com. Ex. 174 | 40 | 7 | 60 | ** |
| Com. Ex. 175 | 100 | 15 | 0 | 560 |
| Example 187 | 90 | 15 | 10 | 420 |
| Example 188 | 70 | 15 | 30 | 240 |
| Com. Ex. 176 | 40 | 15 | 60 | ** |

*Lower minimum injection pressure indicates lower melt viscosity.
**Lower than the detection limit 90 kg/cm².

EXAMPLE 189~208

Aromatic polyamideimide TORLON 4203 L (Trade Mark of Amoco Co.) was dry blended with the polyimide powder obtained in Synthesis Examples 1, 7, 8, 15 and 16 in various proportions illustrated in Table 48~52.

The mixture was melt-kneaded with an extruder having a bore diameter of 40 mm and screw compression ratio of 3:1, and extruded to obtained uniform pellets.

The pellets thus obtained were injection molded with a common injection molding machine and minimum injection pressure of the molded article was measured. Results are illustrated in Table 48~52.

The mixture of aromatic polyetheramideimide and liquid crystal type aromatic polyimide in a proportion of the present example had lower melt viscosity than the aromatic polyetheramideimide alone and was almost equal in Tg to the aromatic polyetheramideimide.

COMPARATIVE EXAMPLES 177~196

Compositions outside the scope of the invention were used and minimum injection pressure was measured by the same procedures as carried out in Examples 189~208.

Results are illustrated in Table 48~52.

TABLE 48

|  | TORLON 4203L wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 177 | 100 | 1 | 0 | 380 | 72500 | 275 |
| Example 189 | 90 | 1 | 10 | 380 | 45000 | 274 |
| Example 190 | 70 | 1 | 30 | 380 | 26400 | 275 |
| Comparative Example 178 | 40 | 1 | 60 | 380 | 10700 | 273 |
| Comparative Example 179 | 100 | 1 | 0 | 400 | 25100 | 274 |

TABLE 48-continued

| | TORLON 4203L wt. part | Liquid Crystal Polyimide Synth. Example No. | (wt. part) | Flow tester temperature (°C.) | Melt Viscosity (poise) | Tg (°C.) |
|---|---|---|---|---|---|---|
| Example 191 | 90 | 1 | 10 | 400 | 15500 | 272 |
| Example 192 | 70 | 1 | 30 | 400 | 9100 | 275 |
| Comparative Example 180 | 40 | 1 | 60 | 400 | 3700 | 273 |

TABLE 49

| | TORLON 4203L wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 181 | 100 | 7 | 0 | 380 | 72200 | 276 |
| Example 193 | 90 | 7 | 10 | 380 | 45500 | 273 |
| Example 194 | 70 | 7 | 30 | 380 | 26800 | 275 |
| Comparative Example 182 | 40 | 7 | 60 | 380 | 11000 | 274 |
| Comparative Example 183 | 100 | 7 | 0 | 400 | 26800 | 274 |
| Example 195 | 90 | 7 | 10 | 400 | 16500 | 275 |
| Example 196 | 70 | 7 | 30 | 400 | 9700 | 276 |
| Comparative Example 184 | 40 | 7 | 60 | 400 | 3900 | 274 |

TABLE 50

| | TORLON 4203L wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 185 | 100 | 8 | 0 | 380 | 72500 | 274 |
| Example 197 | 90 | 8 | 10 | 380 | 46300 | 275 |
| Example 198 | 70 | 8 | 30 | 380 | 27200 | 272 |
| Comparative Example 186 | 40 | 8 | 60 | 380 | 11000 | 274 |
| Comparative Example 187 | 100 | 8 | 0 | 400 | 26800 | 275 |
| Example 199 | 90 | 8 | 10 | 400 | 16600 | 276 |
| Example 200 | 70 | 8 | 30 | 400 | 9800 | 273 |
| Comparative Example 188 | 40 | 8 | 60 | 400 | 4000 | 275 |

TABLE 51

| | TORLON 4203L wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 189 | 100 | 15 | 0 | 380 | 73000 | 274 |
| Example 201 | 90 | 15 | 10 | 380 | 43800 | 276 |
| Example 202 | 70 | 15 | 30 | 380 | 25700 | 274 |
| Comparative Example 190 | 40 | 15 | 60 | 380 | 10500 | 274 |
| Comparative Example 191 | 100 | 15 | 0 | 400 | 25300 | 275 |
| Example 203 | 90 | 15 | 10 | 400 | 14800 | 273 |
| Example 204 | 70 | 15 | 30 | 400 | 8700 | 275 |
| Comparative Example 192 | 40 | 15 | 60 | 400 | 3500 | 273 |

TABLE 52

| | TORLON 4203L wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 193 | 100 | 16 | 0 | 380 | 72800 | 274 |
| Example 205 | 90 | 16 | 10 | 380 | 45000 | 275 |
| Example 206 | 70 | 16 | 30 | 380 | 26400 | 275 |
| Comparative Example 194 | 40 | 16 | 60 | 380 | 10800 | 274 |
| Comparative Example 195 | 100 | 16 | 0 | 400 | 25800 | 276 |
| Example 207 | 90 | 16 | 10 | 400 | 15900 | 275 |
| Example 208 | 70 | 16 | 30 | 400 | 9300 | 273 |
| Comparative Example 196 | 40 | 16 | 60 | 400 | 3800 | 274 |

EXAMPLES 209~212

Aromatic polyamideimide TORLON 4203 L (Trade Mark of Amoco Co.) was dry blended with the polyimide powder obtained in Synthesis Examples 7 and 15 in various proportions illustrated in Table 53.

The mixture was melt-kneaded with an extruder having a bore diameter of 40 mm and screw compression ratio of 3:1, and extruded to obtained uniform pellets.

The pellets thus obtained were injection molded with a common injection molding machine and minimum injection pressure of the molded article was measured. Results are illustrated in Table 53.

Mixtures of the aromatic polyamideimide with the liquid crystal type aromatic polyimide in the proportion of these examples had lower minimum injection pressure as compared with the aromatic polyamideimide alone and were better in processability.

COMPARATIVE EXAMPLES 197~200

Compositions outside the scope of the invention were used and minimum injection pressure was measured by the same procedures as carried out in Examples 209~212. Results are illustrated in Table 53.

Composition which did not contain liquid crystal type aromatic polyimide at all had high minimum injection pressure. When the aromatic of the liquid crystal type aromatic polyimide exceeds 50 parts by weight for 50 parts by weight of the aromatic polyamideimide melt viscosity became too low and minimum injection pressure could not be measured.

TABLE 53

| | TORLON 4203L wt. part | L.C. type polyimide Synthesis Example No. | wt. part | Minimum injection pressure (kg/cm$^2$)* |
|---|---|---|---|---|
| Com. Ex. 197 | 100 | 7 | 0 | 610 |
| Example 209 | 90 | 7 | 10 | 470 |
| Example 210 | 70 | 7 | 30 | 280 |
| Com. Ex. 198 | 40 | 7 | 60 | ** |
| Com. Ex. 199 | 100 | 15 | 0 | 610 |
| Example 211 | 90 | 15 | 10 | 460 |
| Example 212 | 70 | 15 | 30 | 270 |
| Com. Ex. 200 | 40 | 15 | 60 | ** |

*Lower minimum injection pressure indicates lower melt viscosity.
**Lower than the detection limit 40 kg/cm$^2$.

EXAMPLE 213

The pellets which were obtained in Example 209 by blending the aromatic polyamideimide with the liquid crystal type aromatic polyimide in a ratio of 90:10 were injection molded at an injection temperature of 360°~400° C. and mold temperature of 160° C. Mechanical properties of molded specimens were measured and results are illustrated in Table 54. Tensile strength, tensile elastic modulus and elongation were measured in accordance with ASTM D-638.

The mixture of the aromatic polyamideimide and the liquid crystal type aromatic polyimide in a proportion of these examples had mechanical properties equivalent to the aromatic polyamideimide alone in Comparative Example 201. Thus, mechanical properties were not decreased even though the liquid crystal type aromatic polyimide was mixed in the range of the invention.

COMPARATIVE EXAMPLE 201

Pellets obtained in Comparative Example 197 were injection mold by the procedures is carried out in Example 213 and mechanical properties of molded specimens were measured. Results are illustrated in Table 54.

EXAMPLES 214~233

Aromatic polyether ketone VICTREX PEEK 450 P (Trade Mark of ICI Ltd.) was dry blended with the liquid crystal type polyimide powder obtained in Synthesis Examples 1, 7, 8, 15 and 16 in various proportions illustrated in Table 55~59. Melt viscosity of the mixture was measured with a Koka type flow tester CFT-500 (Trade Mark of Shimazu Seisakusho Co.) by using an orifice of 0.1 cm in diameter and 1 cm in length under 100 kg load. Results are illustrated in Table 55~59.

Glass transition temperature (Tg) of the strand extruded from the tester was measured by DSC and illustrated in table 55~59.

Mixtures of the aromatic polyether ketone with the liquid crystal type aromatic polyimide in the proportion of these examples had lower melt viscosity as compared with aromatic polyether ketone alone and were almost equal in Tg that of aromatic polyether ketone.

COMPARATIVE EXAMPLE 202~221

Comparative outside the scope of the invention were used and melt viscosity was measured by the same procedures as carried out in Examples 214~233. Results are illustrated in Table 55~59.

TABLE 54

| Pellets used for molding | | Tensile strength (Kg/cm²) | Tensile elastic modulus (Kg/cm²) | Elongation (%) |
|---|---|---|---|---|
| Comparative Example 201 | Comparative Example 197 | 1910 | 450 | 12 |
| Example 213 | Example 209 | 1920 | 450 | 11 |

TABLE 55

| | VICTREX PEEK 450P wt. part | Liquid Crystal Polyimide | | Flow tester | | Tg (°C.) |
|---|---|---|---|---|---|---|
| | | Synth. Example No. | (wt. part) | temperature (°C.) | Melt Viscosity (poise) | |
| Comparative Example 202 | 100 | 1 | 0 | 380 | 10500 | 143 |
| Example 214 | 90 | 1 | 10 | 380 | 6700 | 145 |
| Example 215 | 70 | 1 | 30 | 380 | 4000 | 144 |
| Comparative Example 203 | 40 | 1 | 60 | 380 | 1560 | 145 |
| Comparative Example 204 | 100 | 1 | 0 | 400 | 6100 | 144 |
| Example 216 | 90 | 1 | 10 | 400 | 5180 | 144 |
| Example 217 | 70 | 1 | 30 | 400 | 3200 | 145 |
| Comparative Example 205 | 40 | 1 | 60 | 400 | 1010 | 143 |

TABLE 56

| | VICTREX PEEK 450P wt. part | Liquid Crystal Polyimide | | Flow tester | | Tg (°C.) |
|---|---|---|---|---|---|---|
| | | Synth. Example No. | (wt. part) | temperature (°C.) | Melt Viscosity (poise) | |
| Comparative Example 206 | 100 | 7 | 0 | 380 | 11000 | 144 |
| Example 218 | 90 | 7 | 10 | 380 | 6780 | 146 |
| Example 219 | 70 | 7 | 30 | 380 | 3980 | 145 |
| Comparative Example 207 | 40 | 7 | 60 | 380 | 1620 | 146 |
| Comparative Example 208 | 100 | 7 | 0 | 400 | 6220 | 146 |
| Example 220 | 90 | 7 | 10 | 400 | 5200 | 147 |
| Example 221 | 70 | 7 | 30 | 400 | 3180 | 144 |
| Comparative Example 209 | 40 | 7 | 60 | 400 | 1200 | 146 |

TABLE 57

| | VICTREX PEEK 450P wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 210 | 100 | 8 | 0 | 380 | 11800 | 145 |
| Example 222 | 90 | 8 | 10 | 380 | 6820 | 146 |
| Example 223 | 70 | 8 | 30 | 380 | 4120 | 145 |
| Comparative Example 211 | 40 | 8 | 60 | 380 | 1760 | 147 |
| Comparative Example 212 | 100 | 8 | 0 | 400 | 6320 | 145 |
| Example 224 | 90 | 8 | 10 | 400 | 5220 | 147 |
| Example 225 | 70 | 8 | 30 | 400 | 3430 | 146 |
| Comparative Example 213 | 40 | 8 | 60 | 400 | 1210 | 146 |

TABLE 58

| | VICTREX PEEK 450P wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 214 | 100 | 15 | 0 | 380 | 9860 | 145 |
| Example 226 | 90 | 15 | 10 | 380 | 6240 | 147 |
| Example 227 | 70 | 15 | 30 | 380 | 3680 | 145 |
| Comparative Example 215 | 40 | 15 | 60 | 380 | 1460 | 146 |
| Comparative Example 216 | 100 | 15 | 0 | 400 | 6020 | 144 |
| Example 228 | 90 | 15 | 10 | 400 | 5000 | 145 |
| Example 229 | 70 | 15 | 30 | 400 | 3040 | 145 |
| Comparative Example 217 | 40 | 15 | 60 | 400 | 1000 | 145 |

TABLE 59

| | VICTREX PEEK 450P wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 218 | 100 | 16 | 0 | 380 | 10200 | 143 |
| Example 230 | 90 | 16 | 10 | 380 | 6500 | 145 |
| Example 231 | 70 | 16 | 30 | 380 | 3880 | 144 |
| Comparative Example 219 | 40 | 16 | 60 | 380 | 1600 | 145 |
| Comparative Example 220 | 100 | 16 | 0 | 400 | 6000 | 146 |
| Example 232 | 90 | 16 | 10 | 400 | 5080 | 145 |
| Example 233 | 70 | 16 | 30 | 400 | 3160 | 146 |
| Comparative Example 221 | 40 | 16 | 60 | 400 | 1000 | 147 |

TABLE 60

| | VICTREX PEK 220G wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 222 | 100 | 1 | 0 | 380 | 7800 | 162 |
| Example 234 | 90 | 1 | 10 | 380 | 5200 | 164 |
| Example 235 | 70 | 1 | 30 | 380 | 3200 | 165 |
| Comparative Example 223 | 40 | 1 | 60 | 380 | 1240 | 163 |
| Comparative Example 224 | 100 | 1 | 0 | 400 | 4600 | 163 |
| Example 236 | 90 | 1 | 10 | 400 | 3480 | 164 |
| Example 237 | 70 | 1 | 30 | 400 | 2020 | 163 |
| Comparative Example 225 | 40 | 1 | 60 | 400 | 860 | 165 |

TABLE 61

| | VICTREX PEK 220G wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 226 | 100 | 7 | 0 | 380 | 7680 | 163 |
| Example 238 | 90 | 7 | 10 | 380 | 5100 | 164 |
| Example 239 | 70 | 7 | 30 | 380 | 3120 | 164 |
| Comparative Example 227 | 40 | 7 | 60 | 380 | 1200 | 165 |
| Comparative Example 228 | 100 | 7 | 0 | 400 | 4480 | 163 |
| Example 240 | 90 | 7 | 10 | 400 | 3360 | 165 |
| Example 241 | 70 | 7 | 30 | 400 | 1960 | 164 |
| Comparative Example 229 | 40 | 7 | 60 | 400 | 840 | 165 |

TABLE 62

| | VICTREX PEK 220G wt. part | Liquid Crystal Polyimide Synth. Example No. | (wt. part) | Flow tester temperature (°C.) | Melt Viscosity (poise) | Tg (°C.) |
|---|---|---|---|---|---|---|
| Comparative Example 230 | 100 | 15 | 0 | 380 | 8020 | 164 |
| Example 242 | 90 | 15 | 10 | 380 | 5420 | 165 |
| Example 243 | 70 | 15 | 30 | 380 | 3340 | 164 |
| Comparative Example 231 | 40 | 15 | 60 | 380 | 1320 | 166 |
| Comparative Example 232 | 100 | 15 | 0 | 400 | 4750 | 164 |
| Example 244 | 90 | 15 | 10 | 400 | 3600 | 166 |
| Example 245 | 70 | 15 | 30 | 400 | 2140 | 165 |
| Comparative Example 233 | 40 | 15 | 60 | 400 | 980 | 165 |

EXAMPLES 246~253

Aromatic polyether ketone VICTREX PEEK 450 P and VICTREX PEX 220 G (Trade Mark of ICI Ltd.) was dryblended with the liquid crystal type polyimide powder obtained in Synthesis Examples 7 and 15 in various proportions illustrated in Table 63 and 64. The composition thus obtained was melt-Kneaded and delivered from an extruder having a bore of 40 mm and screw compression ration of 3:1 and cut into uniform pellets.

The pellets thus obtained were injection molded as usual and the minimum injection pressure was measured. Results are illustrated in Tables 63 and 64.

The mixture of aromatic polyether ketone and the liquid crystal type aromatic polyimide in proportions of the examples had lower minimum injection pressure than aromatic polyether ketone alone and was proved to have better processability.

COMPARATIVE EXAMPLES 234~241

Composition outside the scope of the invention were prepared and the minimum injection pressure was measured by the same procedures as carried out Examples 246~253. Results are illustrated in Tables 63 and 64.

Aromatic polyether imide which does not contain the liquid crystal type aromatic polyimide at all had high minimum injection pressure. When the liquid crystal type aromatic polyimide was 50 parts by weight or more for 50 parts by weight of the aromatic polyether imide, melt viscosity become too low and injection molding was different. Thus, minimum injection pressure could not be measured.

TABLE 63

| | VICTREX PEX 220G wt. part | L.C. type polyimide Synthesis Example No. | wt. part | Minimum injection pressure (kg/cm²)* |
|---|---|---|---|---|
| Com. Ex. 234 | 100 | 7 | 0 | 620 |
| Example 246 | 90 | 7 | 10 | 480 |
| Example 247 | 70 | 7 | 30 | 290 |
| Com. Ex. 235 | 40 | 7 | 60 | ** |
| Com. Ex. 236 | 100 | 15 | 0 | 660 |
| Example 248 | 90 | 15 | 10 | 470 |
| Example 249 | 70 | 15 | 30 | 260 |
| Com. Ex. 237 | 40 | 15 | 60 | ** |

*Lower minimum injection pressure indicates lower melt viscosity.
**Lower than the detection limit 90 kg/cm².

TABLE 64

| | VICTREX PEX 220G wt. part | L.C. type polyimide Synthesis Example No. | wt. part | Minimum injection pressure (kg/cm²)* |
|---|---|---|---|---|
| Com. Ex. 238 | 100 | 7 | 0 | 570 |
| Example 250 | 90 | 7 | 10 | 430 |
| Example 251 | 70 | 7 | 30 | 220 |
| Com. Ex. 239 | 40 | 7 | 60 | ** |
| Com. Ex. 240 | 100 | 15 | 0 | 560 |
| Example 252 | 90 | 15 | 10 | 420 |
| Example 253 | 70 | 15 | 30 | 220 |
| Com. Ex. 241 | 40 | 15 | 60 | ** |

*Lower minimum injection pressure indicates lower melt viscosity
**Lower than the detection limit 90 kg/cm².

EXAMPLES 254 and 255

The pellets which obtained in Examples 246 and 250 by blending the aromatic polyether ketone with the liquid crystal type aromatic polyimide in a ratio of 90:10 were injection molded at a injection temperature of 360°~400° C. and mold temperature of 160° C. Mechanical properties of molded specimens were measured and results are illustrated in Table 65. Tensile strength, tensile elastic modulus and elongation were measured in accordance with ASTM D-638.

The mixture of the aromatic polyether ketone and the liquid crystal type aromatic polyimide in a proportion of these examples had mechanical properties equivalent to the aromatic polyether ketone alone in Comparative Examples 242 and 243. Thus, mechanical properties were not decreased even though the liquid crystal type aromatic polyimide was mixed in the range of the invention.

COMPARATIVE EXAMPLES 242 and 243

Pellets obtained in Comparative Examples 234 and 238 were injection molded by the same procedures as carried out in Example 254 and 255, and mechanical properties of molded specimens were measured. Results are illustrated in Table 65.

TABLE 65

| | Pellets used for molding | Tensile strength (Kg/cm$^2$) | Tensile elastic modulus (Kg/cm$^2$) | Elongation (%) |
|---|---|---|---|---|
| Comparative Example 242 | Comparative Example 234 | 930 | 270 | 100 |
| Example 254 | Example 246 | 930 | 270 | 96 |
| Comparative Example 243 | Comparative Example 238 | 1070 | 300 | 50 |
| Example 255 | Example 250 | 1060 | 300 | 50 |

What is claimed is:

1. A thermoplastic resin composition having good processability, comprising 99.9 to 50 parts by weight of at least one thermoplastic resin selected from the group consisting of aromatic polyimide, aromatic polyetherimide, aromatic polyamideimide, aromatic polyethersulfone and aromatic polyether ketone, and 0.1 to 50 parts by weight of at least one liquid crystal aromatic polyimide selected from the group consisting of A), B), and C) below:

A) a liquid crystal aromatic polyimide comprising a fundamental skeleton having recurring structural units represented by the formula (1):

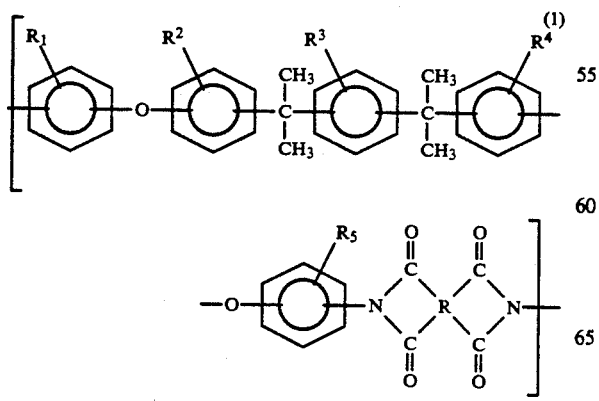

wherein $R_1$ to $R_5$ are a hydrogen atom, fluorine atom, trifluoromethyl, methyl, ethyl, or cyano and are the same or different, and R is a tetravalent radical having 2 to 27 carbon atoms and being selected from the group consisting of a monoaromatic radical, condensed polyaromatic radical and noncondensed aromatic radical connected to each other with a direct bond or a bridge member, B) a liquid crystal, capped aromatic polyimide comprising a fundamental skeleton having recurring structural units represented by the above formula (1) and being capped at the polymer chain end thereof with aromatic dicarboxylic anhydride of the formula (2):

wherein Z is a divalent radical having 6 to 15 carbon atoms and being selected from the group consisting of a monoaromatic radical, condensed polyaromatic radical, and noncondensed aromatic radical connected to each other with a direct bond or a bridge member, C) a liquid crystal, capped aromatic polyimide comprising a fundamental skeleton having recurring structural units represented by the above formula (1) and being capped at the polymer chain end thereof with aromatic monoamine of the formula (3):

wherein V is a monovalent radical having 6 to 15 carbon atoms and being selected from the group consisting of a monoaromatic radical, condensed polyaromatic radical and noncondensed aromatic radical connected to each other with a direct bond or a bridge member.

2. A thermoplastic resin composition having good processability, comprising 99.9 to 50 parts by weight of at least one thermoplastic resin selected from the group consisting of aromatic polyimide, aromatic polyetherimide, aromatic polyamideimide, aromatic polyethersulfone and aromatic polyether ketone, and 0.1 to 50 parts by weight of at least one liquid crystal aromatic polyimide selected from the group consisting of D), E) and F) below:

D) a liquid crystal aromatic polyimide comprising a fundamental skeleton having recurring structural units of the formula (4):

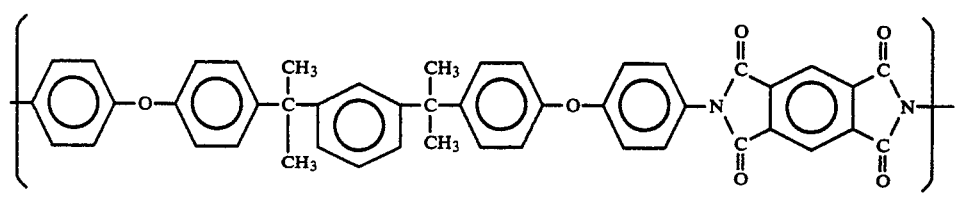

E) a liquid crystal, capped aromatic polyimide comprising a fundamental skeleton having recurring structural units represented by the above formula (4) and being capped at the polymer chain end thereof with aromatic dicarboxylic anhydride of the formula (2):

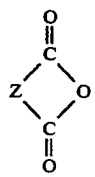
(2)

wherein Z is a divalent radical having 6 to 15 carbon atoms and being selected from the group consisting of a monoaromatic radical, condensed polyaromatic radical, and noncondensed aromatic radical connected to each other with a direct bond or a bridge member, F) a liquid crystal, capped aromatic polyimide comprising a fundamental skeleton having recurring structural units represented by the above formula (4) and being capped at the polymer chain end thereof with aromatic monoamine of the formula (3):

V—NH$_2$ (3)

wherein V is a monovalent radical having 6 to 15 carbon atoms and being selected from the group consisting of a monoaromatic radical, condensed polyaromatic radical and noncondensed aromatic radical connected to each other with a direct bond or a bridge member.

3. A thermoplastic resin composition having good processability, comprising 99.9 to 50 parts by weight of at least one thermoplastic resin selected from the group consisting of aromatic polyimide, aromatic polyetherimide, aromatic polyamideimide, aromatic polyethersulfone and aromatic polyether ketone, and 0.1 to 50 parts by weight of at least one liquid crystal aromatic polyimide selected from the group consisting of G), H) and I) below:

G) a liquid crystal aromatic polyimide copolymer comprising 1 to 99% by mol of the fundamental skeleton having recurring structural units of the formula (4):

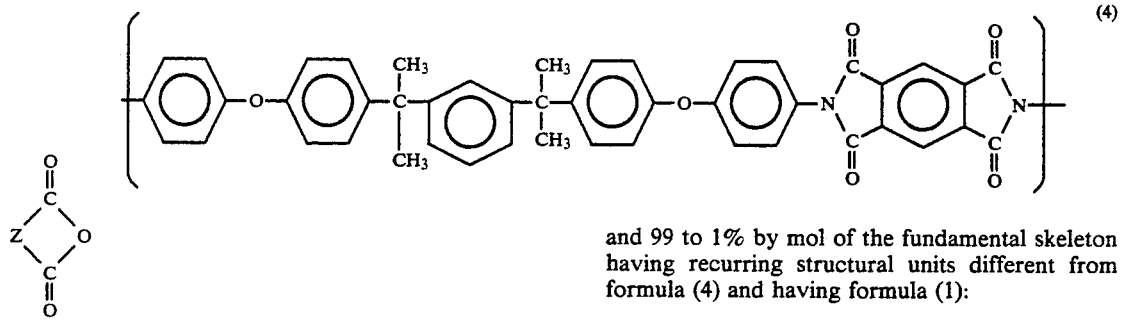

and 99 to 1% by mol of the fundamental skeleton having recurring structural units different from formula (4) and having formula (1):

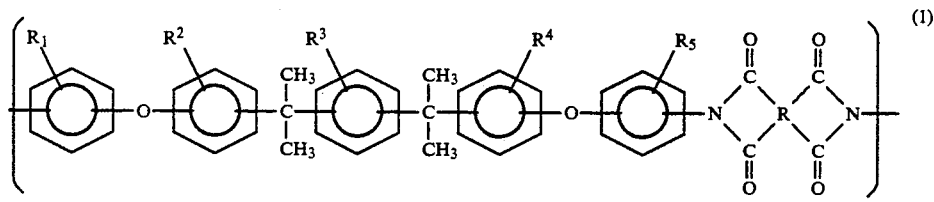

wherein R$_1$ to R$_5$ is a hydrogen atom, fluorine atom, trifluoromethyl, methyl, ethyl or cyano and are the same or different, and R is a tetravalent radical having 6 to 27 carbon atoms and being selected from the group consisting of a monoaromatic radical, condensed polyaromatic radical and noncondensed aromatic radical connected to each other with a direct bond or a bridge member, H) a liquid crystal, capped aromatic polyimide copolymer obtained by capping the polymer chain end of the above liquid crystal aromatic polyimide copolymer with aromatic dicarboxylic anhydride of the formula (2):

(2)

wherein Z is a divalent radical having 6 to 15 carbon atoms and being selected from the group consisting of a monoaromatic radical, condensed polyaromatic radical, and noncondensed aromatic radical connected to each other with a direct bond or a bridge member, I) a liquid crystal, capped aromatic polyimide copolymer obtained by capping the polymer chain end of the above liquid crystal type aromatic polyimide copolymer with aromatic monoamine of the formula (3):

V—NH$_2$                  (3)

wherein V is a monovalent radical having 6 to 15 carbon atoms and being selected from the group consisting of a monoaromatic radical, condensed polyaromatic radical and noncondensed aromatic radical connected to each other with a direct bond or a bridge member.

4. The thermoplastic resin composition of claim 1, 2 or 3 wherein the thermoplastic resin is at least one aromatic polyimide selected from the group consisting of J), K) and L) below:

J) an aromatic polyimide comprising a fundamental skeleton having recurring structural units represented by the formula (5):

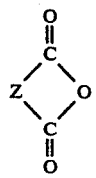

wherein Z is a divalent radical having 6 to 15 carbon atoms and being selected from the group consisting of a monoaromatic radical, condensed polyaromatic radical, and noncondensed aromatic radical connected to each other with a direct bond or a bridge member, L) a capped aromatic polyimide comprising a fundamental skeleton having recurring structural units represented by the formula (5) and being obtained by capping the polymer chain end thereof with aromatic monoamine of the formula (3):

V—NH$_2$                  (3)

wherein V is a monovalent radical having 6 to 15 carbon atoms and being selected from the group

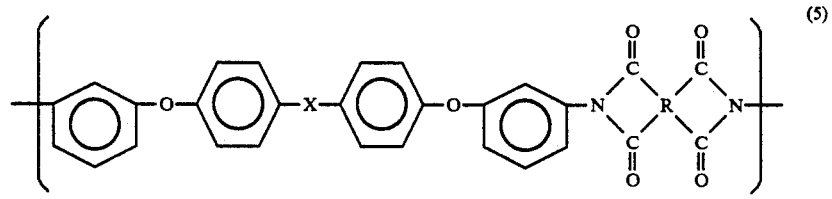

wherein X is a divalent radical selected from the group consisting of a direct bond, isopropylidene, hexafluorinated isopropylidene, carbonyl, thio and sulfonyl, and R is a tetravalent radical having 6 to 27 carbon atoms and being selected from the group consisting of a monoaromatic radical, condensed polyaromatic radical and noncondensed aromatic radical connected to each other with a direct bond or a bridge member, K) a capped aromatic polyimide comprising a fundamental skeleton having recurring structural units represented by the above formula (5) and being obtained by capping the polymer chain end thereof with aromatic dicarboxylic anhydride of the formula (2):

consisting of a monoaromatic radical, condensed polyaromatic radical and noncondensed aromatic radical connected to each other with a direct bond or a bridge member.

5. The thermoplastic resin composition of claim 4 wherein the aromatic polyimide comprises a fundamental skeleton having recurring structural units of the formula (6):

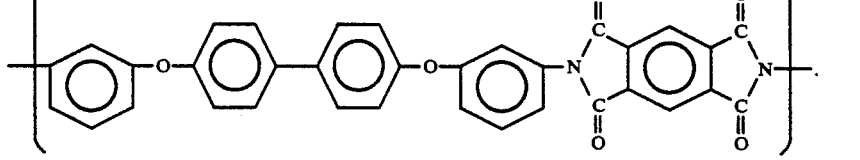

6. The thermoplastic resin composition of claim 1, 2 or 3 wherein the thermoplastic resin is at least one aromatic polyimide selected from the group consisting of M), N) and O) below:

M) an aromatic polyimide comprising a fundamental skeleton having recurring structural units of the formula (7):

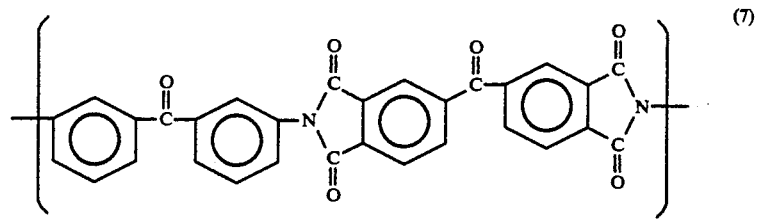
(7)

N) a capped aromatic polyimide comprising a fundamental skeleton having recurring structural units of the above formula (7) and being obtained by capping the polymer chain end thereof with aromatic dicarboxylic anhydride of the formula (2):

(2)

wherein Z is a divalent having 6 to 15 carbon atoms and being selected from the group consisting of a monoaromatic radical, condensed polyaromatic radical, and noncondensed aromatic radical connected to each other with a direct bond or a bridge member, O) a capped aromatic polyimide comprising a fundamental skeleton having recurring structural units of the formula (5) and being obtained by capping the polymer chain end thereof with aromatic monoamine of the formula (3):

V—NH$_2$     (3)

wherein V is a monovalent radical having 6 to 15 carbon atoms and being selected from the group consisting of a monoaromatic radical, condensed polyaromatic radical and noncondensed aromatic radical connected to each other with a direct bond or a bridge member.

7. The thermoplastic resin composition of claim 1, 2 or 3 wherein the thermoplastic resin is at least one aromatic polyimide selected from the group consisting of P), Q) and R) below:

P) an aromatic polyimide copolymer comprising 99 to 1% by mol of a fundamental skeleton having recurring structural units of the formula (6):

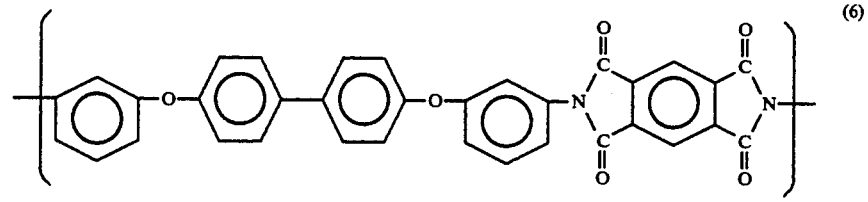
(6)

and 1 to 99% by mol of a fundamental skeleton having recurring structural units different from formula (6) and having formula (8):

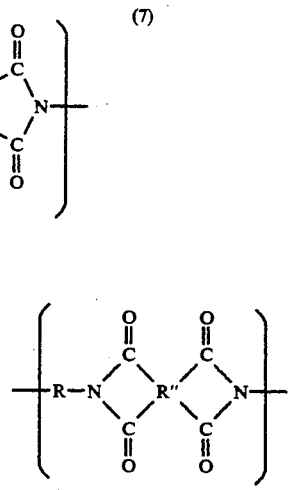
(8)

wherein R is

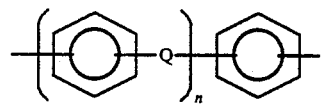

wherein n is an integer of 0, 1, 2 or 3: Q is a direct bond, —O—, —S—, —CO—, —SO$_2$—, —CH$_2$—, —C(CH$_3$)$_2$— or —C(CF$_3$)$_2$— and are the same or different when two or more Q connect three or more aromatic rings to each other; and R″ is one or more tetravalent radicals selected from the group consisting of

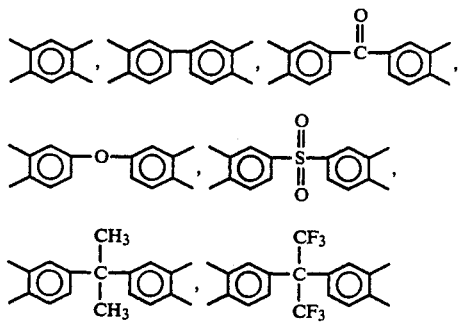

and

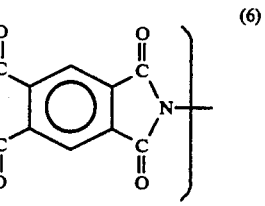

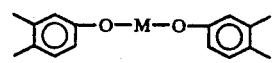

wherein M is one or more divalent radicals selected from the group consisting of

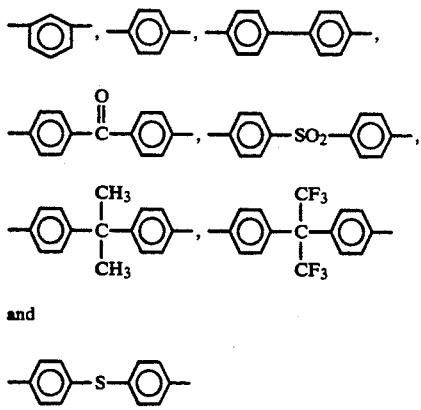

and

Q) a capped aromatic polyimide copolymer obtained by capping the polymer chain end of the above aromatic polyimide copolymer with aromatic dicarboxylic anhydride of the formula (2):

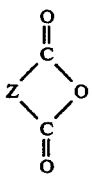 (2)

wherein Z is a divalent radical having 6 to 15 carbon atoms and being selected from the group consisting of a monoaromatic radical, condensed polyaromatic radical, and noncondensed aromatic radical connected to each other with a direct bond or a bridge member, R) a capped aromatic polyimide copolymer obtained by capped the polymer chain end of the above aromatic polyimide copolymer with aromatic monoamine of the formula (3):

V—NH$_2$ (3)

wherein V is a monovalent radical having 6 to 15 carbon atoms and being selected from the group consisting of a monoaromatic radical, condensed polyaromatic radical and noncondensed aromatic radical connected to each other with a direct bond or a bridge member.

8. The thermoplastic resin composition of claim 7 wherein the recurring structural units of the formula (8) is recurring structural units different from formula (6) and having formula (10):

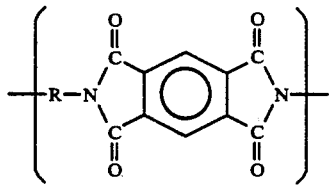 (10)

wherein R is the same as above.

9. The thermoplastic resin composition of claim 1, 2 or 3 wherein the thermoplastic resin is an aromatic polysulfone comprising a fundamental skeleton having at least one recurring structural unit represented by the formula (11):

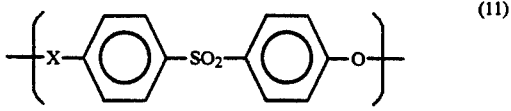 (11)

wherein X is a direct bond,

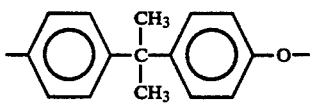

or

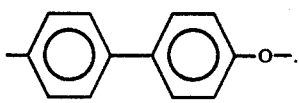

10. The thermoplastic resin composition of claim 1, 2 or 3 wherein the thermoplastic resin is an aromatic polyetherimide comprising a fundamental skeleton having at least one recurring structural unit represented by the formula (12):

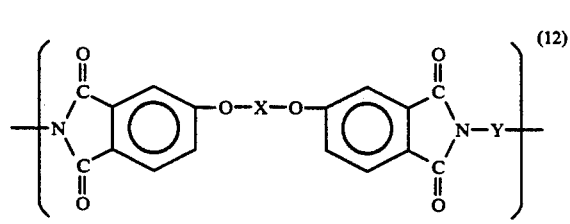 (12)

wherein X is

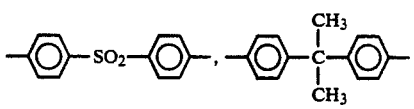

or

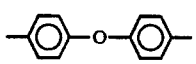

and Y is

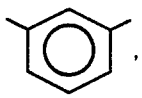,

,

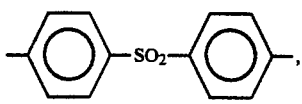,

-continued

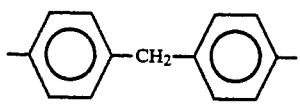

or

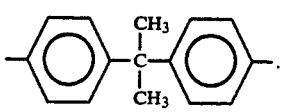

11. The thermoplastic resin composition of claim 1, 2 or 3 wherein the thermoplastic resin is an aromatic polyamideimide comprising a fundamental skeleton having at least one recurring structural unit of the formula (13):

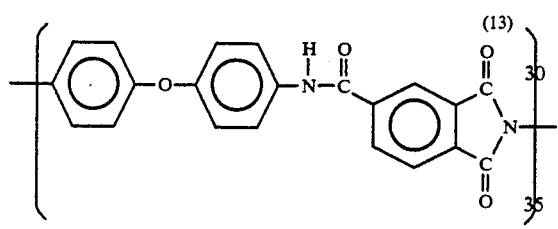

and/or the formula (14):

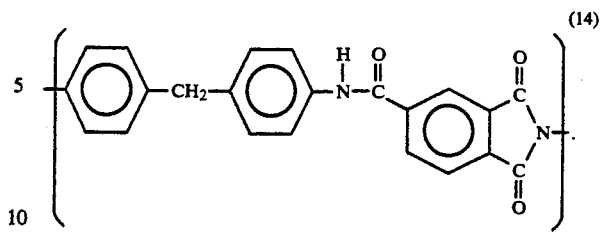

12. The thermoplastic resin composition of claim 1, 2 or 3 wherein the thermoplastic resin is an aromatic polyether ketone comprising a fundamental skeleton having recurring structural units of at least one of the formula (15):

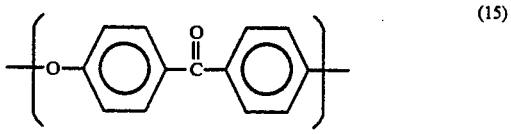

and the formula (16):

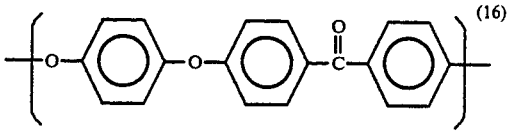

13. A thermoplastic resin composition of claim 1, 2, 3 or 4 wherein the aromatic dicarboxylic anhydride is phthalic anhydride.

14. A thermoplastic resin composition of claim 1, 2, 3 or 4 wherein the aromatic monoamine is aniline.

* * * * *